US008944204B2

(12) United States Patent  (10) Patent No.: US 8,944,204 B2
Ripley et al.  (45) Date of Patent: Feb. 3, 2015

(54) SNOWMOBILE

(75) Inventors: Anthony J Ripley, Roseau, MN (US);
Richard D Kerner, Roseau, MN (US);
Jeffrey D Conn, Wannaska, MN (US)

(73) Assignee: Polaris Industries Inc., Medina, MN (US)

(*) Notice: Subject to any disclaimer, the term of this patent is extended or adjusted under 35 U.S.C. 154(b) by 0 days.

(21) Appl. No.: 13/563,958

(22) Filed: Aug. 1, 2012

(65) Prior Publication Data

US 2013/0032418 A1   Feb. 7, 2013

Related U.S. Application Data

(60) Provisional application No. 61/582,426, filed on Jan. 2, 2012, provisional application No. 61/513,949, filed on Aug. 1, 2011.

(51) Int. Cl.
| | |
|---|---|
| *B62M 27/02* | (2006.01) |
| *B62M 29/00* | (2006.01) |
| *B60G 3/18* | (2006.01) |
| *B62D 55/104* | (2006.01) |
| *B62K 19/22* | (2006.01) |

(52) U.S. Cl.
CPC ............ *B62M 27/02* (2013.01); *B62D 55/104* (2013.01); *B62K 19/22* (2013.01); *B62M 2027/026* (2013.01); *B62M 2027/028* (2013.01)
USPC .................................... 180/190; 280/124.135

(58) Field of Classification Search
USPC .................... 180/9.1, 182, 190; 280/124.134, 280/124.135, 124.145, 124.146, 124.154
See application file for complete search history.

(56) References Cited

U.S. PATENT DOCUMENTS

| | | | |
|---|---|---|---|
| 5,172,786 A | 12/1992 | Ishibashi et al. | |
| 5,607,026 A | 3/1997 | Rioux et al. | |
| 5,819,865 A * | 10/1998 | Cowley | 280/93.502 |
| 6,164,670 A * | 12/2000 | Abarca et al. | 280/12.14 |
| 6,357,543 B1 | 3/2002 | Karpik | |

(Continued)

FOREIGN PATENT DOCUMENTS

| | | |
|---|---|---|
| CA | 953 537 A1 | 8/1974 |
| DE | 10 2007 026453 A1 | 12/2008 |

(Continued)

OTHER PUBLICATIONS

International Search Report and Written Opinion issued by the European Patent Office, dated May 7, 2013, for International Application No. PCT/US2012/049095; 24 pages.

*Primary Examiner* — Paul N Dickson
*Assistant Examiner* — Laura Freedman
(74) *Attorney, Agent, or Firm* — Faegre Baker Daniels LLP

(57) ABSTRACT

A snowmobile comprises a chassis with a front portion and a tunnel, and a power train unit supported by the chassis. The snowmobile further includes a plurality of ground-engaging members cooperating with the power train unit to operate the snowmobile. The plurality of ground-engaging members includes a pair of front skis and an endless track assembly. The snowmobile also includes a front suspension operably coupled to the pair of front skis. The front suspension includes a right control arm comprising a first right arm adhesively coupled to at least one right coupler, and a left control arm comprising a first left arm adhesively coupled to at least one left coupler. The first right arm and the left arm are comprised of a first material and the right and left couplers are comprised of a second material.

11 Claims, 69 Drawing Sheets

(56) References Cited

U.S. PATENT DOCUMENTS

| | | | |
|---|---|---|---|
| 6,446,744 B2 * | 9/2002 | Wubbolts et al. | 180/190 |
| 6,502,651 B2 * | 1/2003 | Zaczkowski et al. | 180/9.54 |
| 6,725,959 B1 * | 4/2004 | Shea et al. | 180/190 |
| 6,796,395 B1 * | 9/2004 | Berg et al. | 180/190 |
| 6,866,110 B2 * | 3/2005 | Mallette et al. | 180/183 |
| 7,032,915 B2 * | 4/2006 | Bedard et al. | 280/288.4 |
| 7,591,332 B1 * | 9/2009 | Bates, Jr. | 180/68.1 |
| 7,708,097 B1 * | 5/2010 | Tharaldson et al. | 180/190 |
| 7,753,154 B2 * | 7/2010 | Maltais | 180/190 |
| 7,870,920 B1 | 1/2011 | Dahlgren et al. | |
| 8,225,896 B2 * | 7/2012 | Eichenberger et al. | 180/190 |
| 8,459,392 B2 * | 6/2013 | Bernier et al. | 180/190 |
| 8,490,731 B2 * | 7/2013 | Eaton et al. | 180/190 |
| 8,733,773 B2 * | 5/2014 | Sampson | 280/190 |
| 2002/0017765 A1 | 2/2002 | Mallette et al. | |
| 2004/0016583 A1 | 1/2004 | Pyykonen | |
| 2006/0191728 A1 | 8/2006 | Aoshima | |
| 2008/0173492 A1 | 7/2008 | Aitcin et al. | |
| 2011/0132679 A1 * | 6/2011 | Kerner et al. | 180/190 |
| 2011/0192667 A1 * | 8/2011 | Conn et al. | 180/190 |
| 2013/0032417 A1 * | 2/2013 | Sampson | 180/182 |
| 2013/0032419 A1 * | 2/2013 | Conn et al. | 180/190 |
| 2013/0032420 A1 * | 2/2013 | Mills et al. | 180/190 |
| 2013/0193676 A1 * | 8/2013 | Mertens et al. | 280/845 |
| 2013/0206494 A1 * | 8/2013 | Hedlund et al. | 180/182 |

FOREIGN PATENT DOCUMENTS

| | | | |
|---|---|---|---|
| FR | 2 811 386 A1 | 1/2002 | |
| WO | WO 2009114414 A1 * | 9/2009 | B62M 27/02 |

* cited by examiner

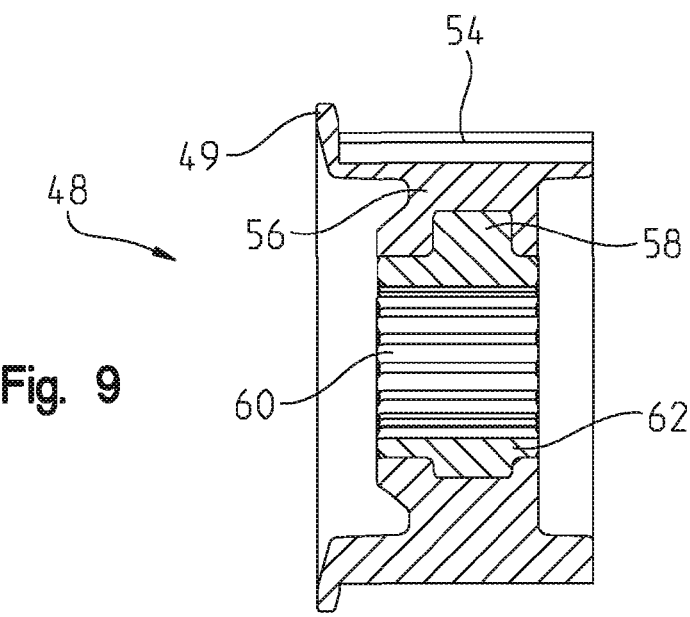
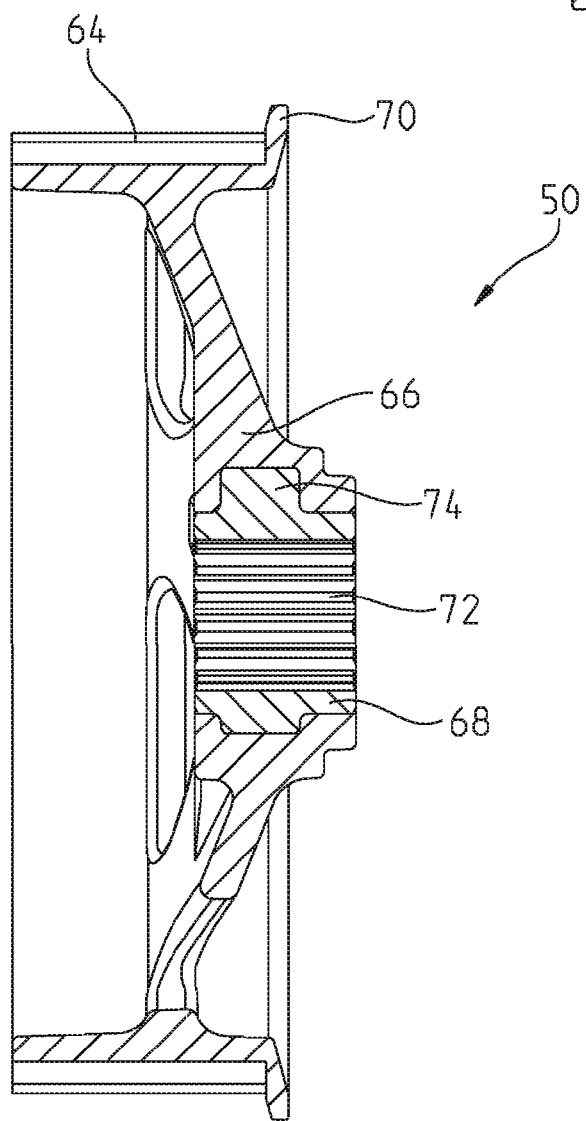

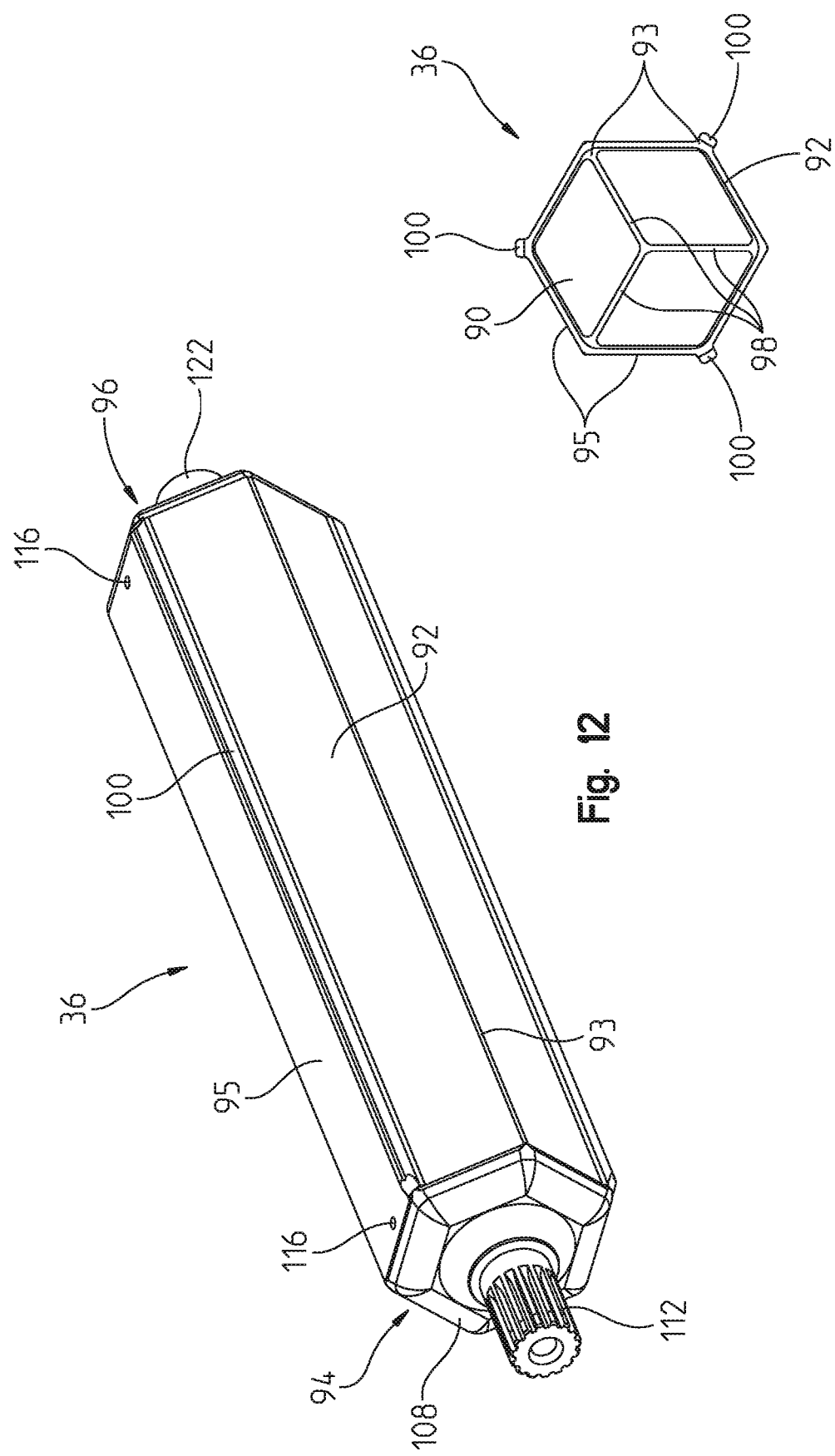

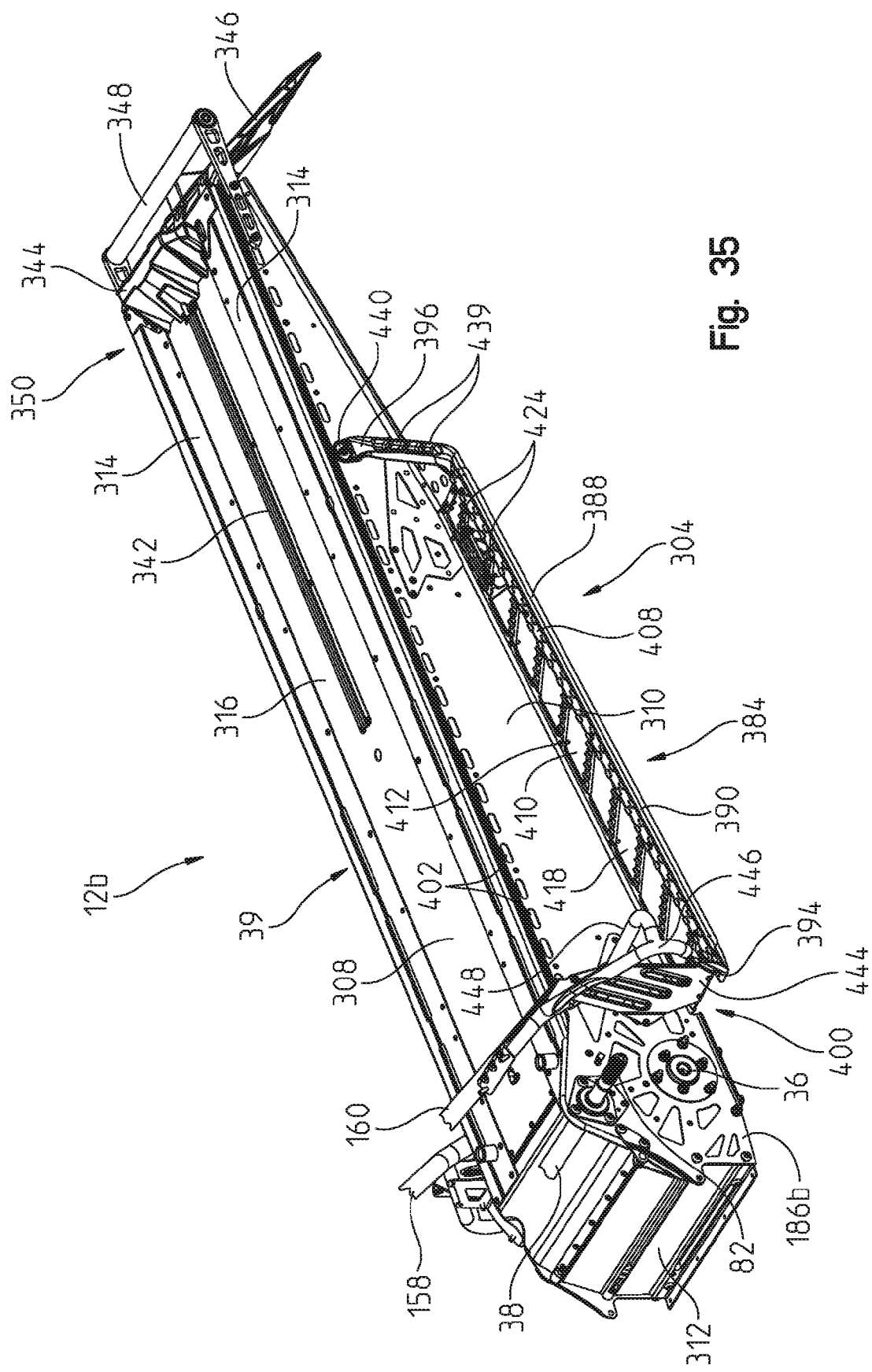

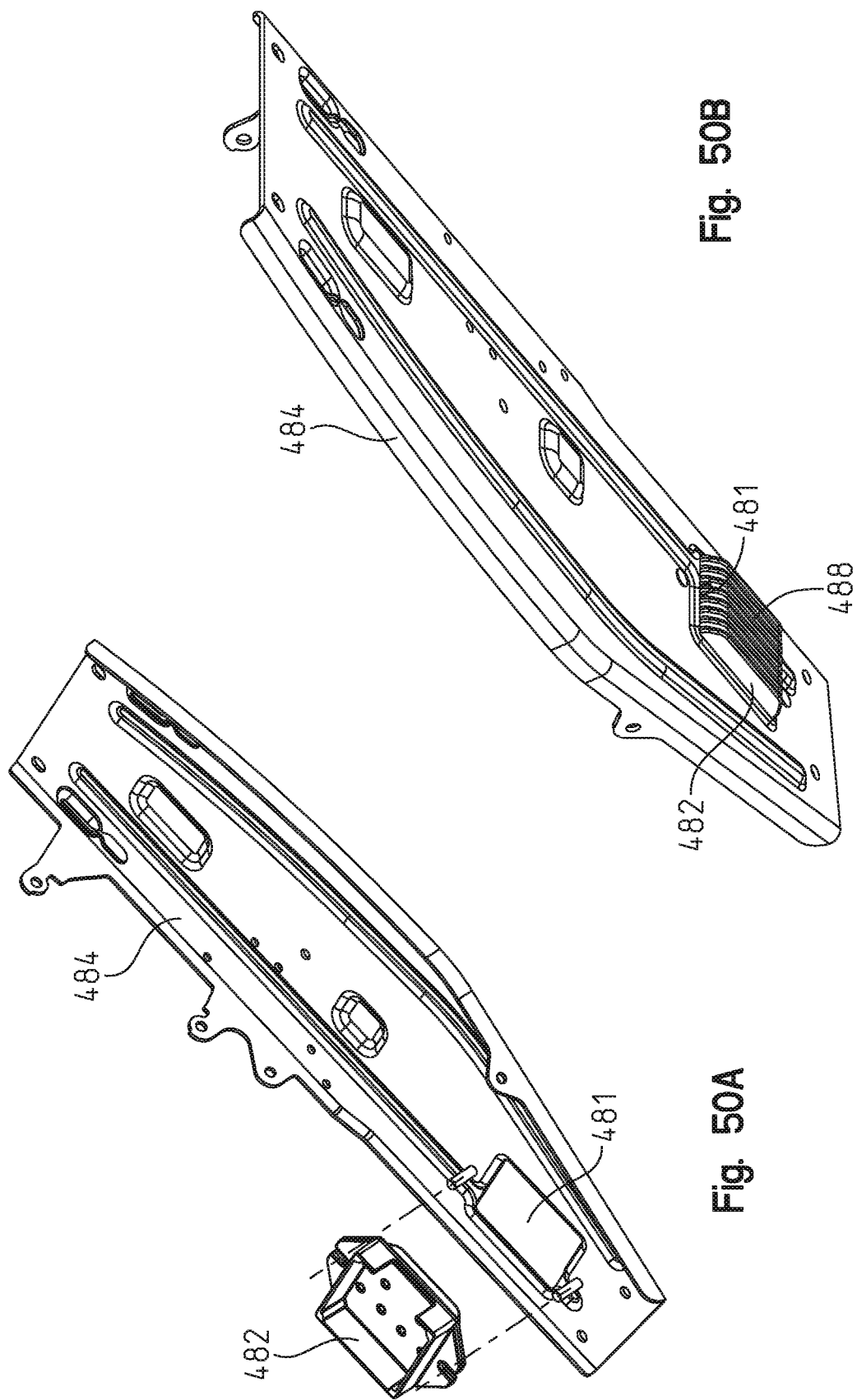

SNOWMOBILE

This application claims priority to U.S. provisional patent application Ser. No. 61/513,949 filed Aug. 1, 2011 and U.S. provisional patent application Ser. No. 61/582,426 filed Jan. 2, 2012, the subject matter of which is incorporated herein by reference.

BACKGROUND OF THE DISCLOSURE

The present disclosure relates to snowmobiles and, more particularly, to snowmobiles for use in deep snow applications.

Generally, snowmobiles are available for various applications such as deep snow, high performance, luxury touring, and trail riding, for example. Regardless of the application, certain structural components are common to many snowmobiles. For example, snowmobiles typically include a frame, a track assembly, a power train, skis, and at least one suspension system, as are illustrated in U.S. Patent Application Publication No. 2011/0139528, filed on Feb. 14, 2011, U.S. Patent Application Publication No. 2011/0192667, filed on Feb. 4, 2011, U.S. Pat. No. 7,353,898, issued on Apr. 8, 2008, and U.S. Provisional Application Ser. No. 61/513,949, filed on Aug. 1, 2011, the complete disclosures of which are expressly incorporated by reference herein.

One common area for snowmobiles generally relates to the overall architecture, where a frame includes a tunnel and a front chassis portion which retains the power train, and a front suspension that mounts skis to the frame. A drive shaft is typically mounted to the front chassis portion and includes drive sprockets for powering the belt. A chain case is also typically provided to transfer power from an engine or CVT to the drive shaft. Reference is made to U.S. Pat. No. 7,694,768 which shows a typical snowmobile drivetrain with a drive shaft and an upper jack shaft that drives the drive sprockets through the chain case, the subject matter of which is incorporated herein by reference.

In the case of mountain or deep snow snowmobiles, one common characteristic is to provide an elongated endless belt to provide a longer footprint for the belt, and a lower pressure for the snowmobile for flotation in deep snow. An elongated tunnel is also provided to cover the extended belt. A front body typically surrounds at least the front frame portion to enclose the engine and other mechanical components. Reference is made to U.S. Pat. No. 7,870,920 and to U.S. patent application Ser. No. 13/021,586 both of which show deep snow snowmobiles, the subject matter of each being incorporated herein by reference. A present version of a snowmobile frame for deep snow is shown in FIG. 1.

SUMMARY OF THE DISCLOSURE

An illustrative embodiment of the present disclosure includes a snowmobile comprising a chassis with a front portion and a tunnel, and a power train unit supported by the chassis. The snowmobile further includes a plurality of ground-engaging members cooperating with the power train unit to operate the snowmobile. The plurality of ground-engaging members includes a pair of front skis and an endless track assembly. The snowmobile also includes a front suspension operably coupled to the pair of front skis. The front suspension includes a right control arm comprising a first right arm adhesively coupled to at least one right coupler, and a left control arm comprising a first left arm adhesively coupled to at least one left coupler. The first right arm and the left arm are comprised of a first material and the right and left couplers are comprised of a second material.

A further illustrative embodiment of the present disclosure includes a snowmobile comprising a chassis with a tunnel, and a power train unit that is supported by the chassis. The snowmobile further comprises a rear ground-engaging member that cooperates with the power train unit to operate the snowmobile. The rear ground-engaging member includes an endless track and a plurality of rails. Additionally, the snowmobile comprises a rear suspension that is operably coupled to the tunnel. The rear suspension includes a front arm, a rear arm, and a linear force element. The front arm of the rear suspension includes a coupler and an arm member that extends from the coupler. The arm member is bonded to the coupler in shear.

An additional embodiment of the present disclosure includes a snowmobile comprising a chassis having a front portion and a tunnel; a bulkhead supported by the front portion of the chassis; a power train unit coupled to the chassis. The embodiment also includes a plurality of front ground-engaging members including a right ski and a left ski; a right suspension unit operably coupled to the right ski and including an upper control arm and a lower control arm coupled to the bulkhead; a left suspension unit operably coupled to the left ski and including an upper control arm and a lower control arm coupled to the bulkhead. A support member supported within the bulkhead between the upper control arm of the right suspension unit and the upper control arm of the left suspension unit.

A further illustrative embodiment of the present disclosure includes a snowmobile comprising a frame, an engine that is supported by the frame, a first front ski that is operably coupled to the frame, and a second front ski that is operably coupled to the frame. The snowmobile further comprises a steering assembly that is configured to move the first and second front skis. The steering assembly includes a handlebar, a steering post, a first steering rod, and a second steering rod. The first steering rod is operably coupled to the first front ski and the second steering rod is operably coupled to the second front ski. The handlebar is operably coupled to the steering post and the first and second steering rods to transmit movement from the handlebar to the steering post and the first and second steering rods. Each of the first and second steering rods includes an arm, a first bracket, and a second bracket. The first and second brackets are coupled to the arm with an adhesive material.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The foregoing aspects and many of the intended advantages of this invention will become more readily appreciated as the same becomes better understood by reference to the following detailed description when taken in conjunction with the accompanying drawings.

FIG. 9 is a cross-sectional view of the upper sprocket of FIG. 7, taken along line 9-9 of FIG. 7;

FIG. 10 is a cross-sectional view of the lower sprocket of FIG. 8, taken along line 10-10 of FIG. 8;

FIG. 12 is front perspective view of a drive shaft of the illustrative power train unit;

FIG. 13 is an end view of the drive shaft of FIG. 12 with an end cap removed;

FIG. 35 is a perspective view of the tunnel of FIG. 34;

FIG. 50A is a top perspective view of a mount for a regulator of the illustrative snowmobile;

FIG. 50B is a bottom perspective view of the mount of FIG. 50A;

Figure 1A:
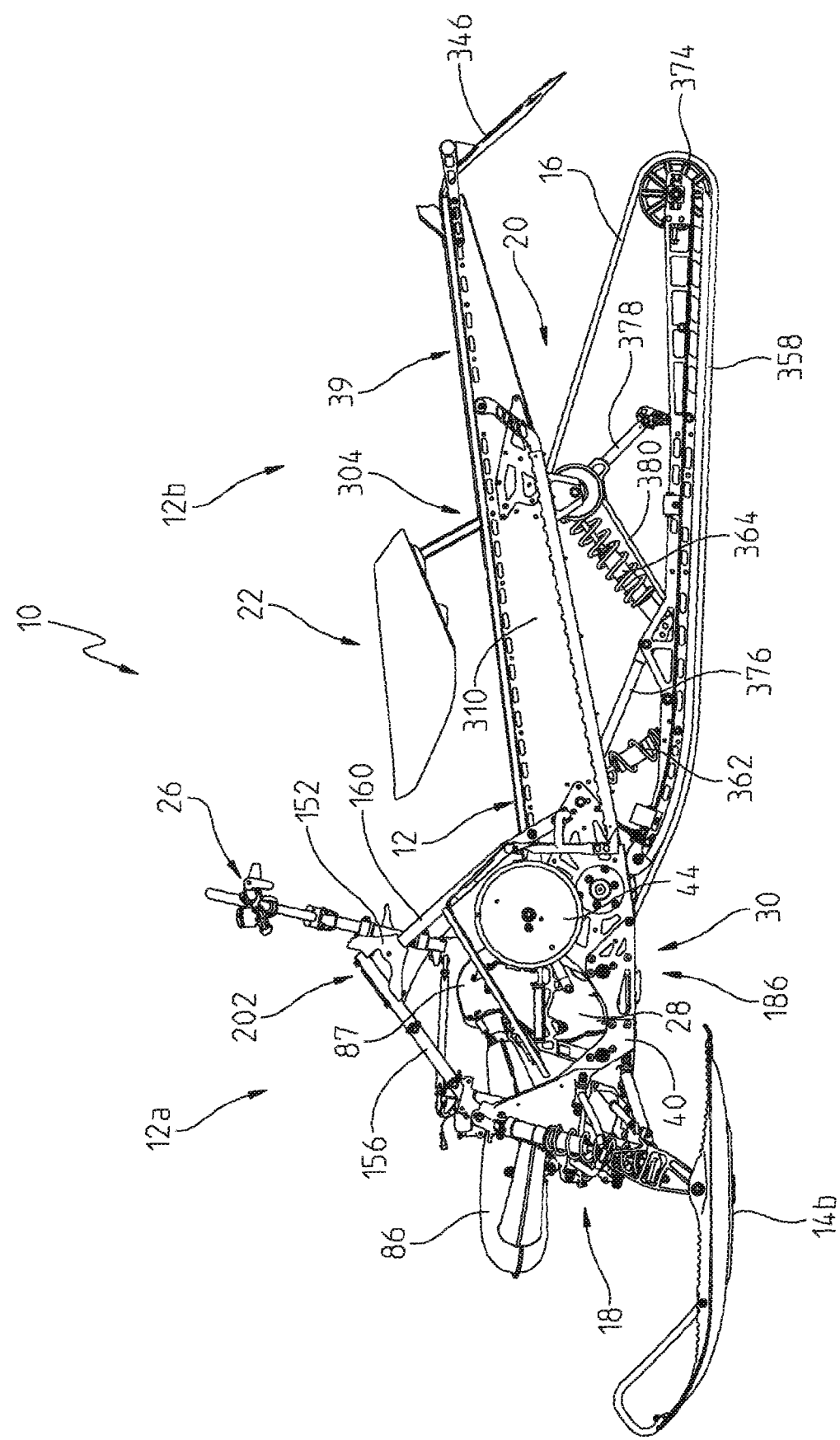
FIG. 1A is a side perspective view of a clutch side of an illustrative snowmobile of the present disclosure.

Corresponding reference characters indicate corresponding parts throughout the several views. Although the drawings represent embodiments of various features and components according to the present disclosure, the drawings are not necessarily to scale and certain features may be exaggerated in order to better illustrate and explain the present disclosure. The exemplifications set out herein illustrate embodiments of the invention, and such exemplifications are not to be construed as limiting the scope of the invention in any manner.

DETAILED DESCRIPTION OF THE DRAWINGS

For the purposes of promoting an understanding of the principles of the invention, reference will now be made to the embodiments illustrated in the drawings, which are described below. The embodiments disclosed below are not intended to be exhaustive or limit the invention to the precise form disclosed in the following detailed description. Rather, the embodiments are chosen and described so that others skilled in the art may utilize their teachings. For example, while the following description refers primarily to a snowmobile, it should be understood that the principles of the invention apply equally to other snow vehicles. While the present invention primarily involves a snowmobile, it should be understood, however, that the invention may have application to other types of vehicles, such as motorcycles, ATVs, utility vehicles, scooters, and mopeds.

Figure 1B:
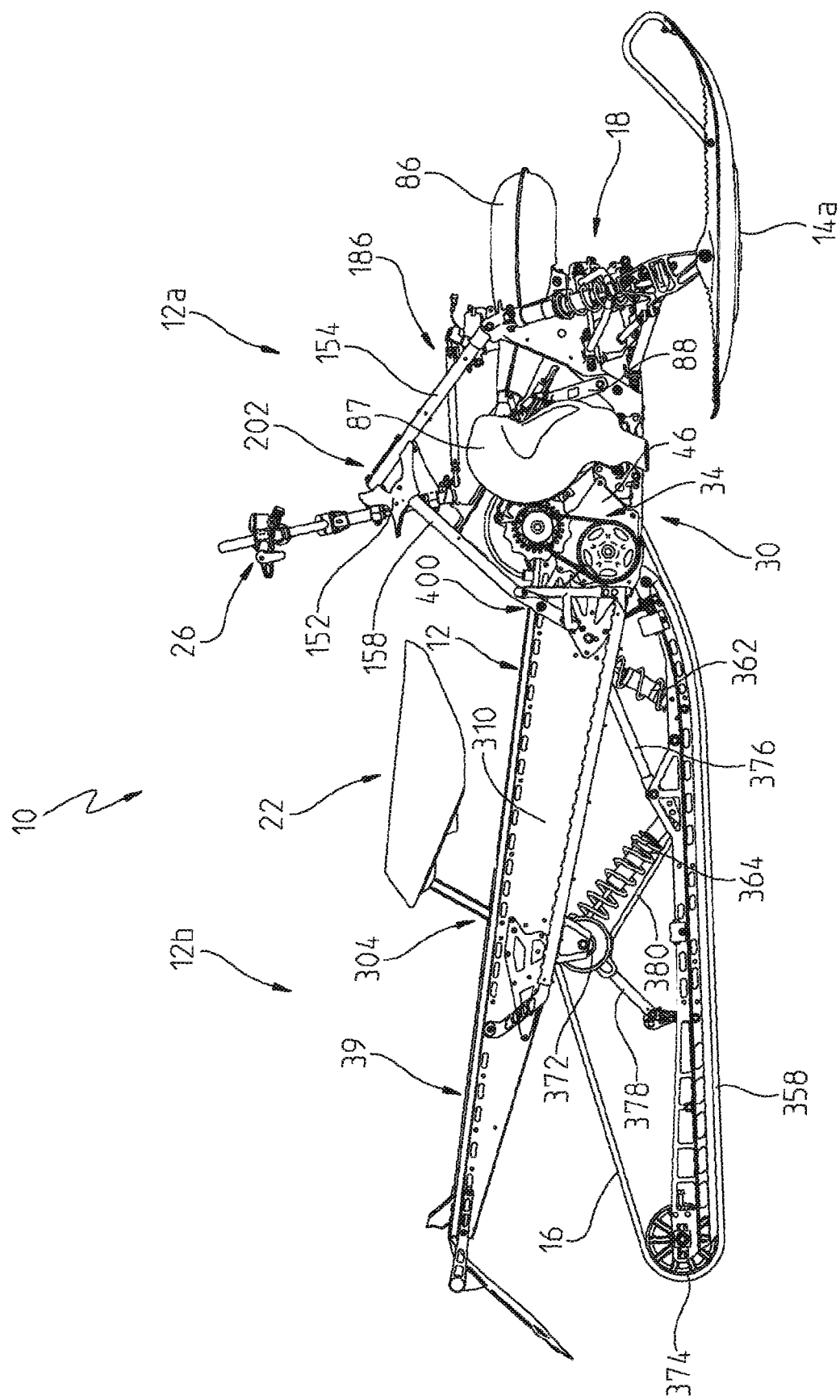
FIG. 1B is a side perspective view of a belt drive side of the snowmobile of FIG. 1A.
Figure 2:
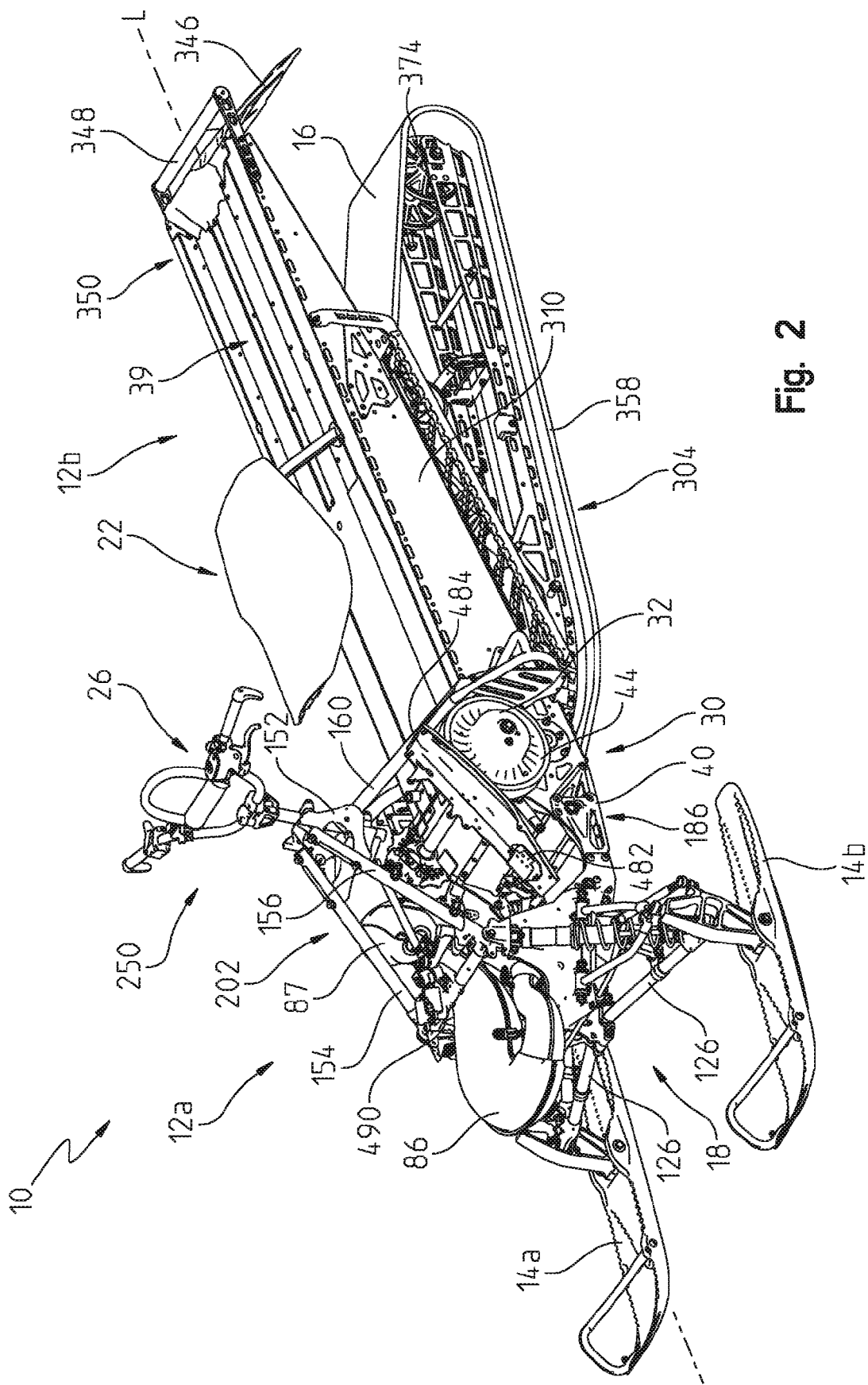
FIG. 2 is a front perspective of the snowmobile of FIG. 1.

Referring to FIGS. 1A, 1B, and 2, an illustrative embodiment of a snowmobile 10 includes a chassis or frame 12 including a front frame portion 12a and a rear frame portion 12b. Front frame portion 12a is supported by front ground-engaging members, illustratively skis 14, and rear frame portion 12b is supported by a rear ground-engaging member, illustratively an endless track 16. Front skis 14 are operably coupled to a front suspension assembly 18, and endless track 16 cooperates with a rear suspension assembly 20. Snowmobile 10 also includes a seat assembly 22, a front outer body (not shown), and a steering assembly 26.

Figure 5:
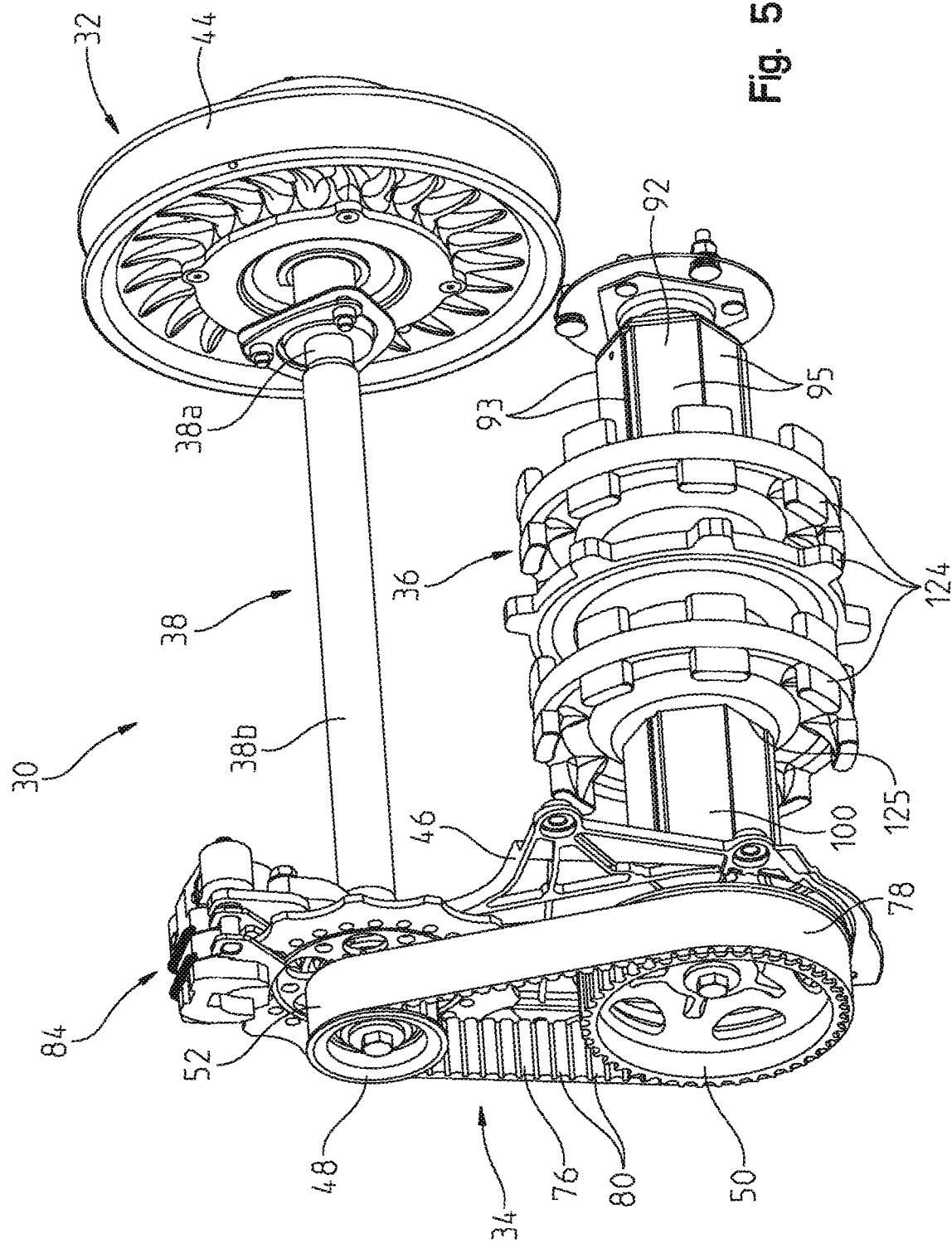
FIG. 5 is a front perspective view of a portion of a power train unit of the snowmobile of the present disclosure.

Referring to FIGS. 5-16, a power train unit 30 (FIG. 5) is covered by an outer body panel (not shown) and provides power to endless track 16 to move snowmobile 10. As shown in FIG. 5, power train unit 30 is supported by front frame portion 12a and includes an engine 28 (FIG. 1A), a clutch assembly 32 of the continuously variable transmission ("CVT") type, a belt drive assembly 34, a drive shaft 36, and a jackshaft 38. A brake assembly 84 may be positioned adjacent jackshaft 38.

Figure 28:
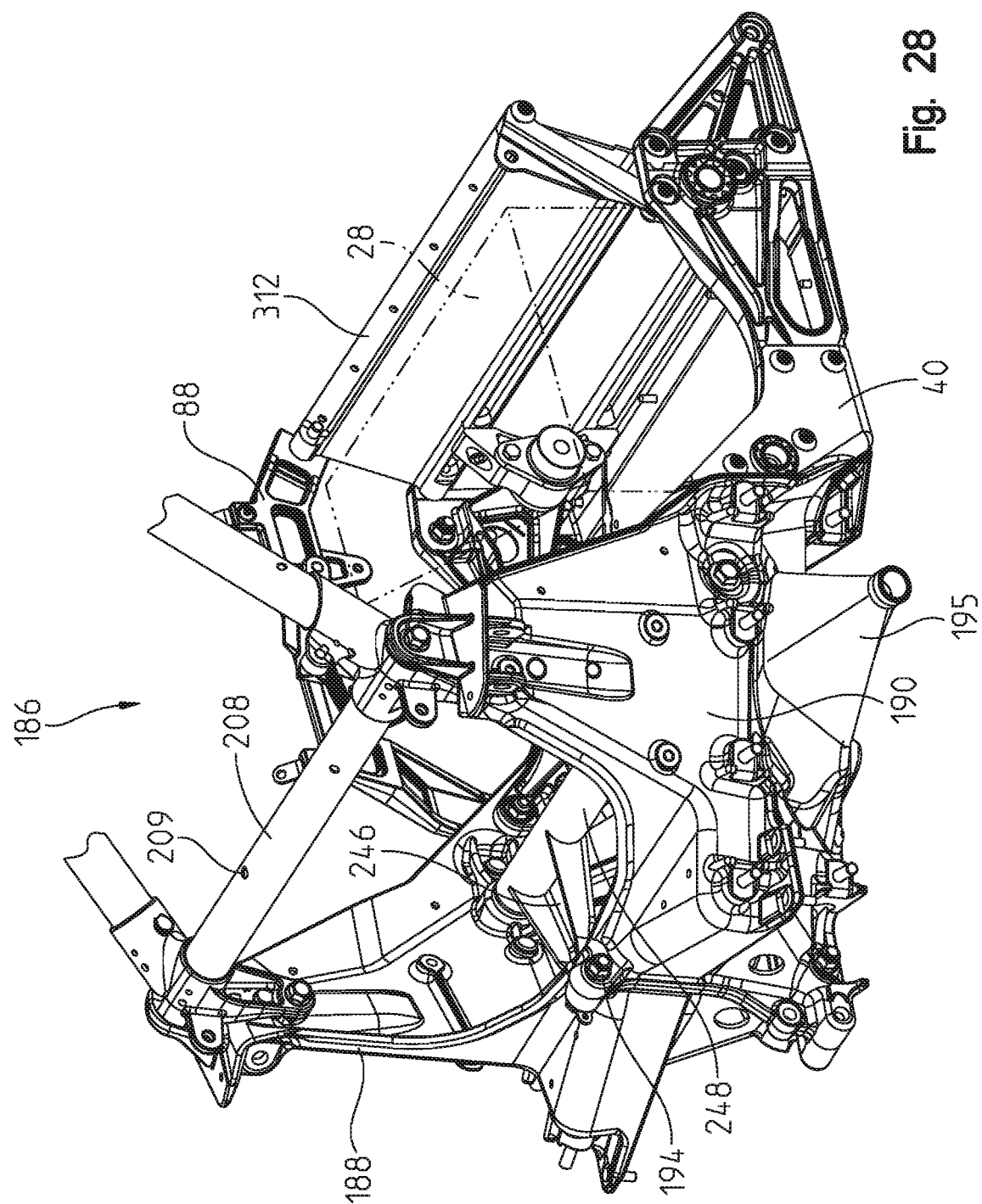
FIG. 28 is a side perspective view of the front frame portion of the snowmobile and including a brace tube.

With reference now to FIGS. 1A-4, and 28, frame 12 includes a bulkhead 186 coupled to tunnel 39. Bulkhead 186 comprises a front casting having mirror image castings 188 and 190 (FIG. 28). Bulkhead 186 extends along the right (denoted as 186a) and left side (denoted as 186b) of front frame portion 12a. Bulkhead 186 further comprises an engine cradle 40 coupled to right and left castings 188, 190 to support power train unit 30. Engine cradle 40 includes a plurality of bushings to support engine 28 therein. Bulkhead member 186a illustratively supports belt drive assembly 34 and bulkhead member 186b illustratively supports clutch assembly 32 (FIGS. 1A and 1B).

Figure 3:
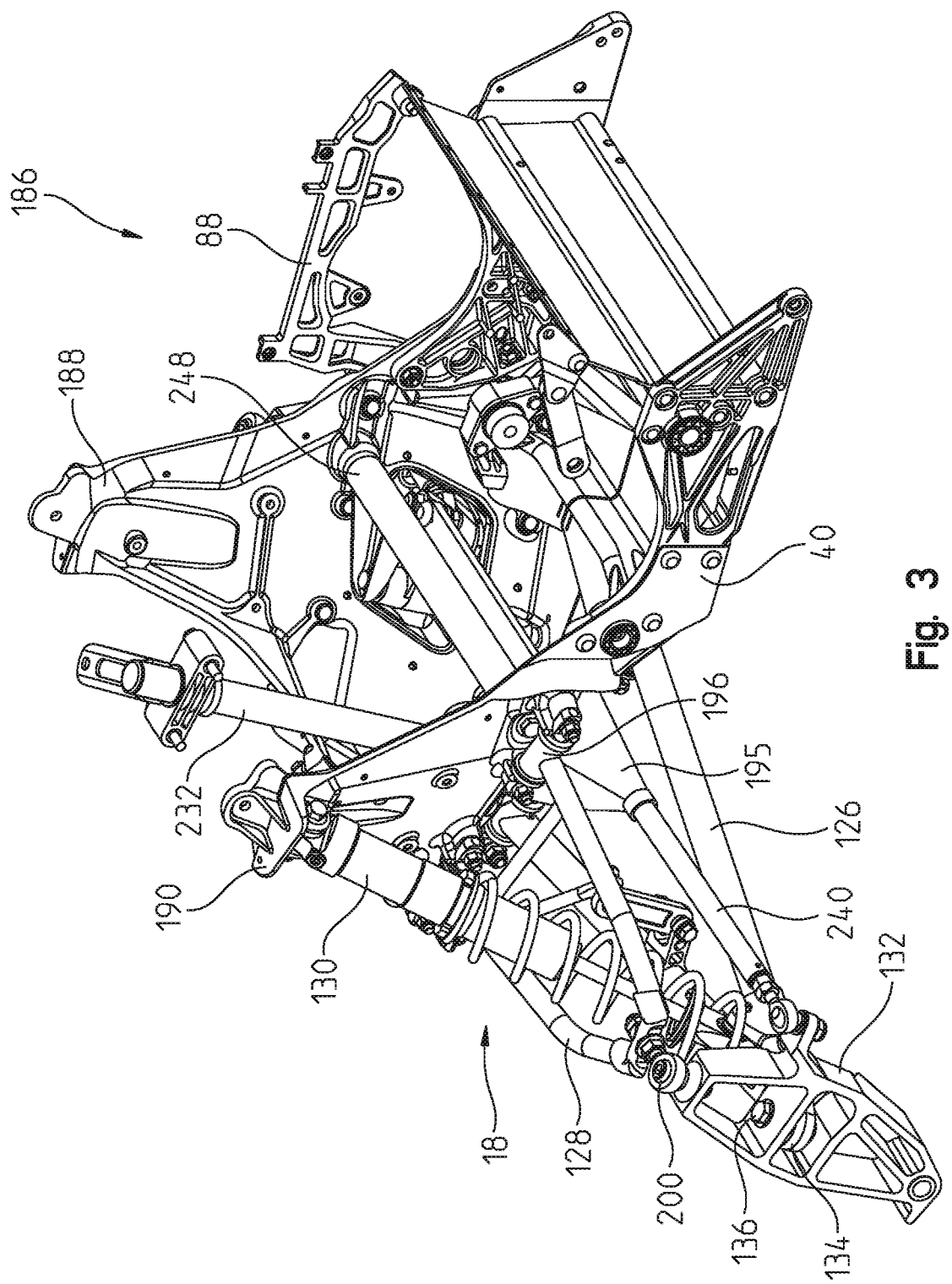
FIG. 3 is a rear perspective view of a front frame portion of the illustrative snowmobile.
Figure 4:
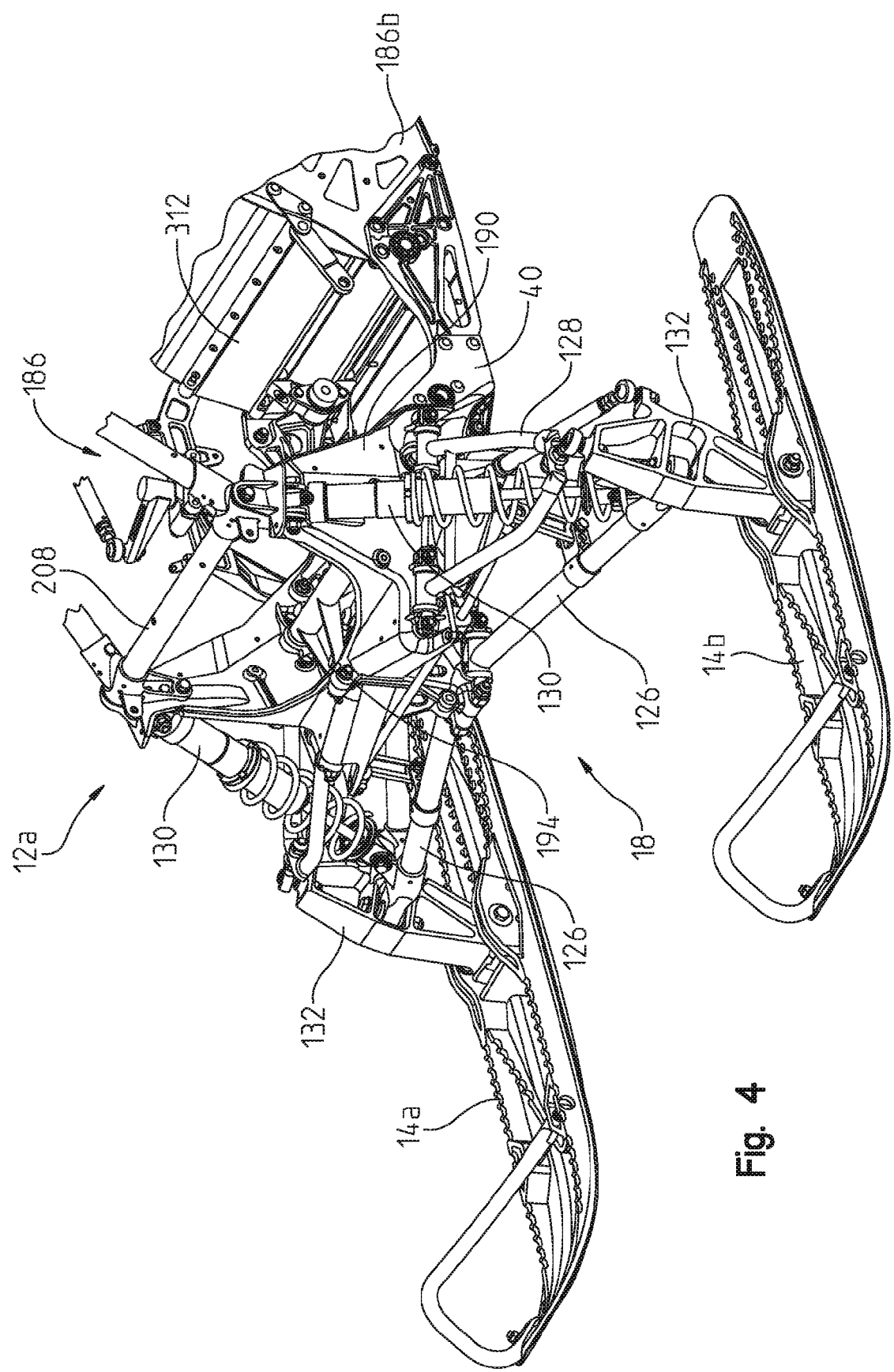
FIG. 4 is a front perspective view of the front frame portion and front suspension assembly of the illustrative snowmobile.

As best shown in FIGS. 1B and 3, engine 28 is coupled to an exhaust assembly 86 which receives exhaust gases from engine 28. Exhaust assembly 86 is in fluid communication with a resonator 87 to expel the exhaust gases from a fluid port (not shown) in resonator 87. Resonator 87 is coupled to a resonator mount 88 supported by bulkhead 186. In particular, resonator mount 88 is adjacent bulkhead member 186a and spans engine cradle 40. Resonator mount 88 has spring connections for coupling to resonator 87. The construction and materials of resonator mount 88 may contribute to an overall weight reduction of snowmobile 10 relative to a conventional mounting apparatus (e.g., a saddle mount).

Referring to FIGS. 5-16, engine 28 is operably coupled to clutch assembly 32 through the crankshaft (not shown) of engine 28. More particularly, clutch assembly 32 couples engine 28 to drive shaft 36. Clutch assembly also includes a housing 33. While illustrative clutch assembly 32 includes a CVT, clutch assembly 32 may embody other types of clutches. As is known, a CVT includes a drive clutch (not shown), which is operably coupled to engine 28, and a driven clutch 44. Driven clutch 44 is illustratively supported by bulkhead member 186b (FIG. 6) and is coupled to the drive clutch through a drive belt (not shown).

Driven clutch 44 is operably coupled to drive shaft 36 through belt drive assembly 34 and jackshaft 38, as further detailed hereinafter. Belt drive assembly 34 includes a housing 46, an upper sprocket 48, a lower sprocket 50, and a belt 52. As illustrated in FIG. 1B, housing 46 is supported by bulkhead 186, illustratively bulkhead member 186a, and is coupled thereto with conventional fasteners. Upper sprocket 48 is operably coupled to lower sprocket 50 with belt 52. Illustrative upper sprocket 48 has a smaller diameter than that of lower sprocket 50, however, the size of upper and lower sprockets 48, 50 may change to accommodate different gearing ratios.

Referring to FIGS. 5-11, upper sprocket 48 includes a hub 56 and a center portion 58. Hub 56 includes outer teeth 54 that rotatably couple with belt 52, and a guide flange 49 to retain belt 52 on upper sprocket 48. Guide flange 49 extends from the outer side of upper sprocket 48 and is adjacent outer teeth 54. Hub 56 is integrally formed around center portion 58, and more particularly, is cast around center portion 58. Center portion 58 includes an inner spline 60 which operably couples upper sprocket 48 to jackshaft 38. Center portion 58 also includes a profiled outer surface. Illustratively, the profiled outer surface of center portion 58 includes extension members 62, which may be teeth, projections, guides, cogs, ribs, or other members extending from center portion 58. The profiled outer surface of center portion 58 may also be otherwise formed, such as with indentations, recesses, or grooves, for example. Illustratively, portions of hub 56 are cast between extension members 62 of center portion 58.

Lower sprocket 50 also includes a hub 66 and a center portion 68. Hub 66 includes outer teeth 64 and a guide flange 70. Outer teeth 64 rotatably couple belt 52 to lower sprocket 50. Guide flange 70 extends outwardly from the inner surface of lower sprocket 50 and is adjacent to outer teeth 64. Guide flange 70 of lower sprocket 50 cooperates with guide flange 49 of upper sprocket 48 to closely align the center of gravity of belt 52 with the center of gravity of upper and lower sprockets 48, 50.

Similar to upper sprocket 48, hub 66 of lower sprocket 50 is integrally formed around center portion 68, more particularly, is cast around center portion 68. Center portion 68 includes an inner spline 72 which operably couples lower sprocket 50 to drive shaft 36. Center portion 68 also includes a profiled outer surface. Illustratively, the profiled outer surface of center portion 68 includes extension members 74, which may be teeth, projections, guides, cogs, ribs, or other members extending from center portion 68.

Referring to FIGS. 7-10, center portions 58, 68 may be comprised of metal, for example a powdered metal, and formed through a conventional sintering process. Center portions 58, 68 are formed prior to forming upper and lower sprockets 48, 50. For example, center portions 58, 68 are formed and positioned within a cast or mold prior to casting upper and lower sprockets 48, 50 so as to be integrally formed in the center portion of upper and lower sprockets 48, 50.

After casting, upper and lower sprockets 48, 50 may be coated or plated. In one embodiment of the present disclosure, illustrative upper and lower sprockets 48, 50 are electroplated with a metal. The metal may be nickel or chrome, for example. During the plating process, center portions 58, 68 may be covered, masked, or otherwise sealed to prevent damaging or undesirably altering center portions 58, 68. Upper and lower sprockets 48, 50 may also undergo further treatment processes, such as etching.

Figure 11:
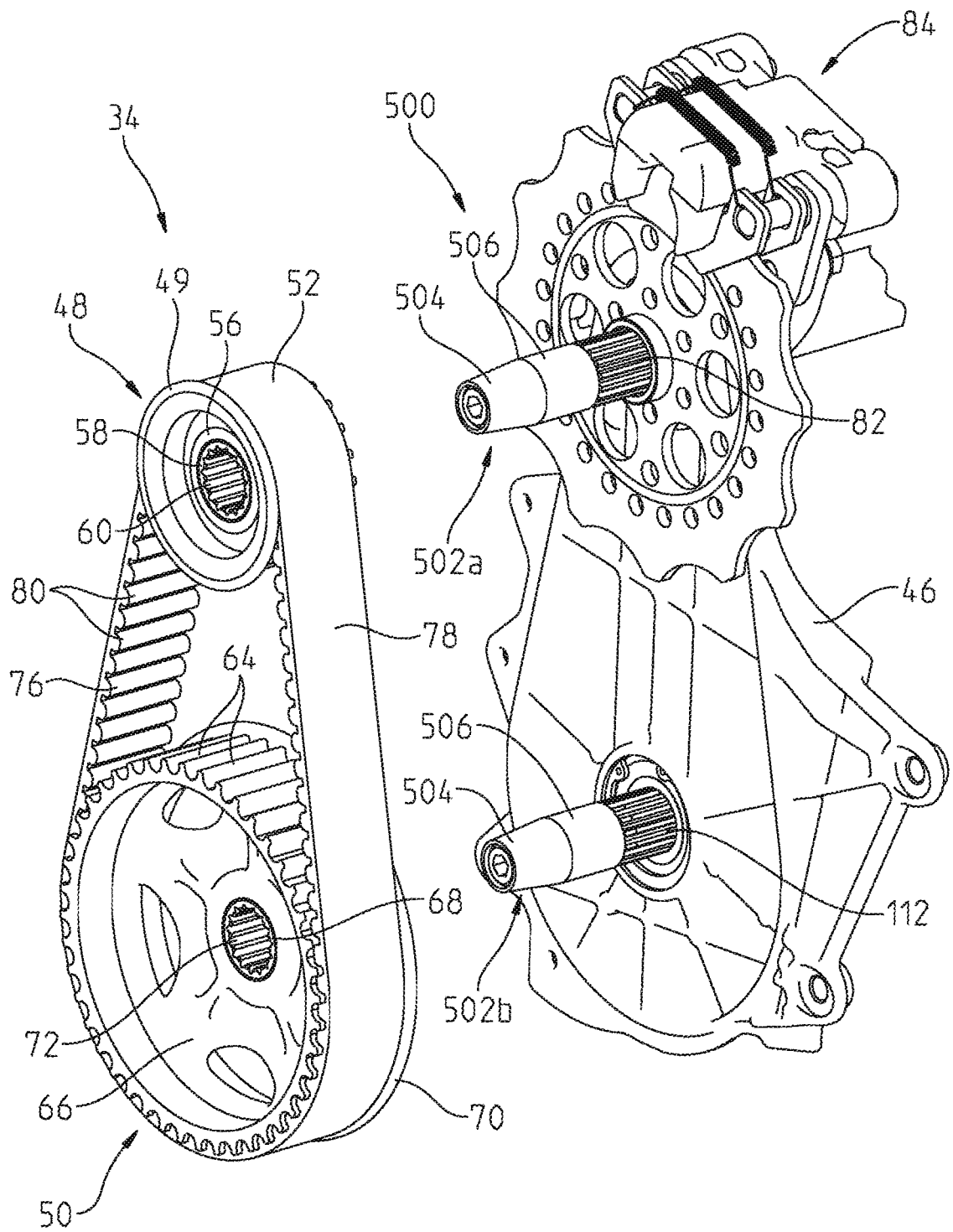
FIG. 11 is a side perspective view of a tool for assembling a belt drive shaft of the present disclosure.

Referring to FIG. 11, belt 52 is a toothed belt drive and has an inner toothed surface 76 and an outer surface 78 forming a circle in cross-section. Belt 52 may be comprised of a polymeric material, for example rubber. Outer surface 78 is generally flat or smooth. Inner surface 76 includes teeth 80 which are sized to receive outer teeth 54, 64 of upper and lower sprockets 48, 50, respectively.

Belt drive assembly 34 is a synchronous, perfect pitch assembly. More particularly, belt 52 is in perfect tension when assembled with upper and lower sprockets 48, 50. To ensure that belt drive assembly 34 is in perfect tension, upper sprocket 48 and lower sprocket 50 are assembled with belt 52 before coupling with jackshaft 38 and drive shaft 36, respectively. More particularly, upper sprocket 48 threadedly couples with teeth 82 of jackshaft 38 and lower sprocket 50 threadedly couples with teeth 112 of drive shaft, as further detailed hereinafter.

As shown in FIG. 11, a tool 500, or other device, may be used to assemble belt drive assembly 34 in perfect tension. Tool 500 includes pins 502a, 502b which may be used to simultaneously mount upper and lower sprockets 48, 50 and belt 52 to jackshaft 38 and drive shaft 36. Illustratively, pins 502 include a first end portion 504 and a second end portion 506. First end portions 504 of pins 502 are tapered or otherwise angled relative to second end portion 506. The diameter of second end portion 506 is slightly smaller than the inner diameter of inner splines 60, 72 of upper and lower sprockets 48, 50. Likewise, the diameter of second end portion 506 is slightly smaller than the outer diameter of teeth 82 of jackshaft 38 and teeth 112 of drive shaft 36.

During assembly of belt drive assembly 34, pins 502 are coupled to the outermost surface of teeth 82 and 112 and extend outwardly therefrom. Belt 52 is assembled around upper and lower sprockets 48, 50. Upper and lower sprockets 48, 50 simultaneously slide onto first end portion 504 and along second end portion 506 of pins 502a, 502b, respectively. As such, upper and lower sprockets 48, 50, along with belt 52, slide onto teeth 82, 112 of jackshaft 38 and drive shaft 36, respectively. After assembly of belt drive 34, pins 502 may be removed and fasteners are used to couple belt drive assembly with jackshaft 38 and drive shaft 36. Belt 52 remains in perfect tension with upper and lower sprockets 48, 50 during assembly of belt drive assembly 34.

Belt drive assembly 34 may replace a traditional chain drive assembly because belt 52, rather than a chain, is used with upper and lower sprockets 48, 50. Without a chain, belt drive assembly 34 does not require an oil pan or a sealed chain case. Furthermore, because belt drive assembly 34 does not include a chain and is in perfect tension, a tensioner also is not required. As such, the weight of illustrative belt drive assembly 34 may be less than that of a traditional chain drive assembly. By decreasing the weight of belt drive assembly 34, the weight and inertia of power train assembly 30 also may be reduced, thereby reducing the weight of snowmobile 10. Additionally, belt drive assembly 34 requires less maintenance than a chain drive assembly because belt drive assembly 34 does not experience traditional maintenance problems, such as oil leaks.

Figure 6:
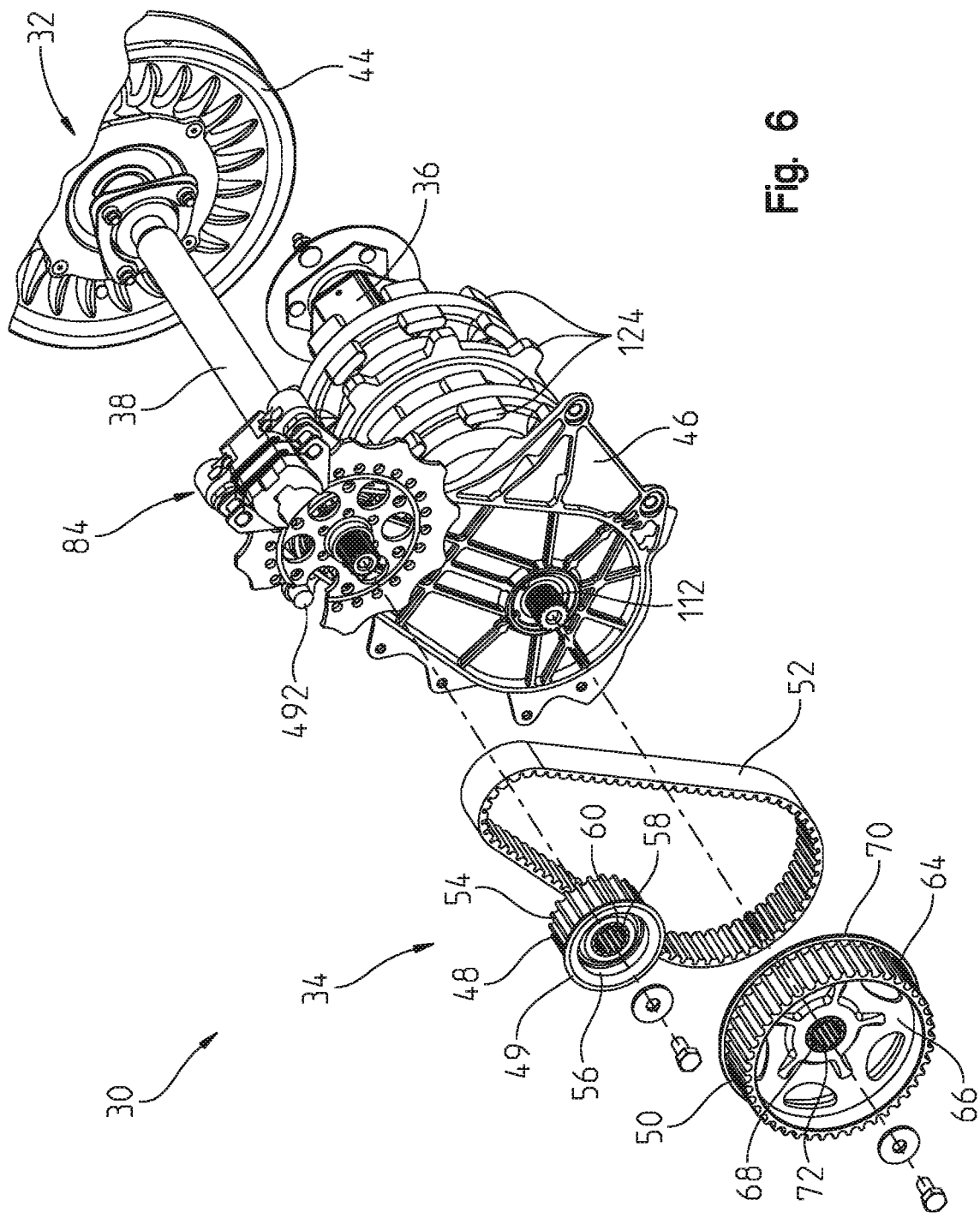
FIG. 6 is an exploded view of the portion of the power train unit of FIG. 5.

As detailed above and shown in FIGS. 5 and 6, upper sprocket 48 of belt drive assembly 34 is coupled to driven clutch 44 of clutch assembly 32 via jackshaft 38. Jackshaft 38 includes a first portion 38a and a second portion 38b. More particularly, jackshaft 38 may be gun drilled or formed through similar methods such that second portion 38b is substantially hollow and may receive first portion 38a therein. Illustrative first portion 38a is coupled to driven clutch 44 with conventional fasteners (e.g., bolts, rivets). Illustrative second portion 38b includes teeth 82 (FIG. 11), that couple with inner spline 60 of upper sprocket 48. It may be appreciated that the substantially hollow, two-piece construction of gun drilled jackshaft 38 also reduces the overall weight of snowmobile 10.

In one embodiment of the present disclosure, a speed sensor 492 (FIG. 6) may be positioned adjacent upper sprocket 48 and brake assembly 84. Speed sensor 492 is in electronic communication with an engine control unit ("ECU") (not shown) to determine the speed (e.g., in miles per hour during) operation of snowmobile 10. Alternative embodiments of speed sensor 492 may determine the speed by recording a number of pulses per unit time. The ECU is programmed to receive a signal from speed sensor 492 indicative of a measurement per unit time and to output a speed in miles/hour on a display (not shown) that is visible to the rider. Speed sensor 492 may be calibrated in order to accommodate various gearing ratios of belt drive assembly 34.

As previously detailed, lower sprocket 50 is coupled to drive shaft 36. As illustrated in FIGS. 5, 6, 11, and 35, drive shaft 36 is coupled to frame 12 below jackshaft 38. Referring to FIGS. 12-15, a drive shaft assembly includes drive shaft 36, which has an interior portion 90 and an external surface 92 extending between first and second ends 94, 96. The drive shaft assembly also includes a first end cap 108 and a second end cap 118. Illustratively, external surface 92 of drive shaft 36 defines a hexagon in cross-section formed by six apexes 93 and six sides 95. Certain illustrative embodiments of drive shaft 36 may define other shapes in cross-section (e.g., a circle). The hexagonal shape of drive shaft 36 may facilitate torque transfer when additional driving force is exerted on drive shaft 36. Drive shaft 36 is comprised of an extrudable material, for example aluminum, and formed through conventional extrusion processes.

Figure 14A:
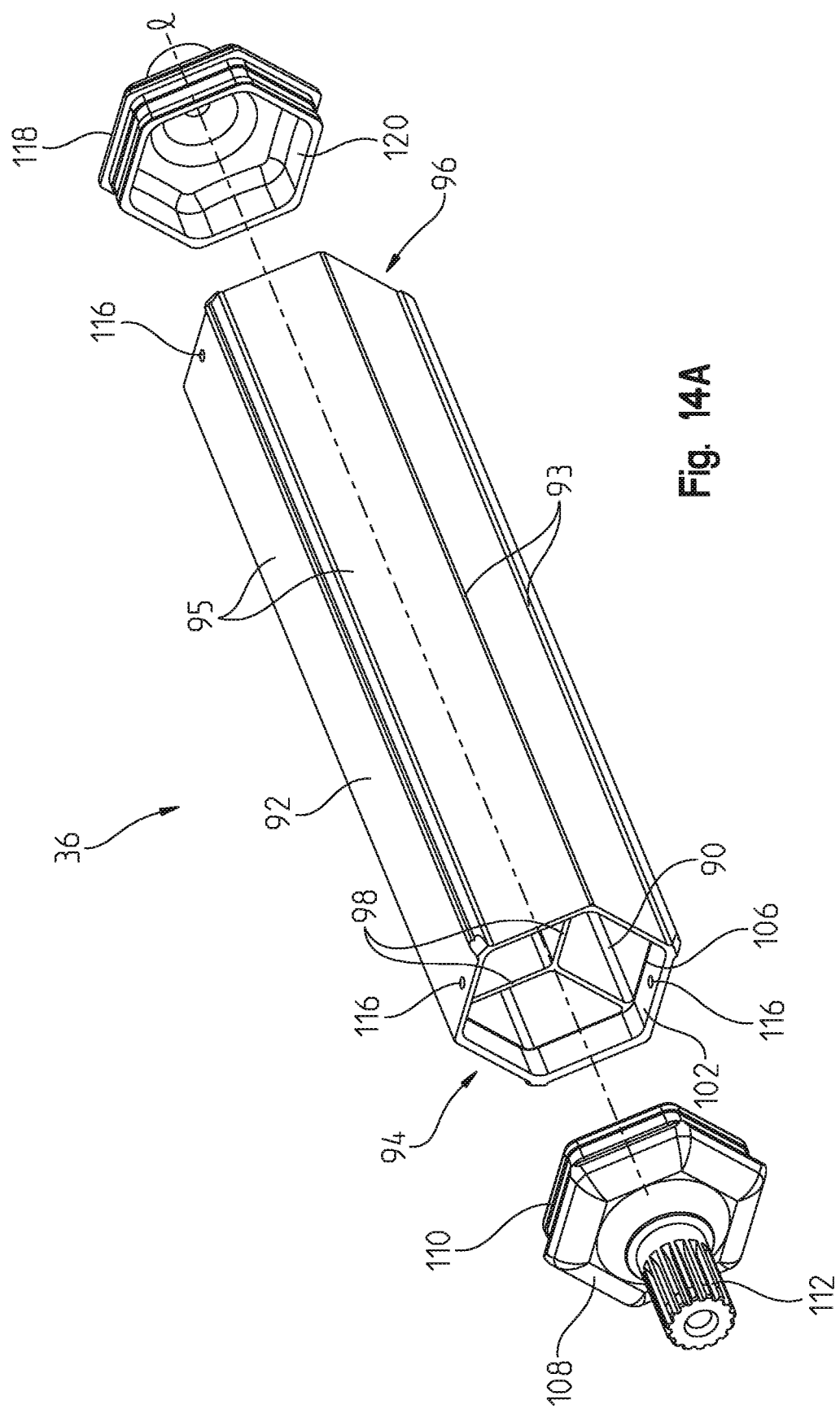
FIG. 14A is an exploded view of the illustrative drive shaft of FIG. 12.
Figure 14B:
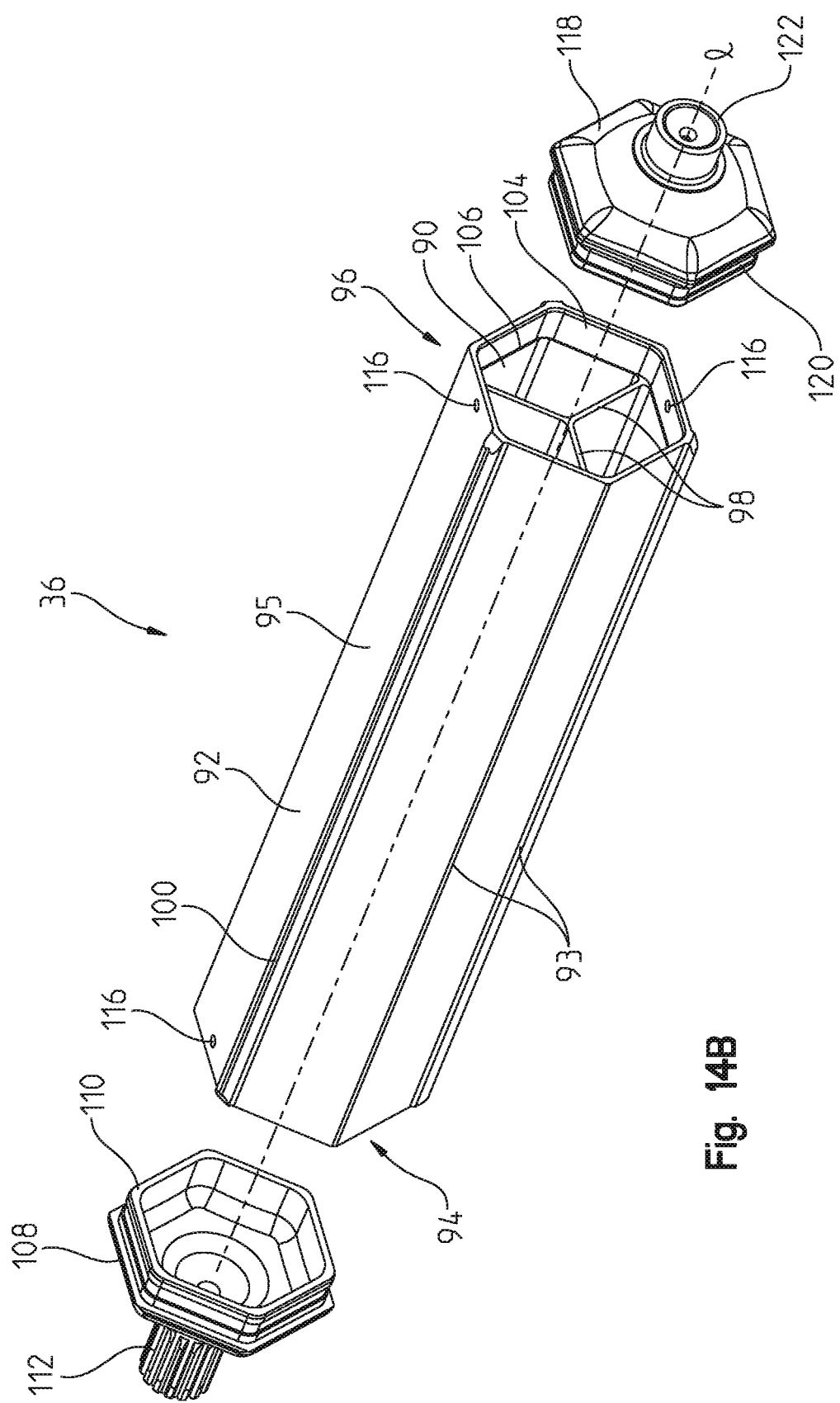
FIG. 14B is a further exploded view of the illustrative drive shaft.

Illustrative interior portion 90 of drive shaft 36 includes internal ribs 98 extending substantially along the length of drive shaft 36. As shown in FIGS. 16-20, internal ribs 98 are proximate first and second ends 94, 96 but may not extend into first and second ends 94, 96. The illustrative embodiment of drive shaft 36 includes three internal ribs 98, however, the number of internal ribs 98 may vary to accommodate specific materials, shapes of drive shaft 36, applications of snowmobile 10, and torque loads. Internal ribs 98 define three substantially hollow channels within interior portion 90 of drive shaft 36. More particularly, internal ribs 98 intersect apexes 93 in an alternating pattern. As such, illustrative internal ribs are spaced apart from each other by at least one apex 93 and at least two sides 95. Additionally, internal ribs 98 intersect each other along a longitudinal axis ρ of drive shaft 36, as shown in FIGS. 14A and 14B. In one embodiment, drive shaft 36 defines a circle in cross-section and interior portion 90 does not include internal ribs 98.

As further shown in FIGS. 12-16, external surface 92 may include external ribs 100. Illustratively, external ribs 100 extend outwardly from external surface 92 and are positioned at alternating apexes 93 of drive shaft 36. As with internal ribs 98, external ribs 100 are spaced apart from each other by at least an apex 93 and at least two sides 95. More particularly, external ribs 100 are positioned at one apex 93 that is not intersected by internal ribs 98. As such, external ribs 100 are positioned between internal ribs 98. By alternating the arrangement of external ribs 100 and internal ribs 98, external ribs 100 provide rigidity and strength to the portions of drive shaft 36 that do not include internal ribs 98. Furthermore, additional driving force may be exerted on drive shaft 36 because external ribs 100 facilitate torque transfer to endless track 16 as further described herein.

First and second ends 94, 96 of the drive shaft assembly each includes coupling portions 102, 104, respectively. Coupling portions 102, 104 may be machined or otherwise formed in first and second ends 94, 96 such that a lip 106 is formed between interior portion 90 and coupling portions 102, 104. Internal ribs 98 do not overlap coupling portions 102, 104, however, external ribs 100 may overlap coupling portions 102, 104.

First end 94 of drive shaft 36 couples with first end cap 108 that is received within coupling portion 102. First end cap 108 includes a complementary coupling portion 110 that supports teeth 112. In particular, teeth 112 couples with splines 72 of lower sprocket 50 of belt drive assembly 34. As such, the rotation of lower sprocket 50 rotates drive shaft 36 through teeth 112. First end cap 108 may be comprised of forged steel, for example, or other similar materials.

Second end 96 of drive shaft 36 couples with second end cap 118 that is received within coupling portion 104. Second end cap 118 includes a complementary coupling portion 120 and a shaft member 122. In particular, shaft member 122 couples with frame 12, specifically bulkhead member 186a, to support drive shaft 36. Second end cap 118 may be comprised of cast aluminum, for example, or other similar materials.

Similar to drive shaft 36, first and second end caps 108, 118 are hexagonal in cross-section. First and second end caps 108, 118 may be press fit within coupling portions 102, 104, respectively, in order to adhesively bond complementary coupling portions 110, 120 and coupling portions 102, 104.

Figure 15:
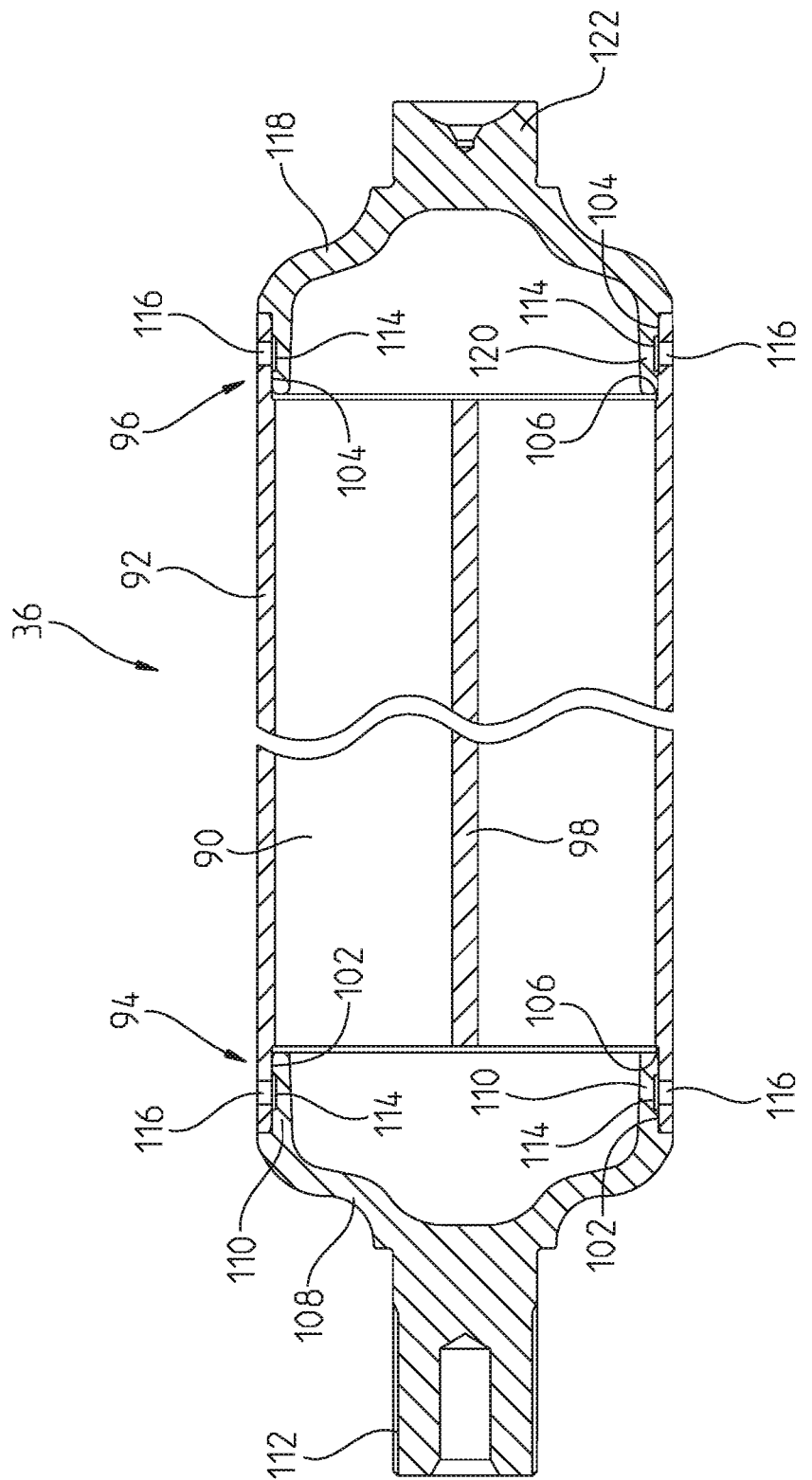
FIG. 15 is a cross-sectional view of an adhesive cavity formed by the illustrative drive shaft.

Still referring to FIG. 15, the connections between complementary coupling portions 110, 120 and respective coupling portions 102, 104 define adhesive cavities 114. Adhesive cavities 114 are axially bounded on one end by lip 106. Illustratively, adhesive cavities 114 include two adhesive ports 116, which increase the uniformity of the adhesive within adhesive cavity 114. Alternative embodiments of adhesive cavities 114 may include one adhesive port 116, or three or more adhesive ports 116. In one embodiment, mechanical fasteners (not shown) also are used to couple first and second end caps 108, 118 to drive shaft 36.

The dimensions of adhesive cavities 114 correlates to the thickness of adhesive in adhesive cavities 114, which determines the strength of the joint formed by the adhesive, as further detailed in U.S. Patent Application Publication No. 2011/0139528, filed on Feb. 14, 2011, the complete disclosure of which is expressly incorporated by reference herein. If the thickness of the adhesive in adhesive cavities 114 is too thin, the resulting joints formed by coupling portions 102, 104 and complementary coupling portions 110, 120 may be weak. If the thickness of the adhesive is too great, the resulting joint may not properly transfer the load on drive shaft 36. In one embodiment of the illustrative drive shaft assembly, the surface of coupling portions 102, 104, and complementary coupling portions 110, 120 are treated prior to bonding. Exemplary surface preparations or treatments include a dry rag wipe, a solvent degrease, a vapor degrease, a mechanical abrasion of the surface, plasma treatment, chemical etching, and anodizing.

The adhesive may be an acrylic adhesive, for example. Exemplary acrylic adhesives are available from Lord Corporation. In one embodiment, the adhesive is combined with an accelerator to promote the curing of the adhesive. The curing time of the adhesive may be accelerated by applying heat during the curing process (e.g., induction heat). In one embodiment, the set time of the adhesive is approximately 20 minutes and the cure time of the adhesive within adhesive cavities 114 is approximately two hours at room temperature.

The drive shaft assembly may be comprised of dissimilar materials. For example, drive shaft 36 and second end cap 110 may be comprised of aluminum. First end cap 108 may be comprised of forged steel. Adhesive allows dissimilar materials to be joined, which also allows the use of materials which are best suited for the operation of the drive shaft assembly. Additionally, certain welding methods, such as spot welding, may not be used to weld dissimilar metals and, as such, may not be used to assemble drive shaft 36. Further, adhesive distributes the load in coupling portions 102, 104 over an area rather than concentrating it at a point or a line as is the case with rivets and welds. Localized stress concentrations formed by drilled holes and welds may adversely affect the material properties, such as fatigue strength. However, adhesive does not adversely affect the fatigue life or strength of the drive shaft assembly. Additionally, welding may cause an imbalance in the drive shaft assembly. However, by using adhesive, the drive shaft assembly may be balanced.

It may be appreciated that the configuration and material composition of the drive shaft assembly contributes to an overall weight reduction of snowmobile 10. More particularly, lightweight materials, such as aluminum and adhesive, reduce the weight and rotational inertia of the drive shaft assembly. Additionally, the substantially hollow configuration of drive shaft 36 further reduces the weight of the drive shaft assembly. Therefore, the weight of snowmobile 10 is reduced. By reducing the overall weight, snowmobile 10 may roll and tilt onto its side more easily, thereby requiring less effort from a rider to maneuver snowmobile 10. For example, illustrative snowmobile 10 may weigh approximately 419 pounds. Furthermore, by assembling the drive shaft assembly with dissimilar metals and adhesive, torque transfer may improve and additional driving torque may be exerted on the drive shaft assembly. It is to be understood that other shafts or components of snowmobile 10 may be similarly constructed (e.g., jackshaft 38).

Figure 16:
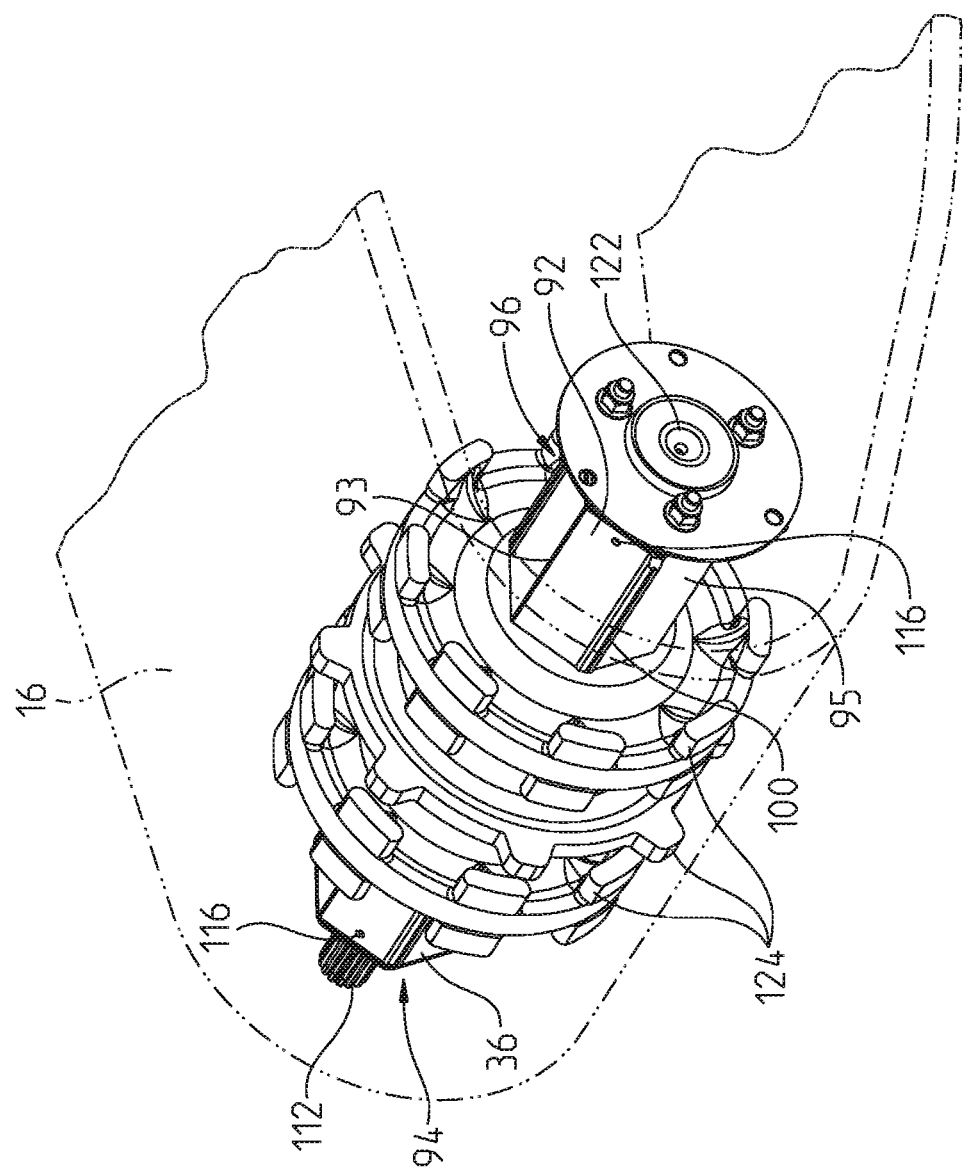
FIG. 16 is a side plan view of an endless track of the illustrative snowmobile supported on the drive shaft.

Referring to FIG. 16, the drive shaft assembly may support endless track 16 on drive sprockets 124. Drive sprockets 124 slide onto external surface 92 of drive shaft 36 and are press fit to external ribs 100. Endless track 16 rotates with drive shaft 36 on drive sprockets 124 in order to move snowmobile 10. As mentioned above, external ribs 100 are provided on drive shaft 36. Ribs 100 engage within slots 125 on drive sprockets 124 to assist in torque transfer (FIG. 5).

Figure 17:
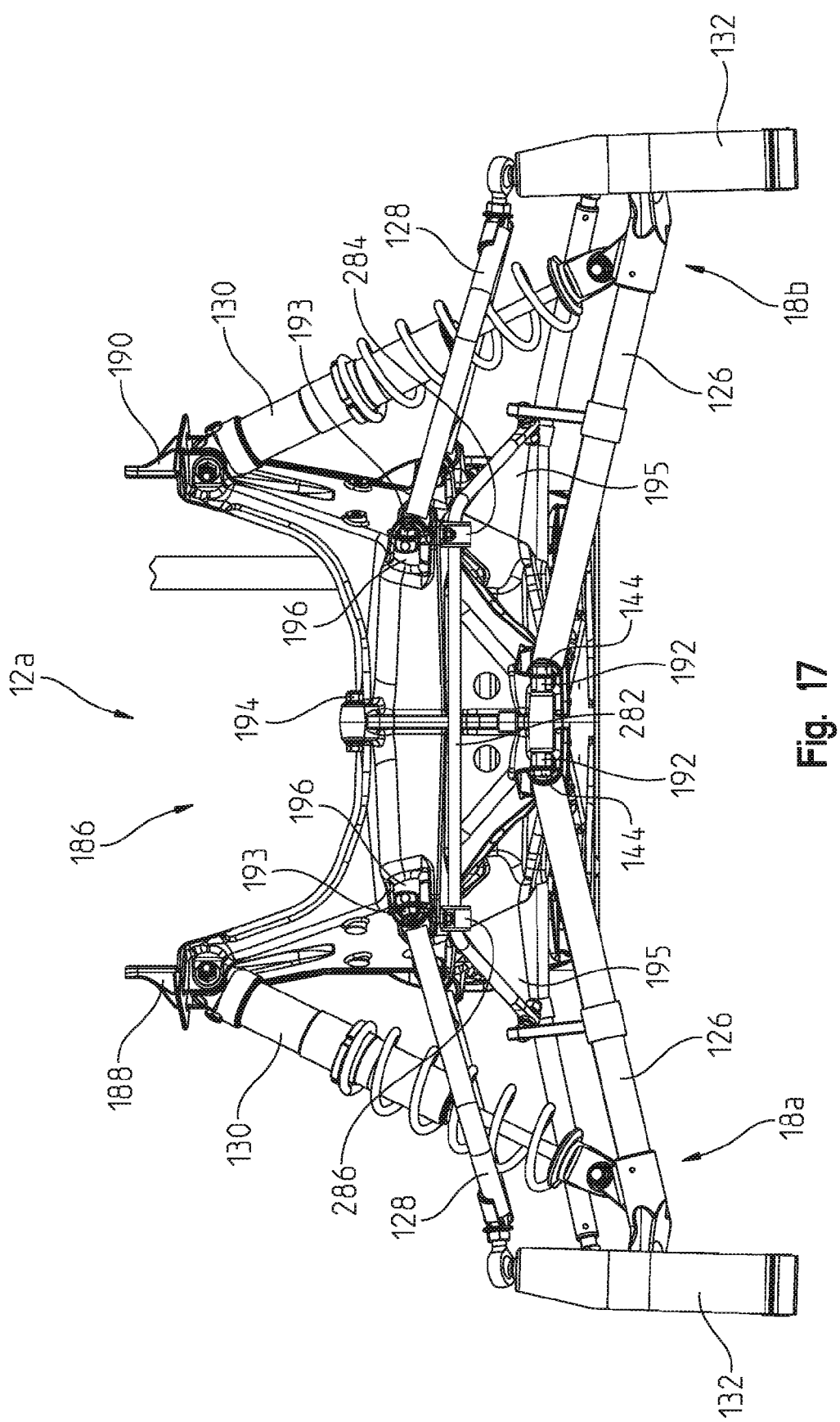
FIG. 17 is a front view of the front frame portion of the snowmobile of the present disclosure.
Figure 18:
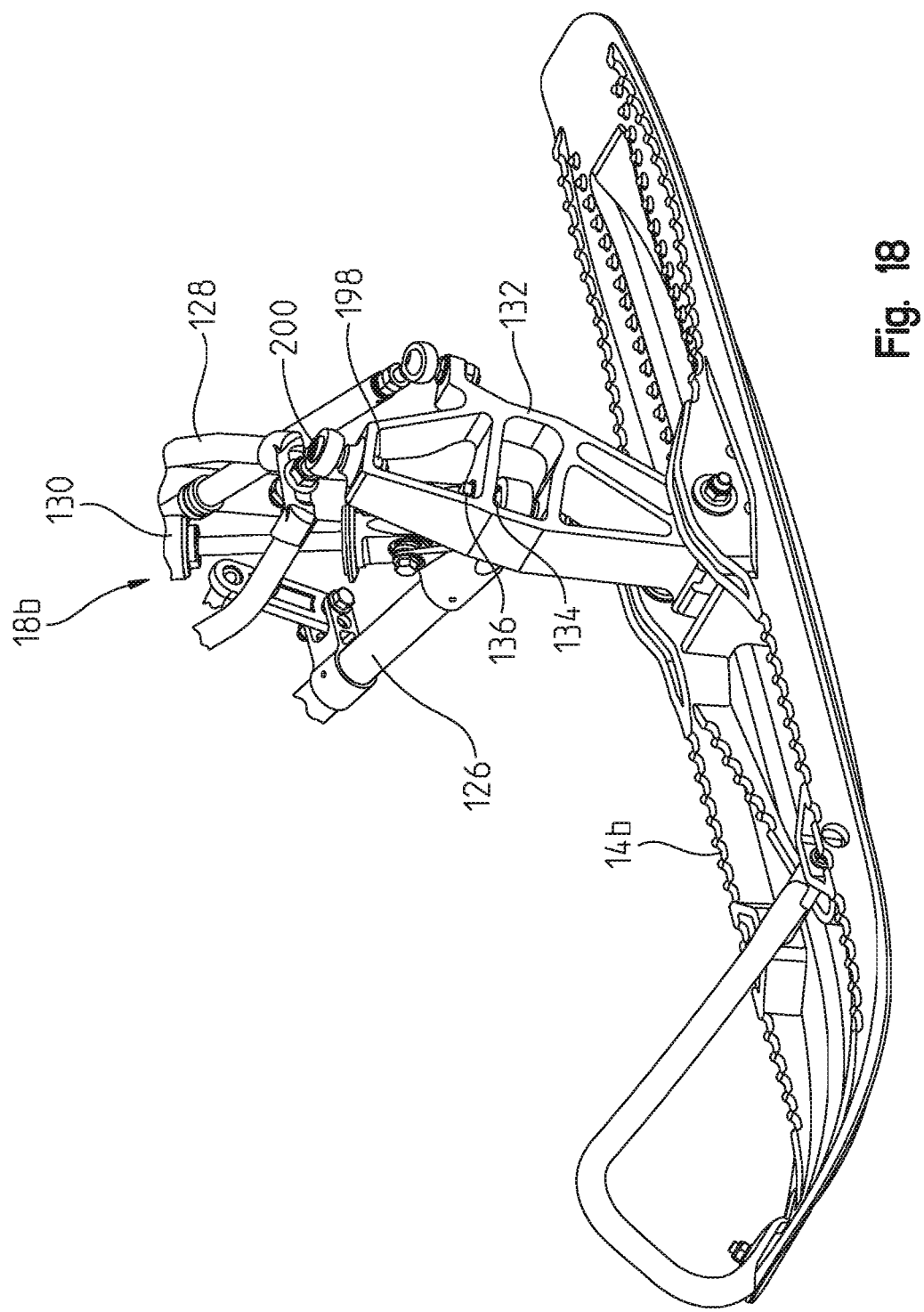
FIG. 18 is a perspective view of the front suspension and a ski of the snowmobile.
Figure 19:
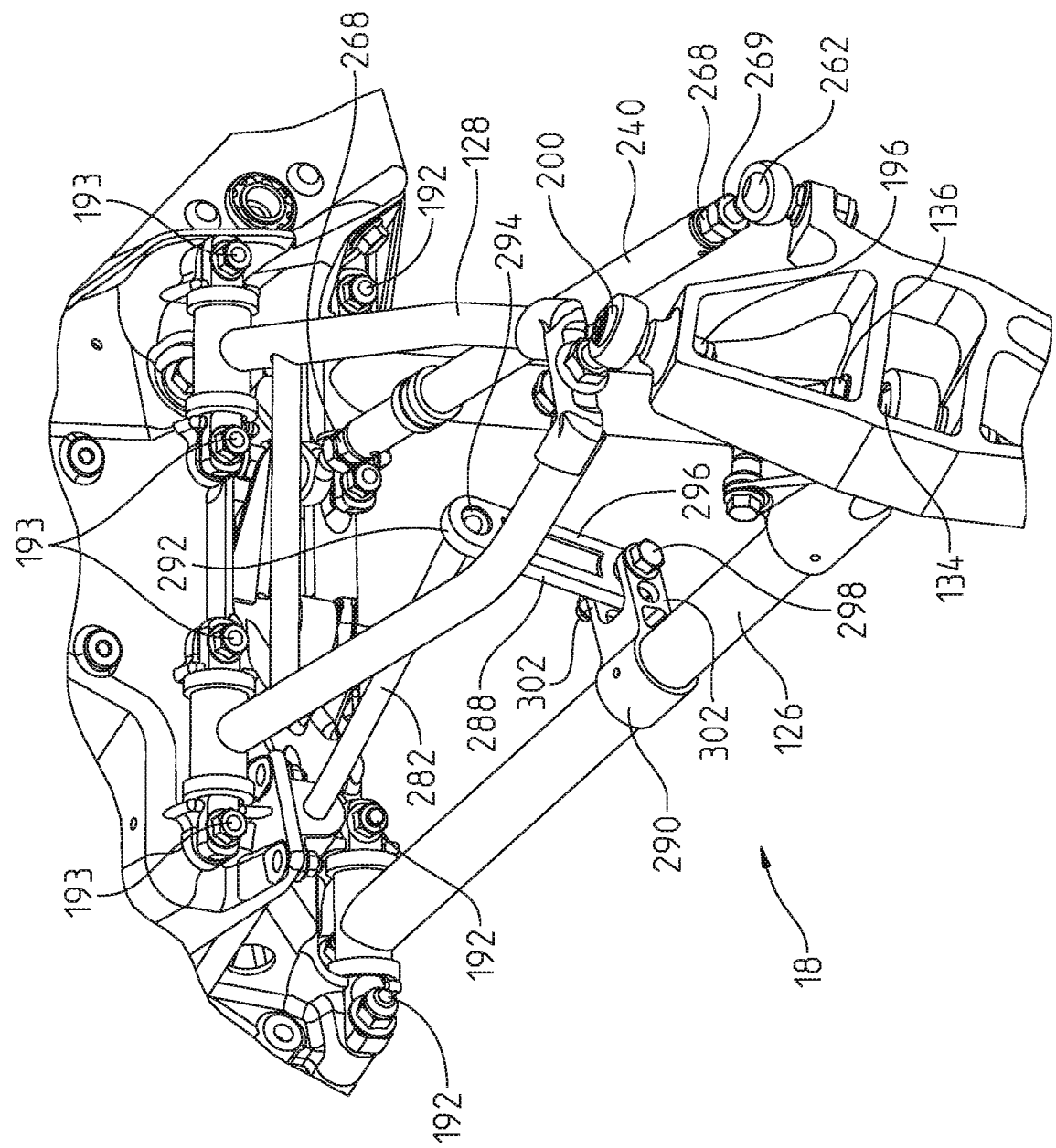
FIG. 19 is a further perspective view of the front suspension of the snowmobile.

Referring to FIGS. 17-19, in addition to endless track 16, front skis 14 facilitate the movement of snowmobile 10. More particularly, front skis 14 include right ski 14a and left ski 14b, which are operably coupled to front suspension assembly 18. Front suspension assembly 18 includes right suspension 18a and left suspension 18b, each of which includes a lower control arm 126, an upper control arm 128, a linear force element, illustratively a shock absorber 130, and a spindle 132. Front frame portion 12a is coupled to skis 14 through front suspension assembly 18.

Lower and upper control arms 126, 128 of both right and left suspensions 18a, 18b are operably coupled to spindles 132 through moveable joints 134 and 200, respectively. Moveable joints 134, 200 may be secured to spindles 132 with mechanical fasteners 136, 198, respectively. Illustratively, joints 134, 200 are ball joints and mechanical fasteners 136, 198 may be bolts (FIG. 18), although other embodiments of moveable joints and mechanical fasteners may be used.

Figure 20A:
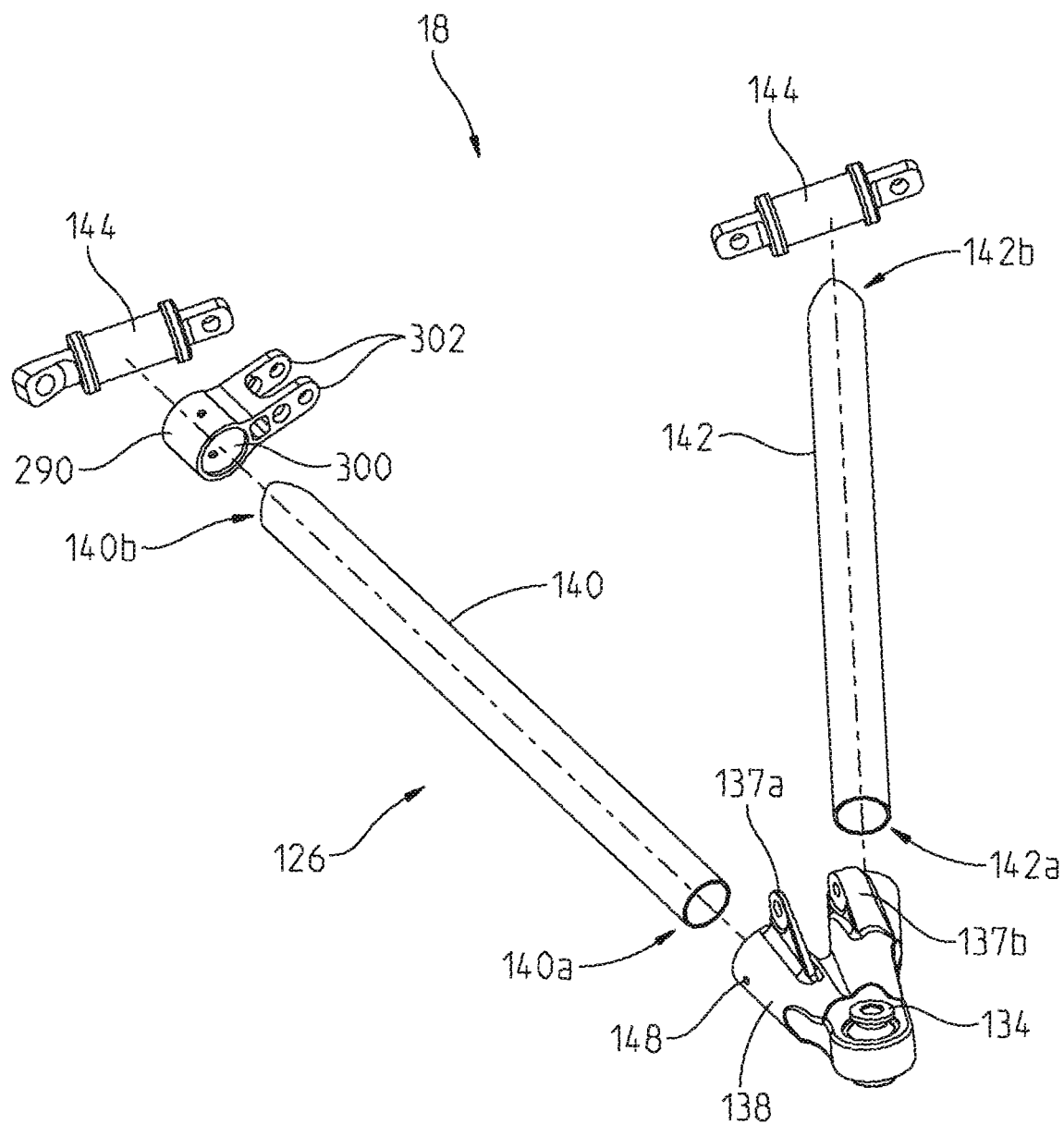
FIG. 20A is an exploded view of the lower control arm of the front suspension of FIG. 19.
Figure 20B:
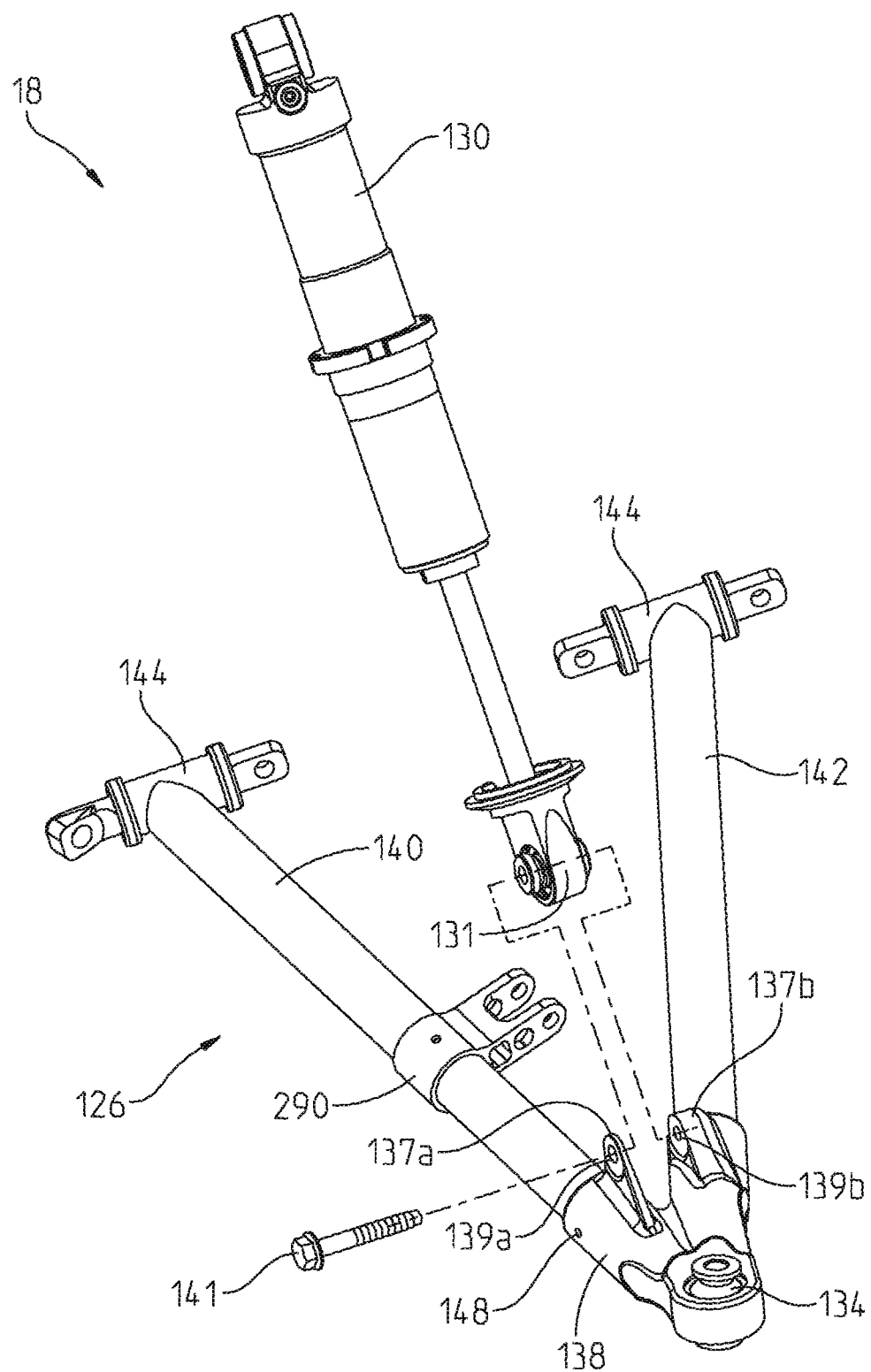
FIG. 20B is an exploded view of a shock absorber of the front suspension coupled to the lower control arm.

Lower control arms 126 include coupling members 138, which couple a first arm 140 and a second arm 142 to joints 134 and to each other, as shown in FIGS. 20A and 20B. Additionally, shock absorbers 130 may extend through upper control arms 128 and are pivotally coupled to lower control arms 126 via coupling members 138. As best shown in FIG. 20B, shock absorber 130 includes coupling portion 131, which may be threadedly coupled to coupling member 138. In particular, coupling member 138 may be cast or otherwise formed to include extensions 137a, 137b. Extensions 137a, 137b receive a fastener, illustratively a bolt 141, through openings 139a, 139b, respectively. Opening 139b is internally threaded such that the threaded end of bolt 141 is received within and threadedly coupled to extension 137b. As such, bolt 141 may be threadedly connected to front suspension 18 without the use of a nut or other fastening member.

Referring to FIG. 20A, first arm 140 includes a first end 140a and a second end 140b, and second arm 142 includes a first end 142a and a second end 142b. First ends 140a, 142a of respective first and second arms 140, 142 are coupled to coupling member 138 while second ends 140b, 142b are coupled to bearing members 144. Bearing members 144 couple first and second arms 140, 142 to front frame portion 12a, as further detailed hereinafter.

First and second arms 140, 142 are bonded to coupling member 138 and bearing members 144 with an adhesive material, such as those available from Lord Corporation and detailed herein. In one embodiment, mechanical fasteners (not shown) also are used to couple first and second arms 140, 142 to coupling member 138 and bearing members 144. By using adhesive, welding is not required to assemble lower control arms 126.

Figure 21A:
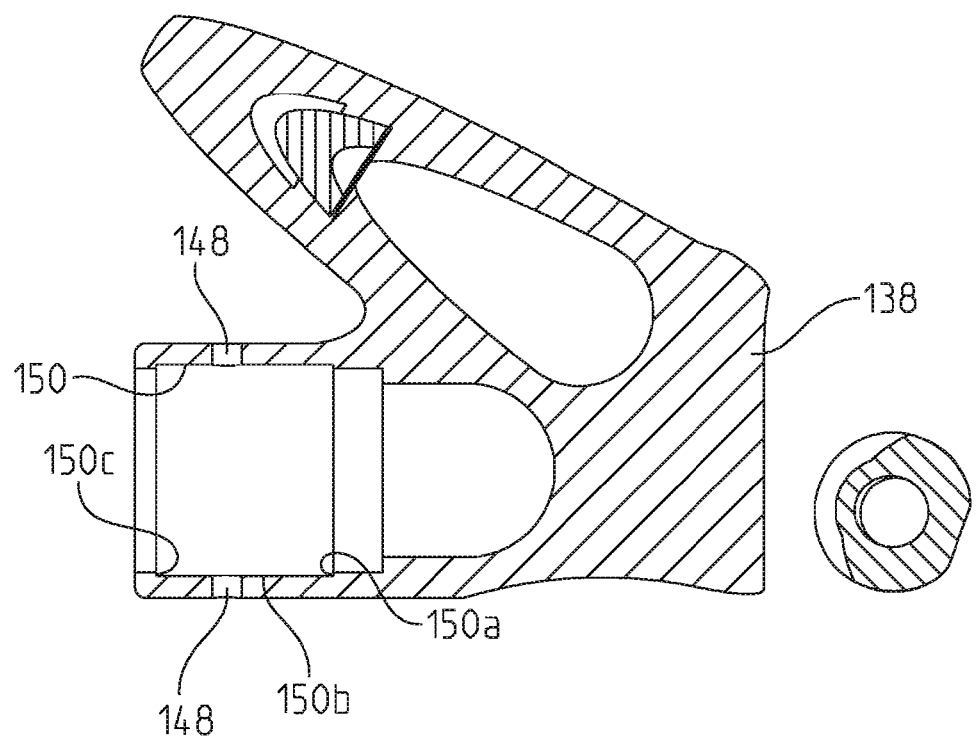
FIG. 21A is a cross-sectional view of a bracket of the lower control arm of FIG. 20.
Figure 21B:
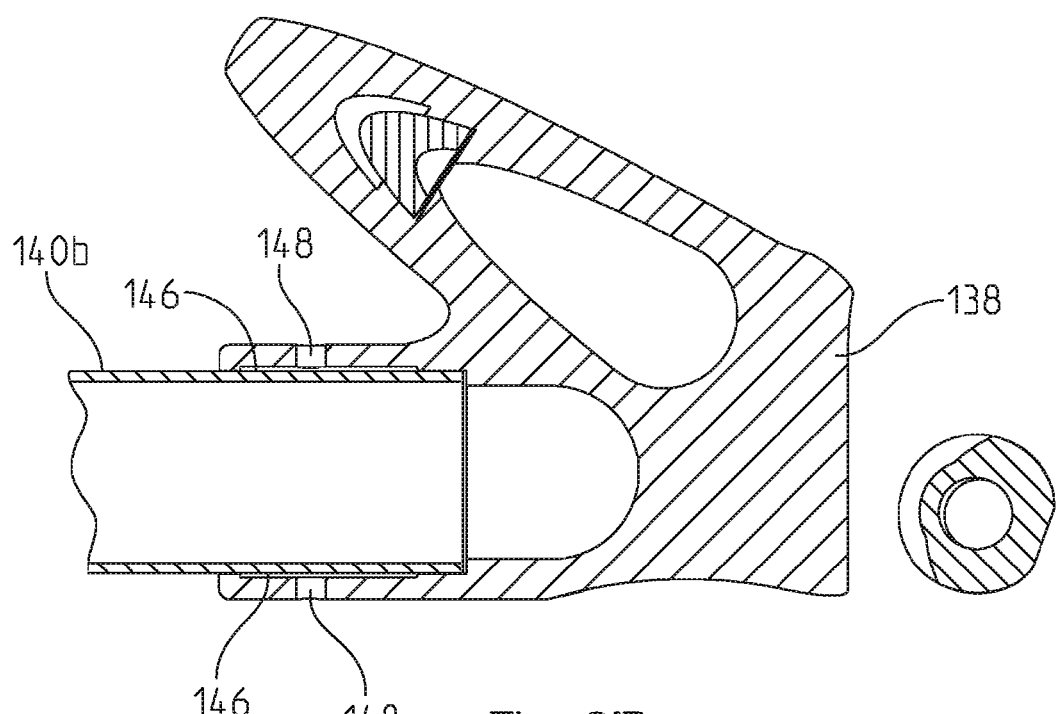
FIG. 21B is a cross-sectional view of an adhesive cavity formed by the lower control arm of and the bracket of FIG. 21A.

When first ends 140a, 142a are inserted into coupling member 138, an adhesive cavity 146 is defined, as illustrated in FIG. 21B. Coupling member 138 may include a recess 150 (FIG. 21A) that defines at least three boundary surfaces 150a, 150b, 150c of adhesive cavity 146. Coupling member 138 illustratively includes two adhesive ports 148 for uniformly applying the adhesive. More particularly, the adhesive is applied to adhesive cavity 146 in shear. Specifically, first and second arms 140, 142 are slidably received within coupling member 138 when the adhesive is applied in order to bond and cure the adhesive in shear. Shear is the strongest loading mechanism and, therefore, sufficiently assembles lower control arm 126 for snowmobile applications.

Adhesive cavity 146 may be treated or prepared before the adhesive is applied therein. Exemplary surface preparations include a dry rag wipe, a solvent degrease, a vapor degrease, a mechanical abrasion of the surface, plasma treatment, chemical etching, and anodizing. First and second arms 140, 142 also may be adhesively bonded with bearing members 144 according to the same illustrative method. Additionally, alternative embodiments of the present disclosure may adhesively bond upper control arms 128 according to the illustrative method.

Lower control arms 136 may be comprised of dissimilar materials. For example, the illustrative embodiment of first and second arms 140, 142 are comprised of high-strength, thin wall materials, such as non-weldable aluminum, heat-treated steel, and/or carbon fiber materials. Coupling member 138 and bearing members 144 may be comprised of high-strength aluminum or plastic. Unlike certain welding methods (e.g., spot welding, adhesive may be used to join dissimilar materials. Additionally, welding may cause portions of lower control arms 126 to be thicker than is required for front suspension assembly 18 and increase the weight of front suspension assembly 18. Furthermore, welding may cause fatigue scatter, distortion, and variations in lower control arms 126 due to concentrated areas of stress formed during the welding process. As such, welding may affect the fatigue strength and life of lower control arm 26. Conversely, adhesive distributes the load in lower control arms 126 over an area rather than concentrating it at a point or a line as is the case with welds. As such, adhesive does not adversely affect the fatigue life and strength of lower control arms 126.

Figure 22:
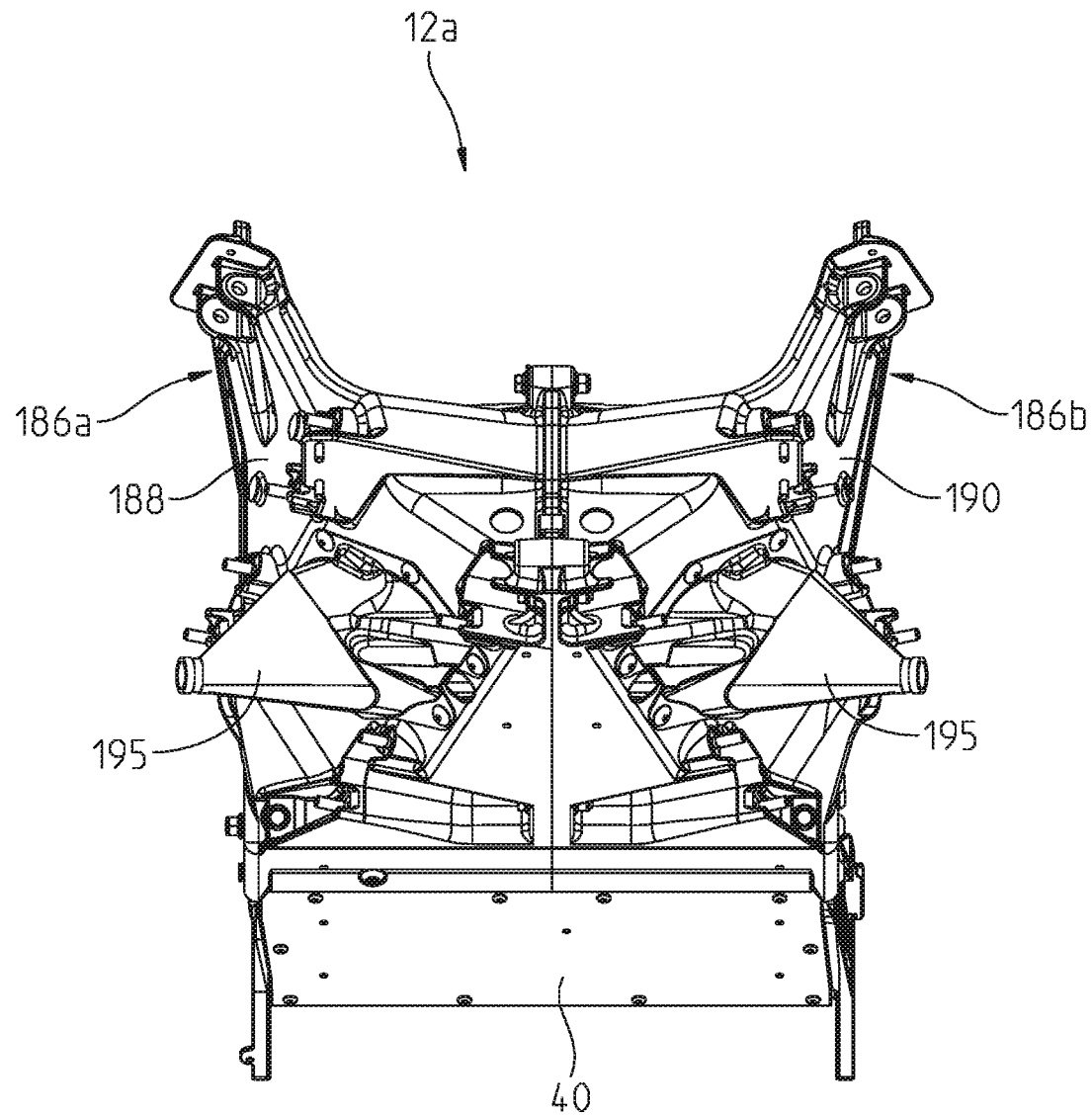
FIG. 22 is bottom perspective view of the front frame portion of the snowmobile.

As shown in FIGS. 17, 19, and 22, front suspension assembly 18 is coupled to front frame portion 12a via right and left castings 188, 190 of bulkhead 186. Specifically, upper and lower control arms 128, 126 are coupled to right and left castings 188, 190 through bearing members 196, 144 and conventional fasteners 193, 192, respectively. As shown in FIG. 9, right and left castings 188, 190 are positioned forward of bulkhead members 186a, 186b, and more particularly, forward of engine cradle 40 and are coupled thereto with a plurality of conventional fasteners, such as bolts. Right and left castings 188, 190 also are coupled to each other through a plurality of conventional fasteners 194. Right and left castings 188, 190 may be formed through conventional casting processes and are generally mirror images of each other. Right and left castings 188, 190 each may include a housing 195 to prevent snow and ice from entering front frame portion 12a.

Figure 23:
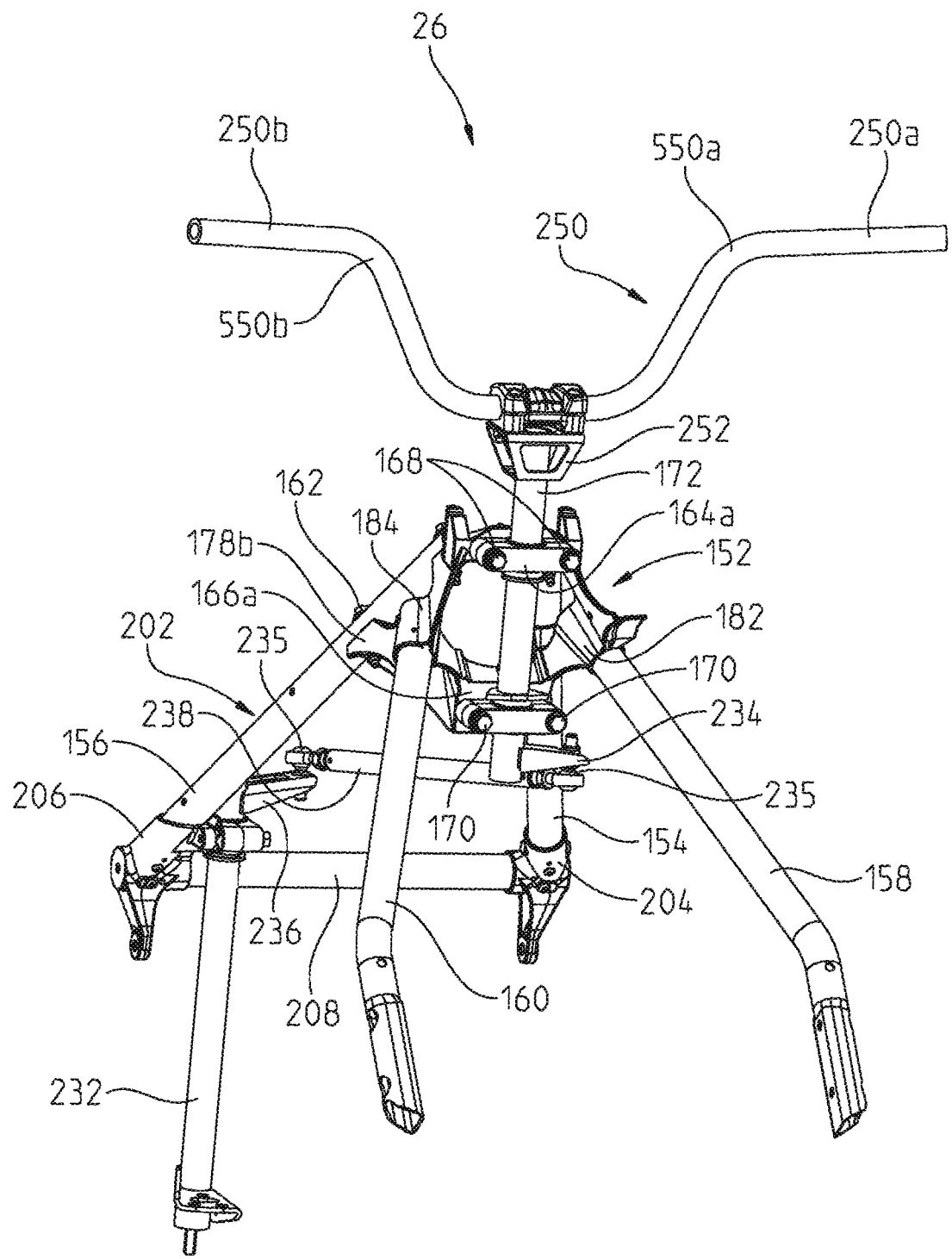
FIG. 23 is a front perspective view of an overstructure of the illustrative front frame portion of the present disclosure.
Figure 24:
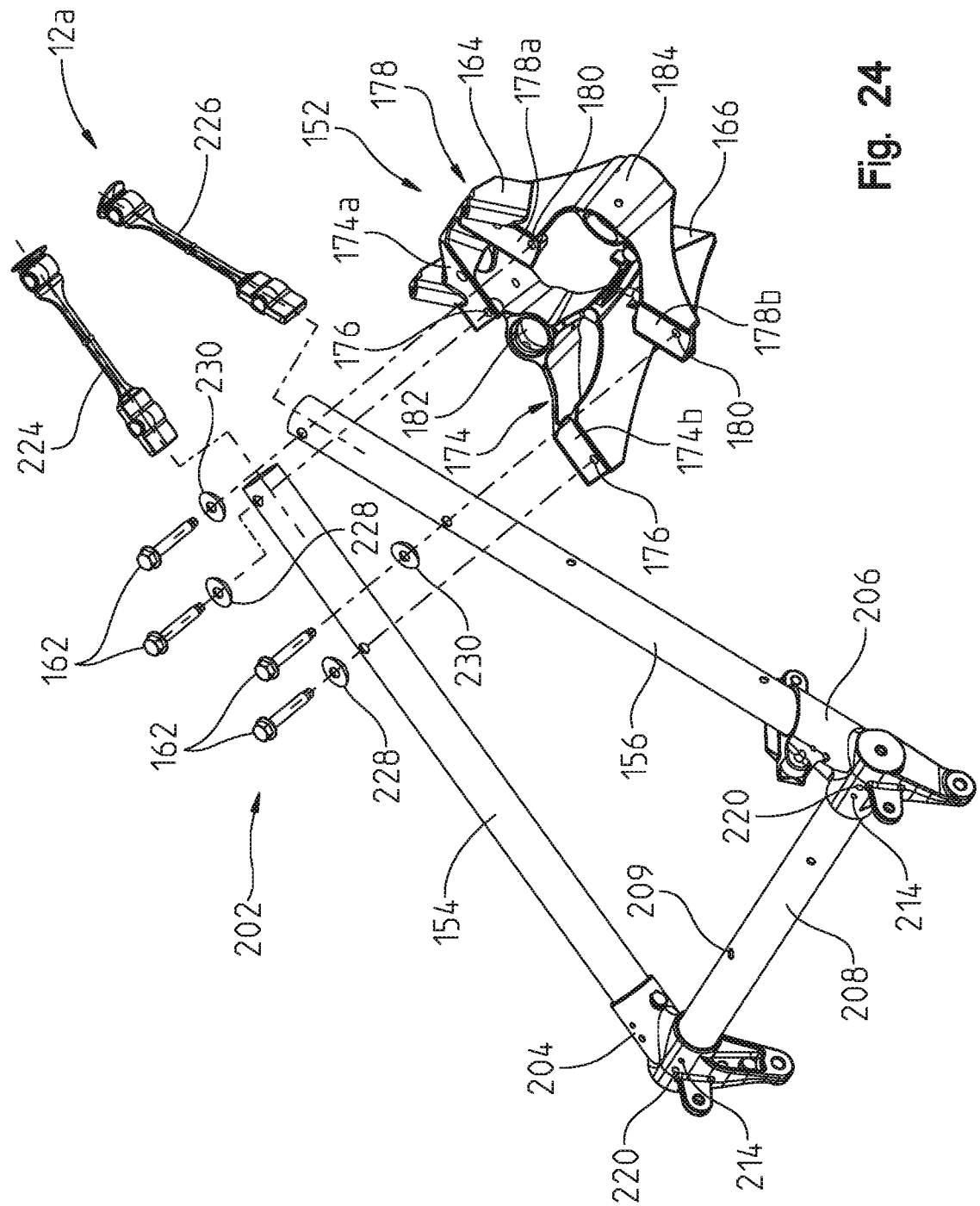
FIG. 24 is an exploded view of the overstructure of FIG. 23.

Referring to FIGS. 23 and 24, an overstructure 202 of front frame portion 12a is coupled to right and left castings 188, 190. Overstructure 202 includes a cast coupling or connector 152 that is configured to attach plural frame tubes, specifically front frame tubes 154, 156 and rear frame tubes 158, 160, thereto. Overstructure 202 further comprises a lower frame tube 208 coupled to front frame tubes 154, 156, as detailed herein.

An upper portion of frame tubes 154, 156, 158, 160 may be attached to connector 152 by way of fasteners 162, and/or may be adhesively fixed to connector 152. As shown, connector 152 further includes two support webs 164, 166. Each support web 164, 166 has threaded apertures 168, 170 for coupling an upper steering post 172 of steering assembly 26 to support webs 164, 166.

Figure 7:
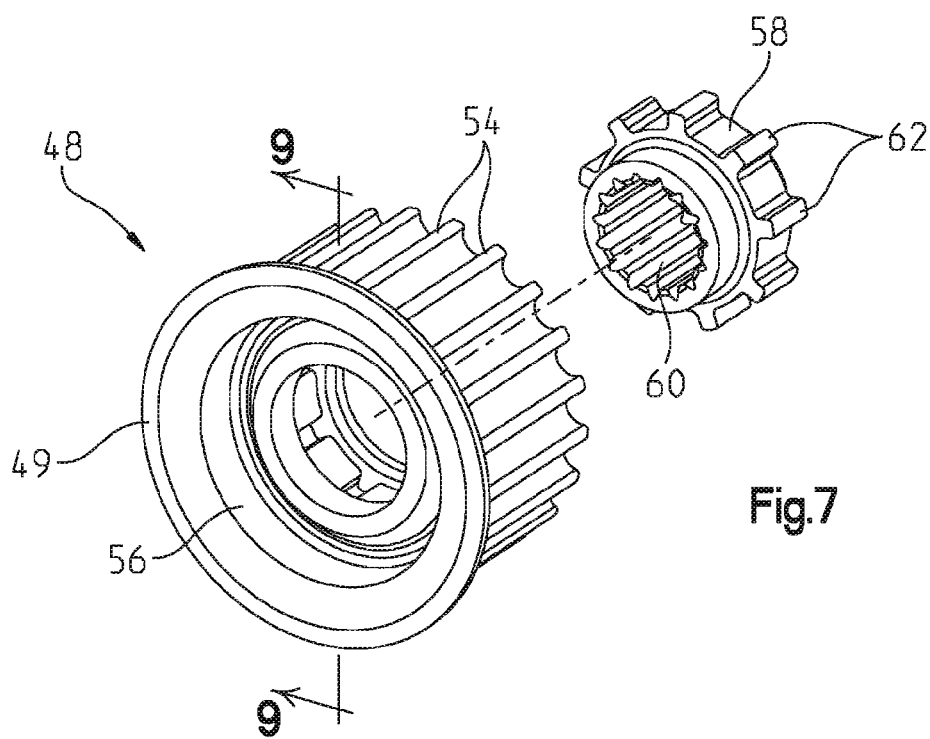
FIG. 7 is an exploded view of an upper sprocket of the illustrative power train unit.
Figure 8:
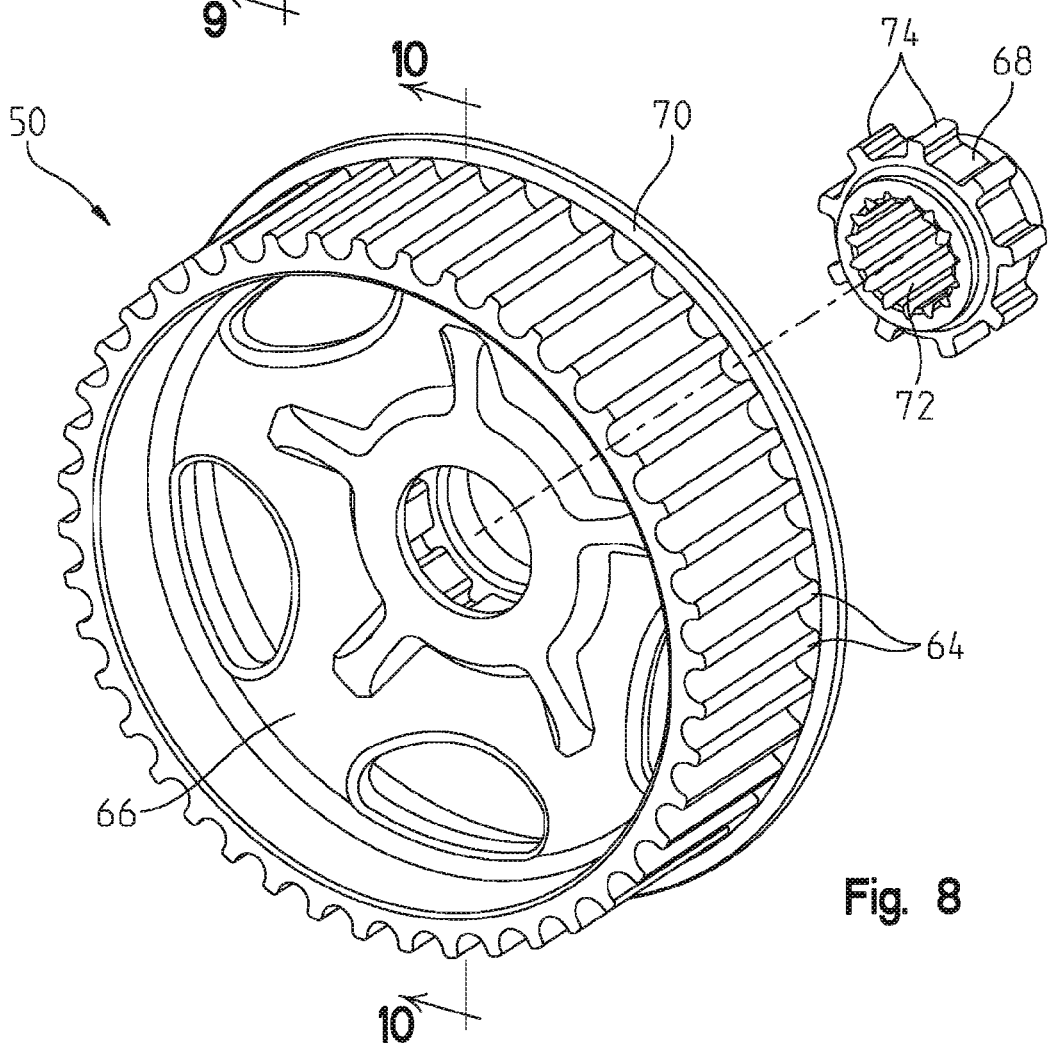
FIG. 8 is an exploded view of a lower sprocket of the illustrative power train unit.

With reference to FIGS. 23 and 24, connector 152 further includes a first circular channel 174 (FIG. 24) defined by portions 174a, 174b having threaded bosses 176 extending downwardly therethrough. A second circular channel 178 is defined by portions 178a, 178b having threaded bosses 180 extending downwardly. Circular channels 174, 178 are intersected by respective first and second cylindrical members 182 and 184. It should be appreciated that the upper portions of front frame tubes 154, 156 are positioned across first and second circular channels 174, 178 and secured with fasteners 162 extending through frame tubes 154, 156 and into threaded bosses 176, 180. Adhesive may also be applied. The upper portions of rear frame tubes 158, 160 are positioned in first and second cylindrical members 182, 184 and may also be secured with fasteners 162 and adhesive. As shown in FIG. 7, a lower portion of rear frame tubes 158, 160 may be coupled to rear frame portion 12b of snowmobile 10.

Front frame tubes 154, 156 may include stiffening inserts 224, 226, respectively (FIG. 24). Stiffening inserts 224, 226 are received within the upper portion of front frame tubes 154, 156. Stiffening inserts 224, 226 are coupled to front frame tubes 154, 156 with fasteners 162. Additionally, shaped spacers, illustratively washers 228, 230, also are coupled to front frame tubes 154, 156 with fasteners 162. Washers 228, 230 are positioned intermediate front frame tubes 154, 156 and fasteners 162. Stiffening inserts 224, 226 and washers 228, 230 provide structural integrity and generally reinforce front frame tubes 154, 156 when fasteners 162 are coupled with threaded bosses 176, 180. In particular, washers 228, 230 and stiffening members 224, 226 prevent deformation of the upper portions of front frame tubes 154, 156 when fasteners 162 are coupled with threaded bosses 176, 180 and tightened against front frame tubes 154, 156.

A lower portion of front frame tubes 154, 156 may be coupled to a plurality of couplers 204, 206, respectively. Illustrative couplers 204, 206 also are coupled to lower frame tube 208. Front frame tubes 154, 156 may be angled relative to lower frame tube 208, such that front frame tubes 154, 156 and lower frame tube 208 illustratively form a triangle.

The various connections within overstructure 202 may be made by traditional mechanical couplings such as bolts, welds, rivets, screws, and other types of fasteners. In one embodiment, at least a portion of the connections of overstructure 202 are made with a structural adhesive. Illustratively, front frame tubes 154, 156 and lower frame tube 208 are bonded to couplers 204, 206 with structural adhesive, as further detailed herein.

Figure 25:
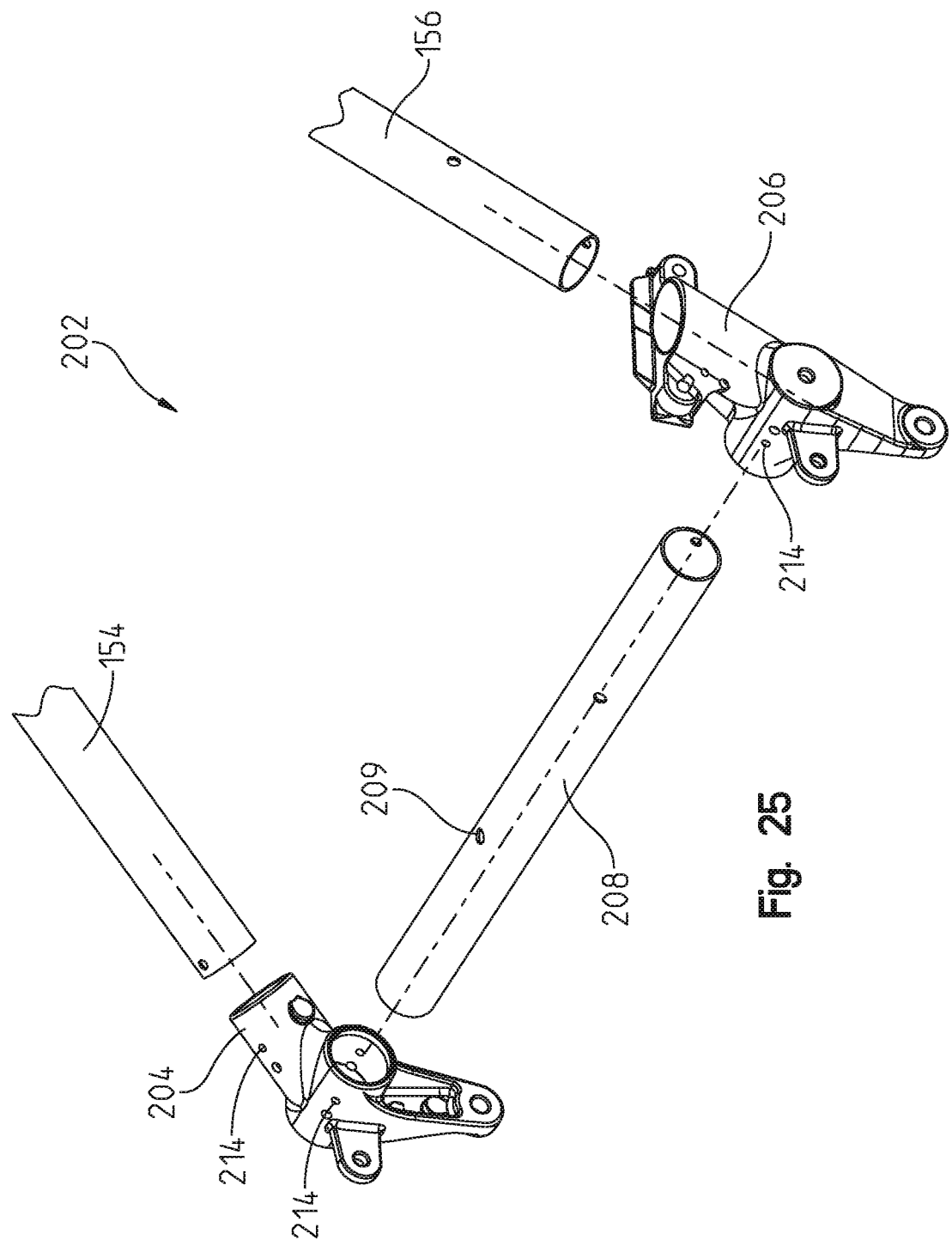
FIG. 25 is an exploded view of a portion of the overstructure of the present disclosure, including frame tubes and couplers.
Figure 26:
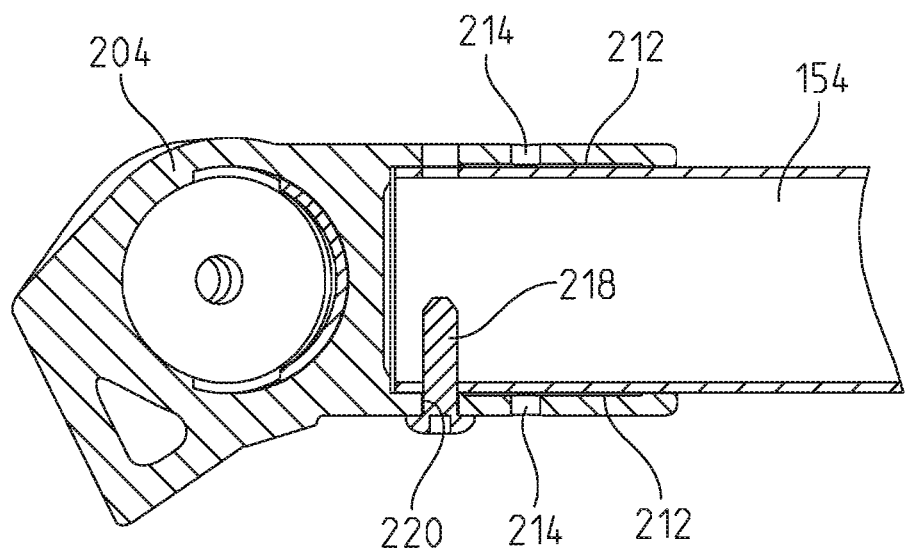
FIG. 26 is a cross-sectional view of an adhesive cavity formed by the frame tubes and couplers of FIG. 25.

Referring to FIGS. 25 and 26, front frame tube 154 and coupler 204 cooperate to define an adhesive cavity 212. Adhesive cavity 212 is defined when front frame tube 154 slides into coupler 204. Front frame tube 154 and coupler 204 may also be secured together by mechanical fasteners 218 which are received through openings 220 in coupler 204. In one embodiment, fasteners 218 are self piercing rivets which pierce through coupler 204 and secure the location of coupler 204 relative to front frame tube 154.

In the illustrative embodiment, adhesive cavity 212 circumscribes front frame tube 154. As illustrated, adhesive cavity 212 includes two ports 214 into which the adhesive may be introduced for more uniform filling of adhesive cavity 212 with the adhesive. In an alternative embodiment, a single adhesive port 214 is provided. In other alternative embodiments, three or more adhesive ports 214 are provided. The volume of adhesive cavity 212 is predetermined such that a predetermined amount of the adhesive is injected into adhesive cavity 212. The thickness of the adhesive is proportional to the strength of the connection between front frame tube 154 and coupler 204. If the thickness is too thin, the resulting connection may be undesirably weak. If the thickness is too great, the resulting connection may not properly transfer the load exerted on overstructure 202.

While the illustrative embodiment has been described with reference to front frame tube 154 and coupler 204, it is to be understood that front frame tube 156 is bonded to coupler 206 according to the illustrative method. Similarly, lower frame tube 208 is bonded to couplers 204, 206 according to the illustrative method. The surfaces of front frame tubes 154, 156 and lower frame tube 208 may be treated prior to assembly with couplers 204, 206. Exemplary surface preparations or treatments include a dry rag wipe, a solvent degrease, a vapor degrease, a mechanical abrasion or scuff of the surface, plasma treatment, chemical etching, and anodizing.

The adhesive may be an acrylic adhesive, for example, such as those described herein and available from Lord Corporation. In one embodiment, the adhesive is combined with an accelerator to promote the curing of the adhesive. The set time of the adhesive may be approximately 20 minutes and the cure time of the adhesive may be approximately two hours at room temperature. The cure time of the adhesive may be further accelerated by applying heat during the curing process (e.g., induction heat).

The illustrative embodiment of overstructure 202, and in particular, front frame tubes 154, 156, lower frame tube 208, and couplers 204, 206, includes dissimilar materials. For example, front frame tubes 154, 156 are comprised of carbon fiber materials, although other high-strength, thin wall materials, such as high-strength, non-weldable aluminum and certain steels may also be used. Similarly, lower frame tube 208 may be comprised of a carbon fiber material. The carbon fiber material may be coated with a plastic material to prevent a reaction with couplers 204, 206, which are formed of various metal materials, such as aluminum or steel.

Unlike welding, adhesive is able to bond dissimilar materials. Furthermore, welding may cause localized stress concentrations that affect material fatigue strength and fatigue life. However, adhesive distributes the load in overstructure 202 over an area, rather than concentrating it at a point or a line, and, therefore, does not adversely affect material properties. Additionally, compared to welds, the adhesive and carbon fiber of overstructure 202 reduces the weight of overstructure 202, and therefore, the weight of snowmobile 10, which allows a rider easier maneuvering of snowmobile 10.

Referring to FIGS. 23 and 24, connector 152 includes machined mounting surfaces 164A and 166A on the backside of support webs 164, 166, respectively, for mounting upper steering post 172 thereto, as is described in U.S. Patent Application Publication No. 2011/0192667, filed on Feb. 4, 2011, the disclosure of which is expressly incorporated by reference herein. Steering assembly 26 further comprises a lower steering post 232 operably coupled to upper steering post 172 via respective links 234, 236. Links 234, 236 are connected together by way of a drag arm 238. Ball joints 235 are coupled to drag arm 238 and links 234, 236 to provide pivot points between drag arm 238 and links 234, 236. Lower steering post 232 is connected to tie rods or steering rods 240 (FIG. 3) by way of a follower arm 242 (FIG. 27) in order to maneuver skis 14. Moveable joints, illustratively ball joints 262, may be used to pivotally couple follower arm 242 to steering rods 240. Steering rods 240 may be positioned through housings 195 of castings 188, 190.

Figure 29:
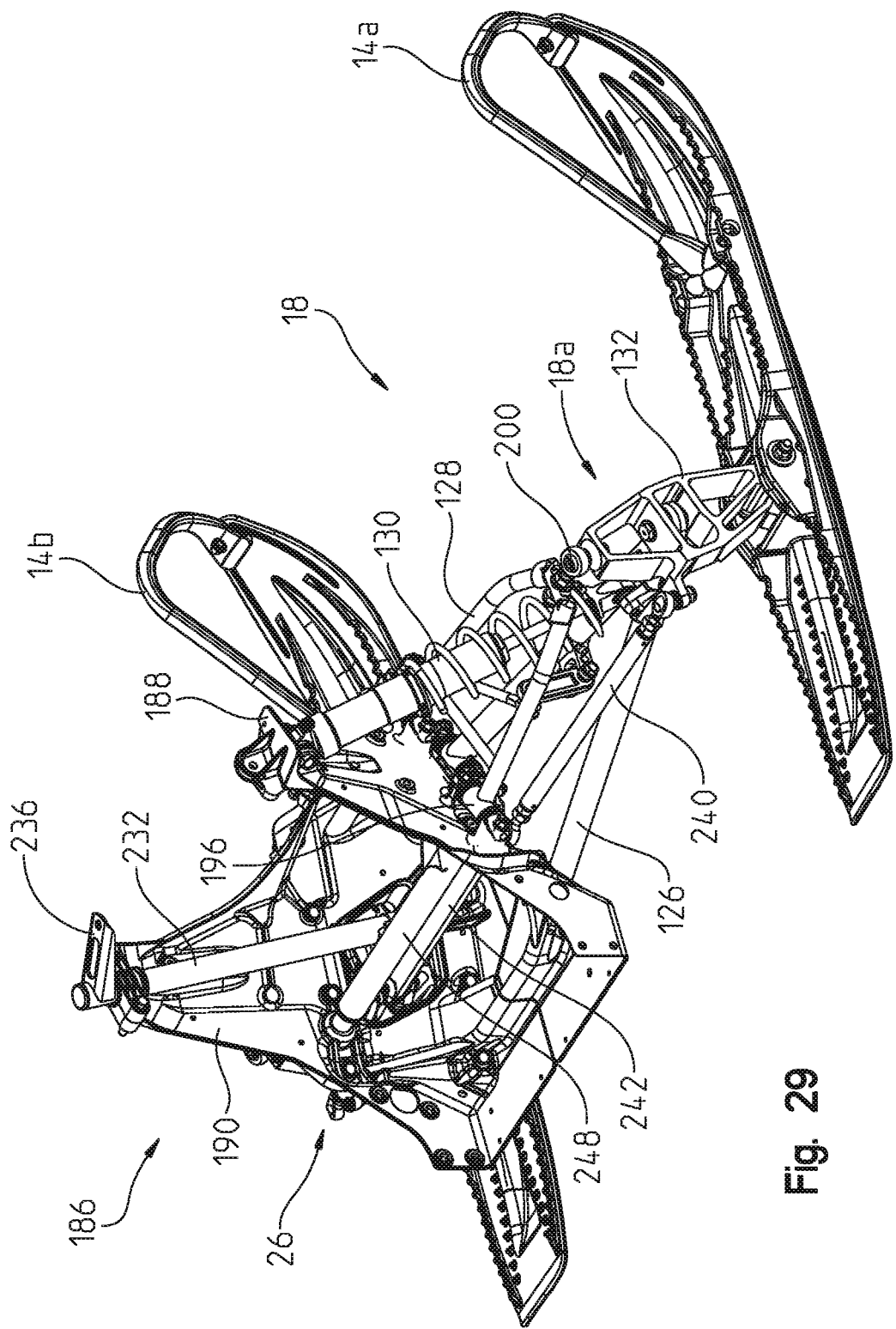
FIG. 29 is a rear perspective view of the front frame portion and the brace tube of the illustrative snowmobile of the present disclosure.

With reference to FIGS. 28 and 29, a support member 246 and a brace tube 248 may be coupled to right and left castings 188, 190 to support steering assembly 26. More particularly, support member 246 is coupled to right casting 188 and brace tube 248 to support follower arm 242 and steering rod 240 on the right side of snowmobile 10. Illustrative brace tube 248 is coupled to both right and left castings 188, 190 and extends therebetween. More particularly, brace tube 248 may be coupled to the inner surfaces of right and left castings 188, 190 between bearing members 196 of upper control arms 128. Brace tube 248 may be comprised of lightweight, high-strength materials, such as carbon fiber. As such, brace tube 248 may lower the weight of snowmobile 10.

Figure 30:
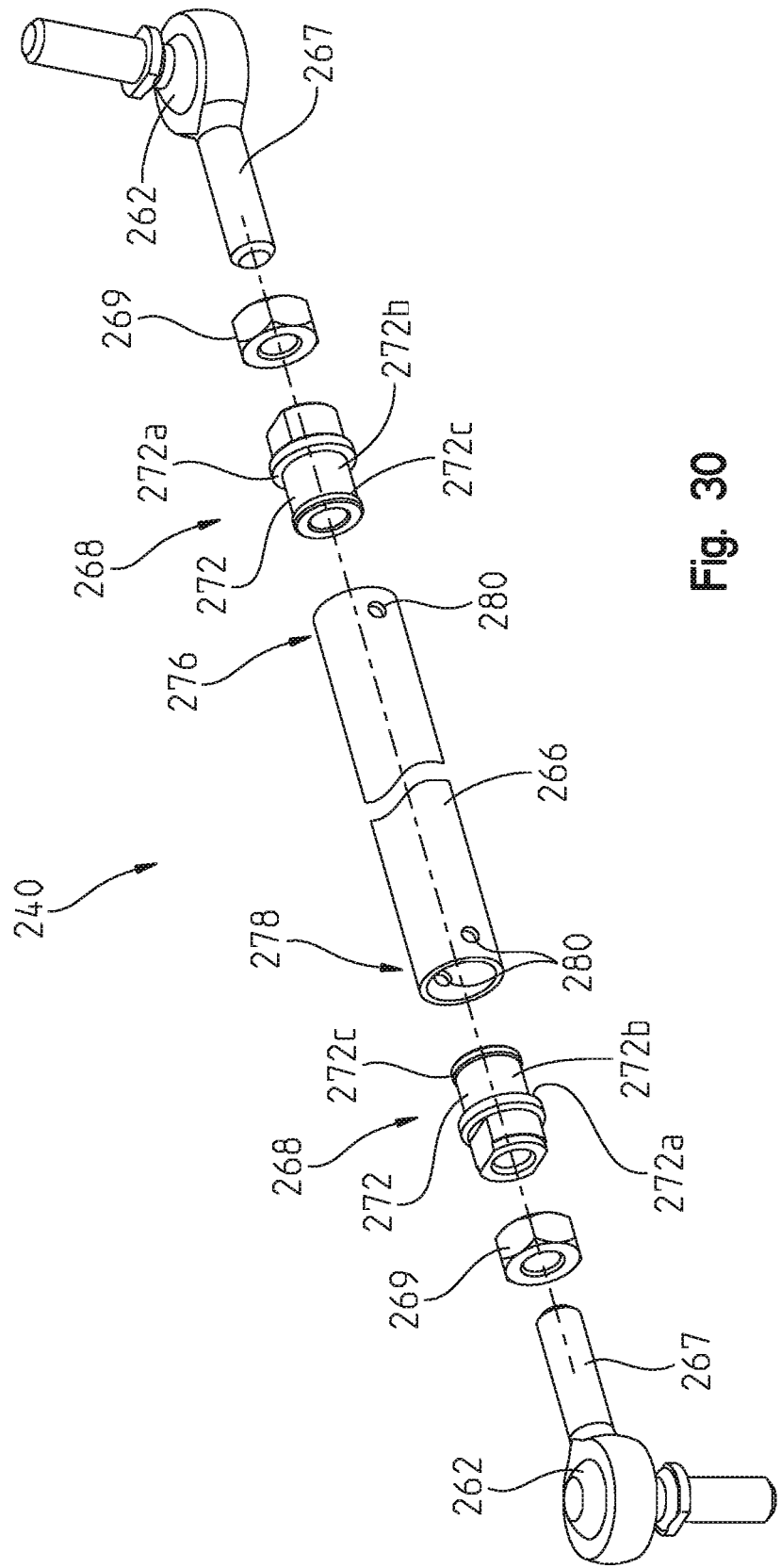
FIG. 30 is an exploded view of a steering rod of the illustrative steering assembly of FIG. 27.

Referring to FIGS. 19, 27, and 29-31, steering rods 240 are operably coupled to spindles 132 and follower arm 242 through ball joints 262. Steering rods 240 include an arm 266 coupled to brackets 268. More particularly, and as best shown in FIG. 30, brackets 268 are coupled to both a first end 276 of arm 266 and a second end 278 of arm 266. Brackets 268 are illustratively coupled to arm 266 with adhesive. In one embodiment, mechanical fasteners (not shown) may also be used to couple brackets 268 to arm 266.

Figure 31:
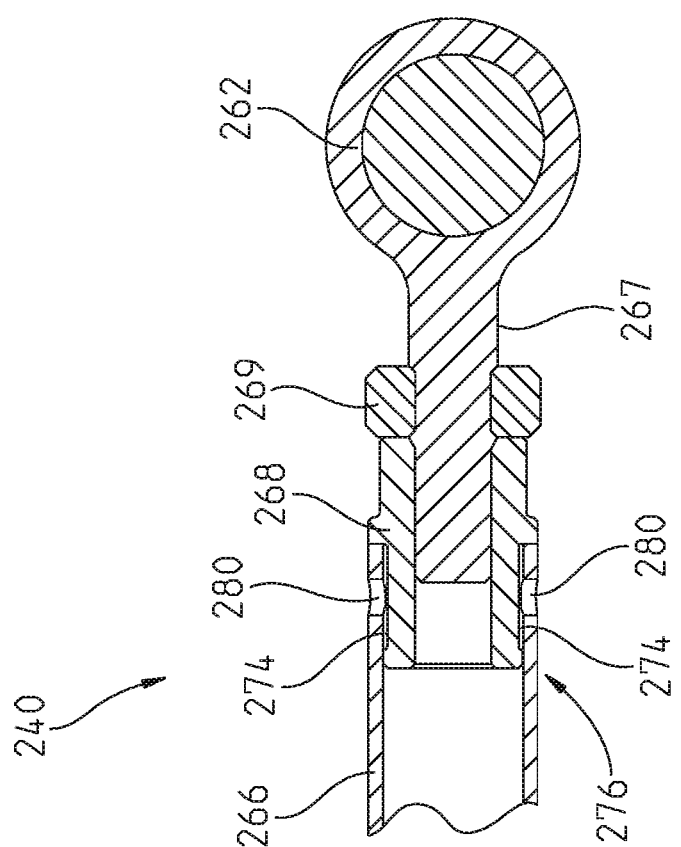
FIG. 31 is a cross-sectional view of an adhesive cavity formed by the illustrative steering rod of FIG. 30.

As shown in FIGS. 30 and 31, brackets 268 include a recess 272 that defines an adhesive cavity 274 when brackets 268 are coupled to arm 266. In particular, adhesive cavity 274 is bounded on three sides by surfaces 272a, 272b, 272c of recess 272 and is further defined by arm 266. Arm 266 includes adhesive ports 280 for receiving adhesive into adhesive cavity 274. As detailed above with respect to other components of snowmobile 10, adhesive is applied in a predetermined volume that corresponds to the volume of adhesive cavity 274. The adhesive may be a structural adhesive available from Lord Corporation and may be used with an accelerator. The adhesive is applied in shear when brackets 268 are received within first and second ends 276, 278 of arm 266.

Figure 27:
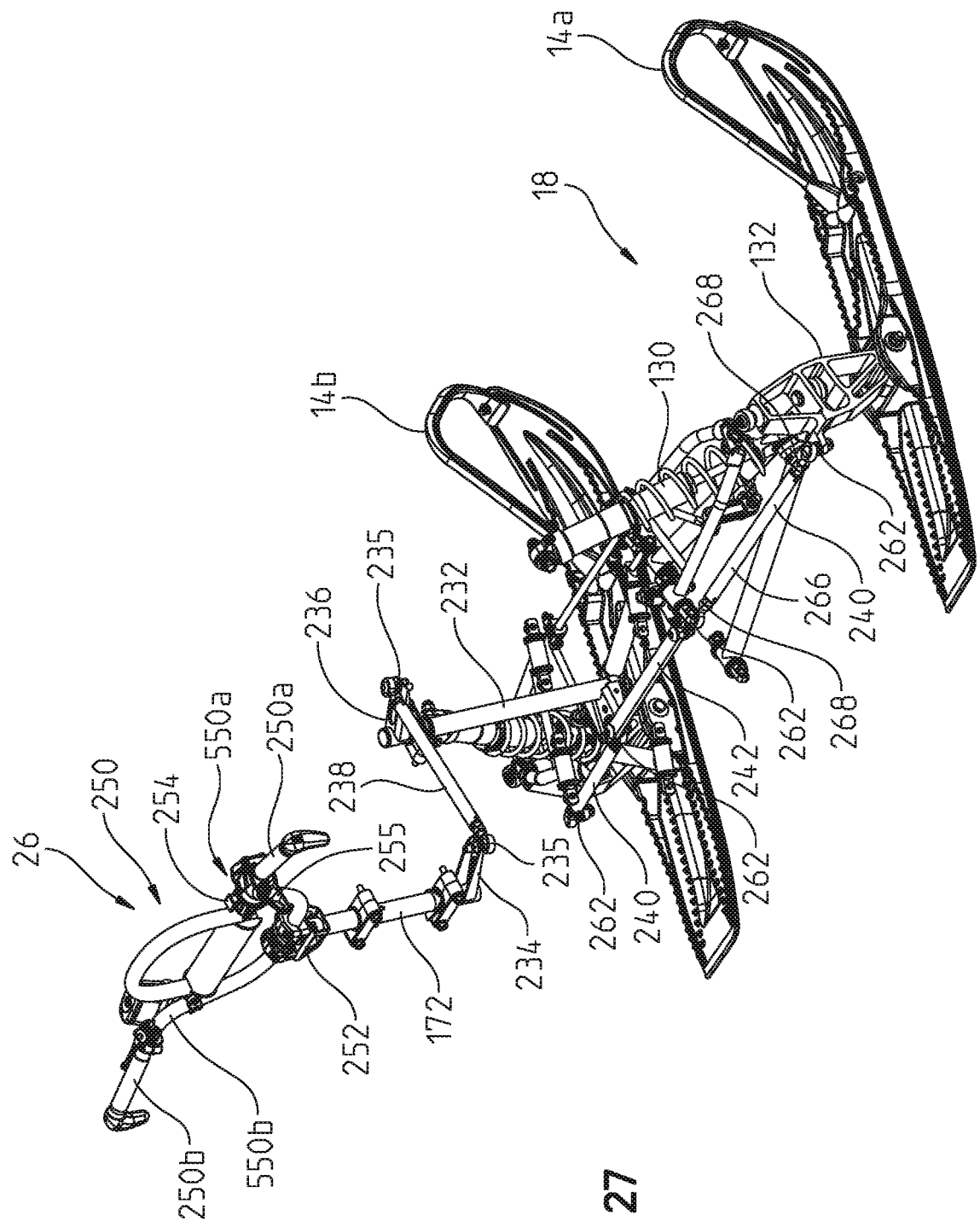
FIG. 27 is a rear perspective view of a steering assembly of the illustrative snowmobile.
Figure 32A:
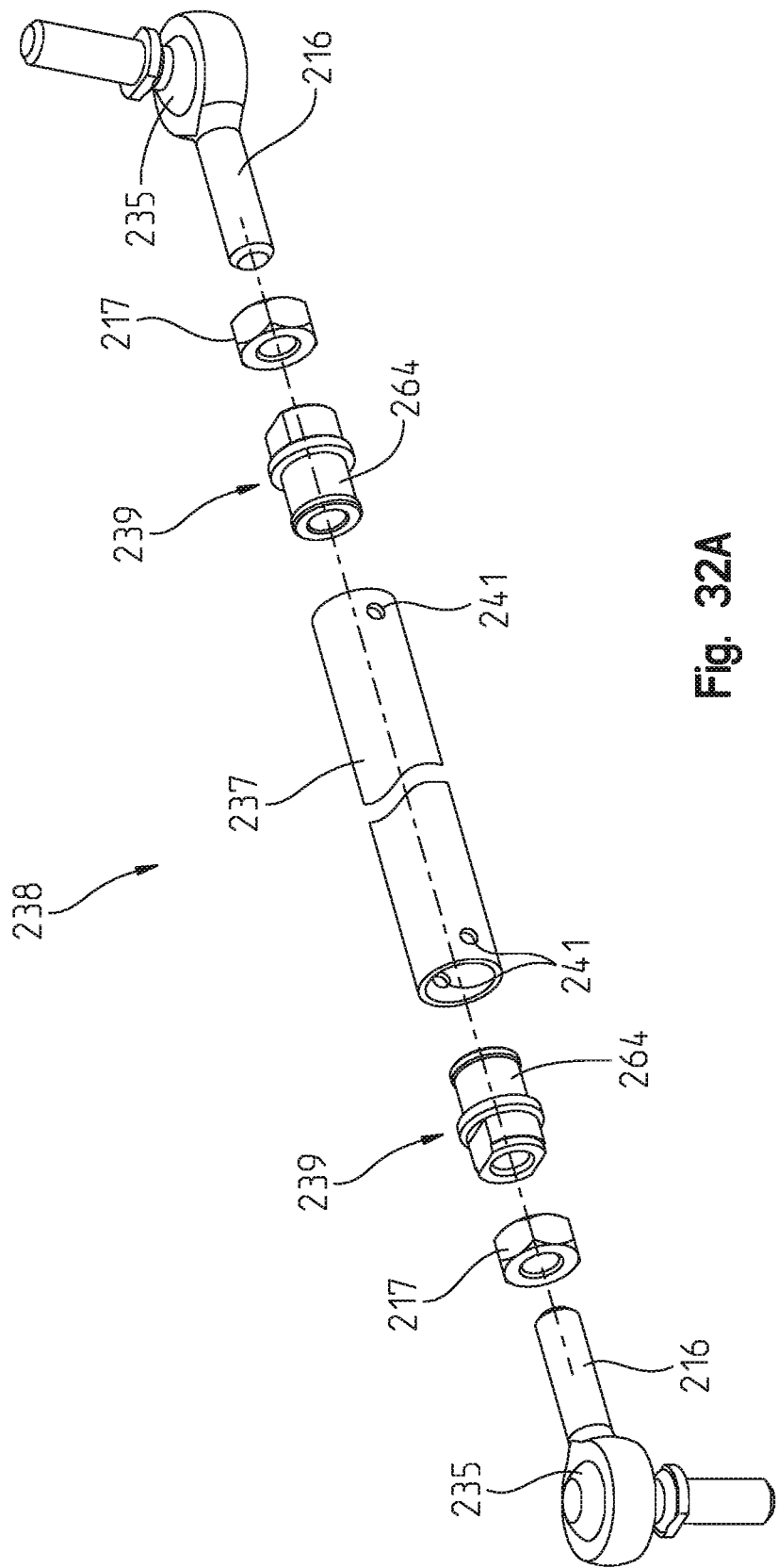
FIG. 32A is a cross-sectional view of a drag arm of the illustrative steering assembly of FIG. 27.
Figure 32B:
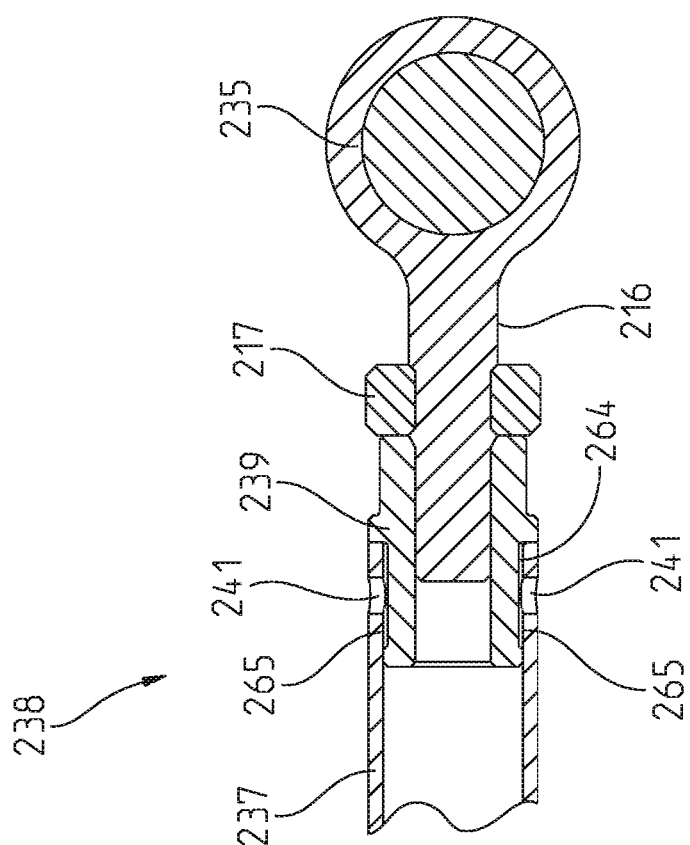
FIG. 32B is a cross-sectional view of an adhesive cavity formed by the illustrative drag arm of FIG. 27.

Additionally, in one embodiment of the present disclosure and shown in FIG. 27, drag arm 238 includes an arm member 237 and brackets 239, as shown in FIGS. 32A and 32B. Brackets 239 slidingly receive ball joints 235. Brackets 239 of drag arm 238 include a recess 264 that defines an adhesive cavity 265 when brackets 239 are received within arm member 237. Drag arm 238 may be assembled with adhesive through adhesive ports 241 according to the illustrative method.

The use of the adhesive to assemble drag arm 238 and steering rods 240, may replace other conventional joining methods (e.g., welding). Unlike welding, the adhesive does not form localized areas of stress at the connection points of drag arm 238 and steering rods 240. Furthermore, the adhesive allows dissimilar metals to be joined, which may reduce the weight of snowmobile 10. Additionally, by eliminating welds on drag arm 238 and steering rods 240, the weight of steering assembly 26 is reduced.

Referring to FIG. 32A, ball joints 235 include threaded posts 216, which are received within threaded apertures of brackets 239 of drag arm 238 and secured thereto with a fastener, such as a nut 217. Similarly, ball joints 262 include a threaded post 267, which is received within threaded apertures of brackets 268 and secured thereto with a fastener, such as nut 269. Nuts 217, 269 may be threadedly coupled to posts 216, 267 to secure ball joints 235, 262, respectively.

Figure 33A:
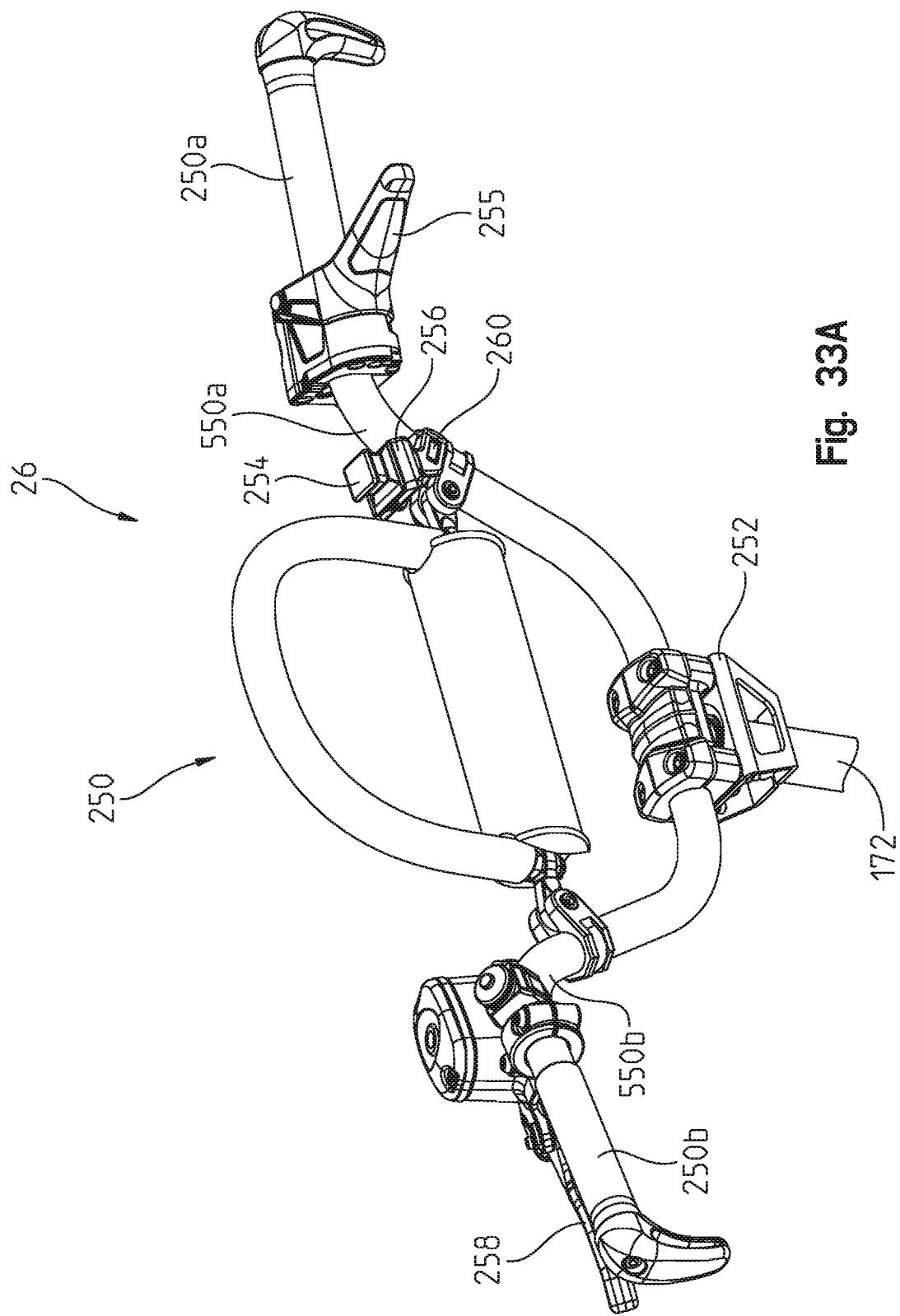
FIG. 33A is a rear perspective view of the illustrative steering assembly showing an auxiliary power button.
Figure 33B:
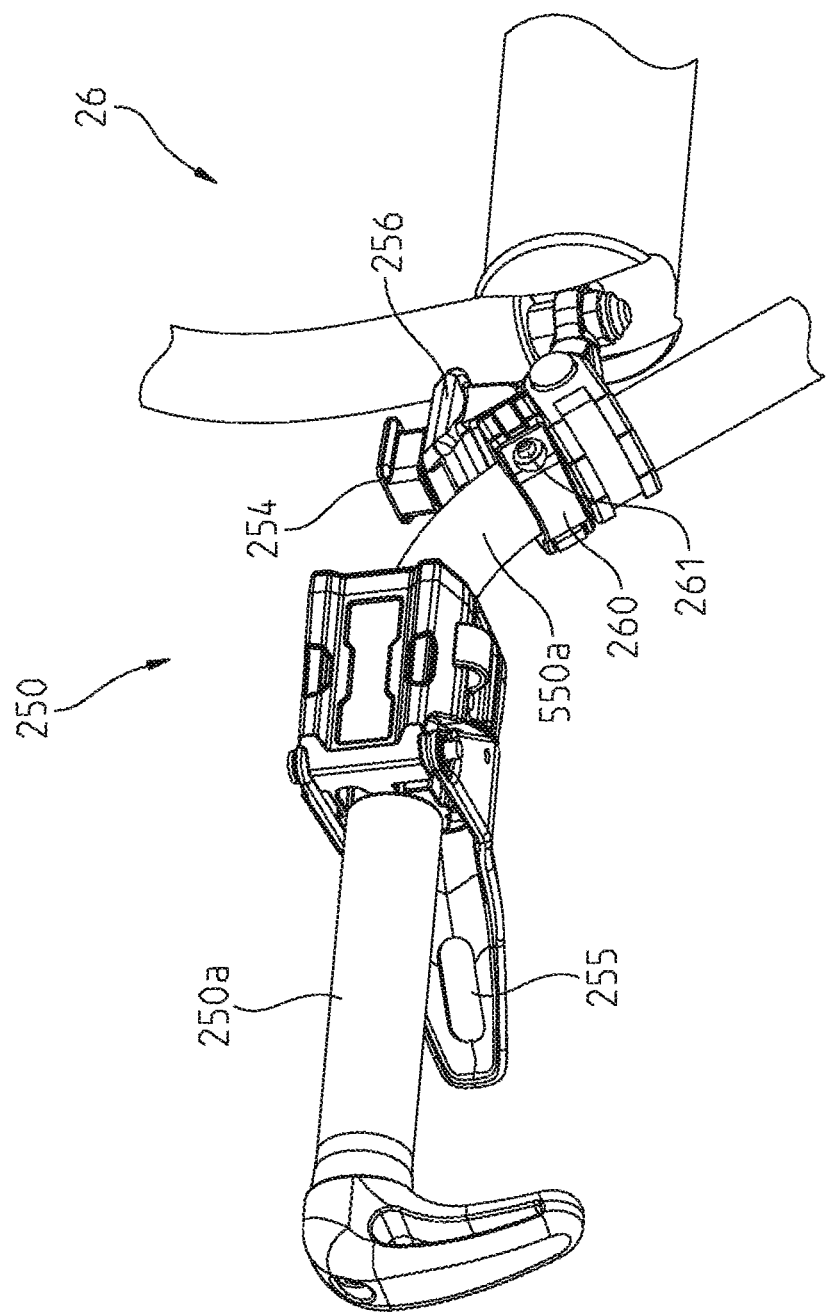
FIG. 33B is a detailed side perspective view of the auxiliary power button of FIG. 33A.

As shown in FIGS. 33A and 33B, handlebars 250 of steering assembly 26 are attached to upper steering post 172 by way of a clamp 252. Illustratively, handlebars 250a, 250b each include a bend 550a, 550b, respectively, and each extend therefrom in a generally horizontal direction and are generally perpendicular to upper steering post 172. Handlebar 250a includes an auxiliary power button 254 and a throttle handle 255. Handlebar 250b includes a brake lever 258. Auxiliary power button 254 is coupled to handlebar 250a through a base 256 and a clamp 260. Auxiliary power button 254 may be snapped into base 256, rather than secured thereto with a mechanical fastener. Clamp 260 illustratively extends around handlebar 250a in a U-shape or C-shape configuration and may be secured with a mechanical fastener 261 (e.g., screw, bolt). Other clamping or mounting mechanisms that do not require the use of a mechanical fastener also may be used to couple auxiliary power button 254 to handlebar 250a.

Auxiliary power button 254 is vertically oriented on handlebar 250a. More particularly, the orientation of auxiliary power button 254 is generally parallel to upper steering post 172 and generally perpendicular to handlebars 250. The vertical orientation of auxiliary power button 254 prevents the rider from accidentally bumping auxiliary power button 254 and unintentionally turning off engine 28. Furthermore, auxiliary power button 254 is spaced apart from throttle handle 255, which also prevents a rider from unintentionally depressing auxiliary power button 254 when adjusting throttle handle 255. Illustratively, auxiliary power button 254 is positioned on bend 550a.

Figure 33C:
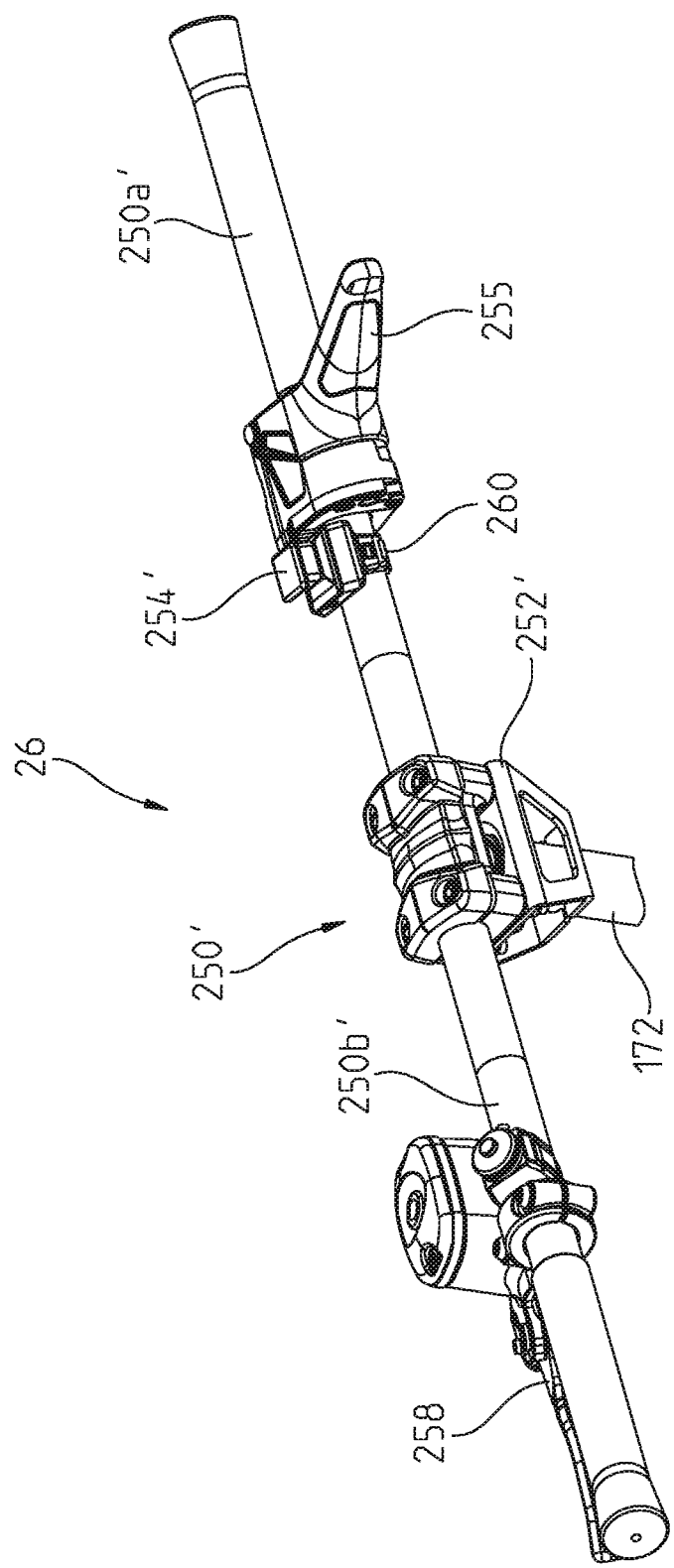
FIG. 33C is a rear perspective view of an alternative embodiment of the steering assembly of FIG. 33A.

With reference to FIG. 33C, one embodiment of steering assembly 26 may include substantially horizontal handlebars 250a' and 250b', clamp 252', and auxiliary power button 254'. Substantially horizontal handlebars 250a', 250b' are coupled to clamp 252' and extend outwardly therefrom. As such, clamp 252' is intermediate substantially horizontal handlebars 250a' and 250b', and may be vertically and horizontally aligned therewith. Unlike handlebars 250, substantially horizontal handlebars 250' do not include bends 550a, 550b. Similar to handlebar 250b, substantially horizontal handlebar 250b' includes brake lever 258. Illustratively, auxiliary power button 254' is coupled to substantially horizontal handlebar 250a' and is adjacent throttle handle 255. More particularly, auxiliary power button 254' snaps onto, or is otherwise coupled to, handlebar 250a' in a substantially vertical orientation via clamp 260. Clamp 260 may be secured to substantially horizontal handlebar 250a' with a fastener (not shown). Additionally, auxiliary power button 254' may be coupled to substantially horizontal handlebar 250a' without base 256.

Referring to FIGS. 17 and 19, front frame portion 12a further include a torsion bar or sway bar 282 coupled to the front of right and left castings 188, 190. Sway bar 282 is supported by clamps 284 extending from right and left castings 188, 190. Rubber isolators or bushings 286 may be positioned within clamps 284 to allow sway bar 282 to pivot within clamps 284. Sway bar 282 extends across the front of right and left castings 188, 190 and bends rearwardly toward lower controls arms 126. Illustratively, sway bar 282 is coupled to lower control arms 126 through a link arm 288 and a bracket 290. More particularly, a first end 292 of link arm 288 includes an aperture 294 that receives sway bar 282. A second end 296 of link arm 288 is coupled to bracket 290 with fasteners 298.

Bracket 290 includes an opening 300 and extensions 302. Opening 300 is sized to receive arm 140 of lower control arm 126. Extensions 302 are spaced apart such that second end 296 of link arm 288 is positioned therebetween. Fastener 298 is received through apertures (not shown) in extensions 302 and second end 296 of link arm 288. Link arm 288 is configured to pivot about fastener 298 in response to movement of front suspension 18.

Figure 36:
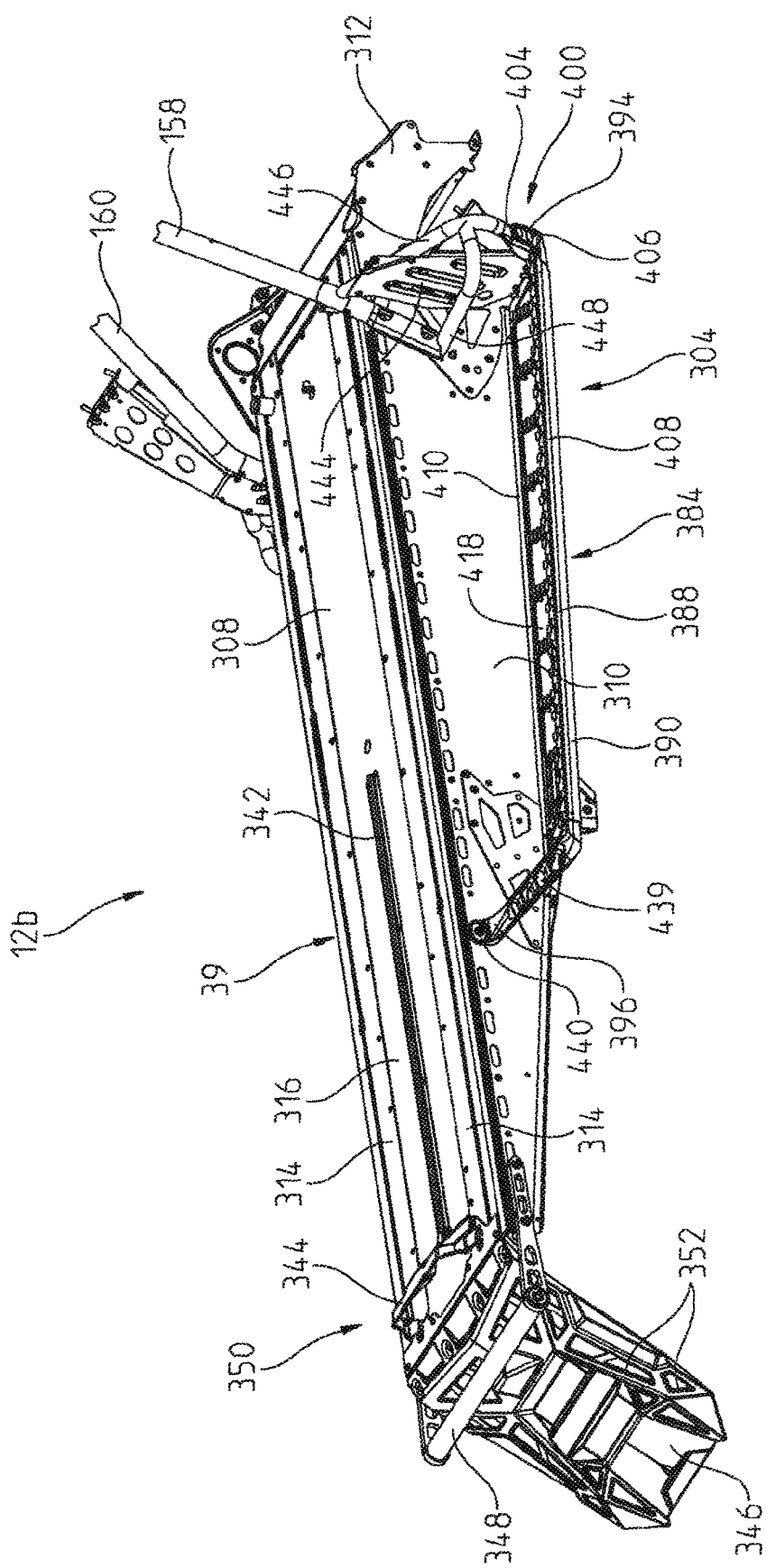
FIG. 36 is a side perspective view of the tunnel of FIG. 35.
Figure 37:
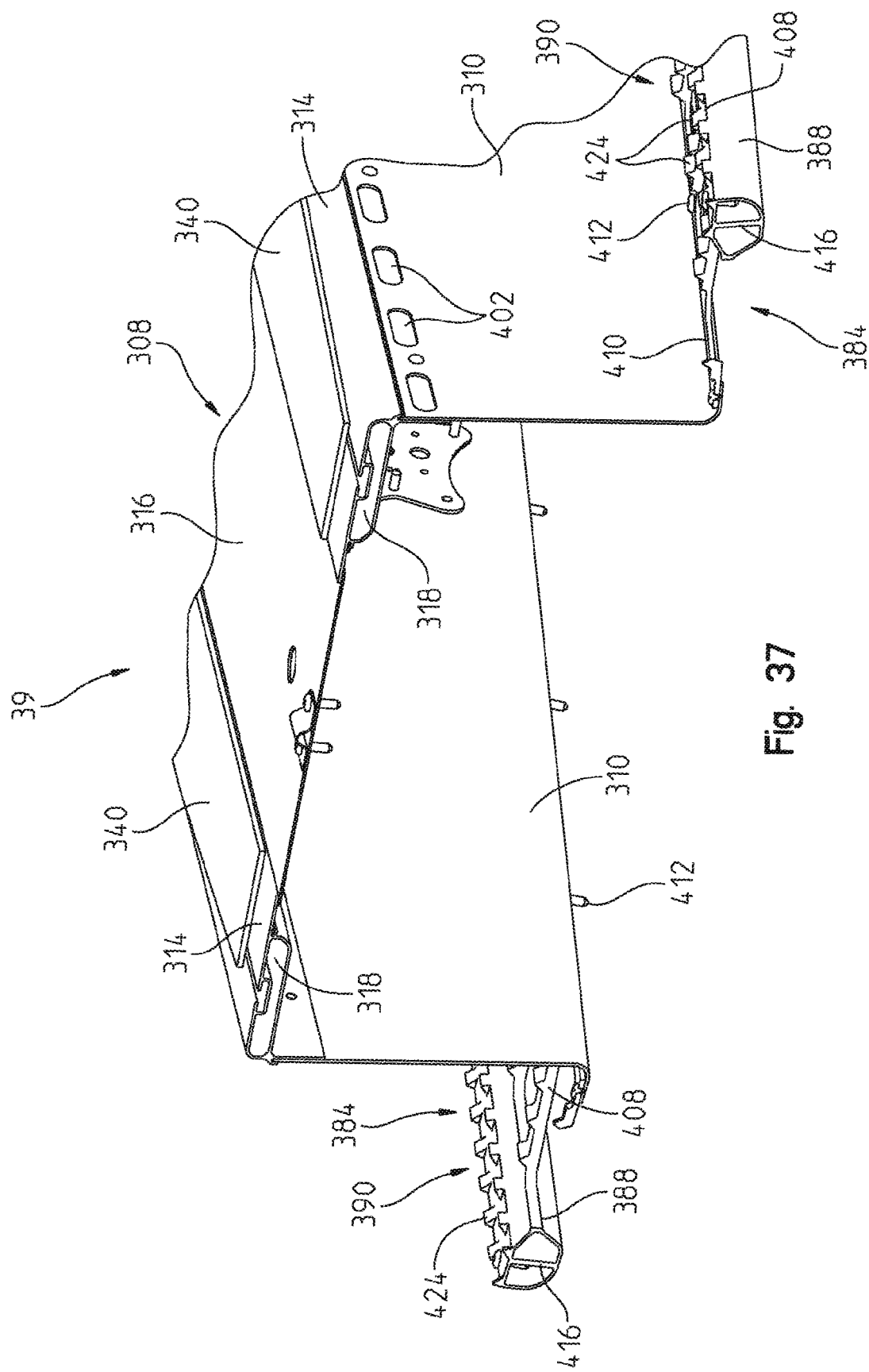
FIG. 37 is a cross-sectional view of the tunnel of the present disclosure including recessed channels.

Referring to FIGS. 34-36, rear frame portion 12b includes tunnel 39, rear suspension assembly 20, a running board assembly 304, and endless track 16. Tunnel 39 includes a top wall 308, a front wall 312, side walls 310, and a rear end 350. Front wall 312 extends between jackshaft 38 and drive shaft 36 such that drive shaft 36 is positioned within tunnel 39 and jackshaft 38 is positioned outside of tunnel 39.

Figure 38:
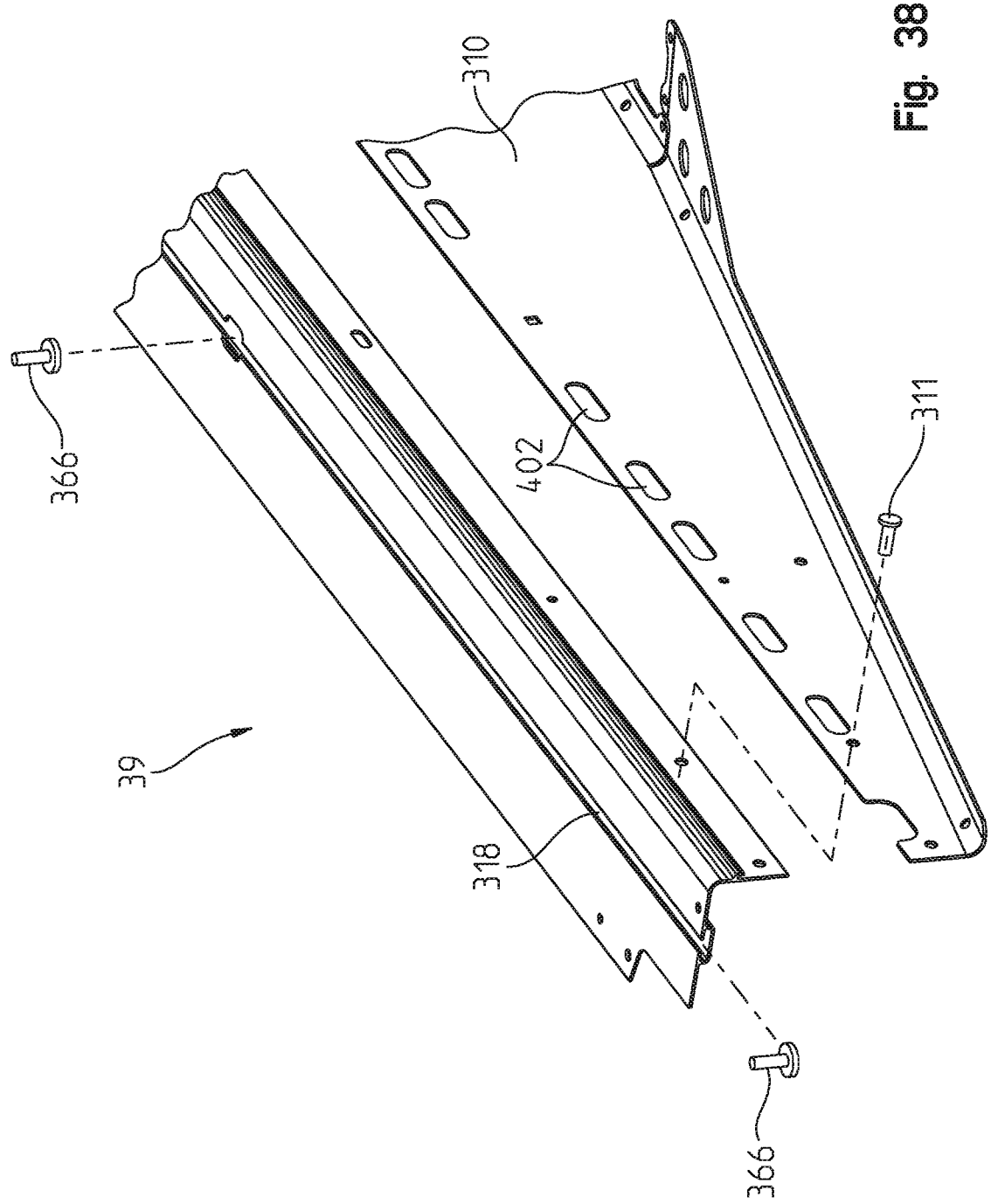
FIG. 38 is a detailed view of the recessed channels of the tunnel of FIG. 37.
Figure 43:
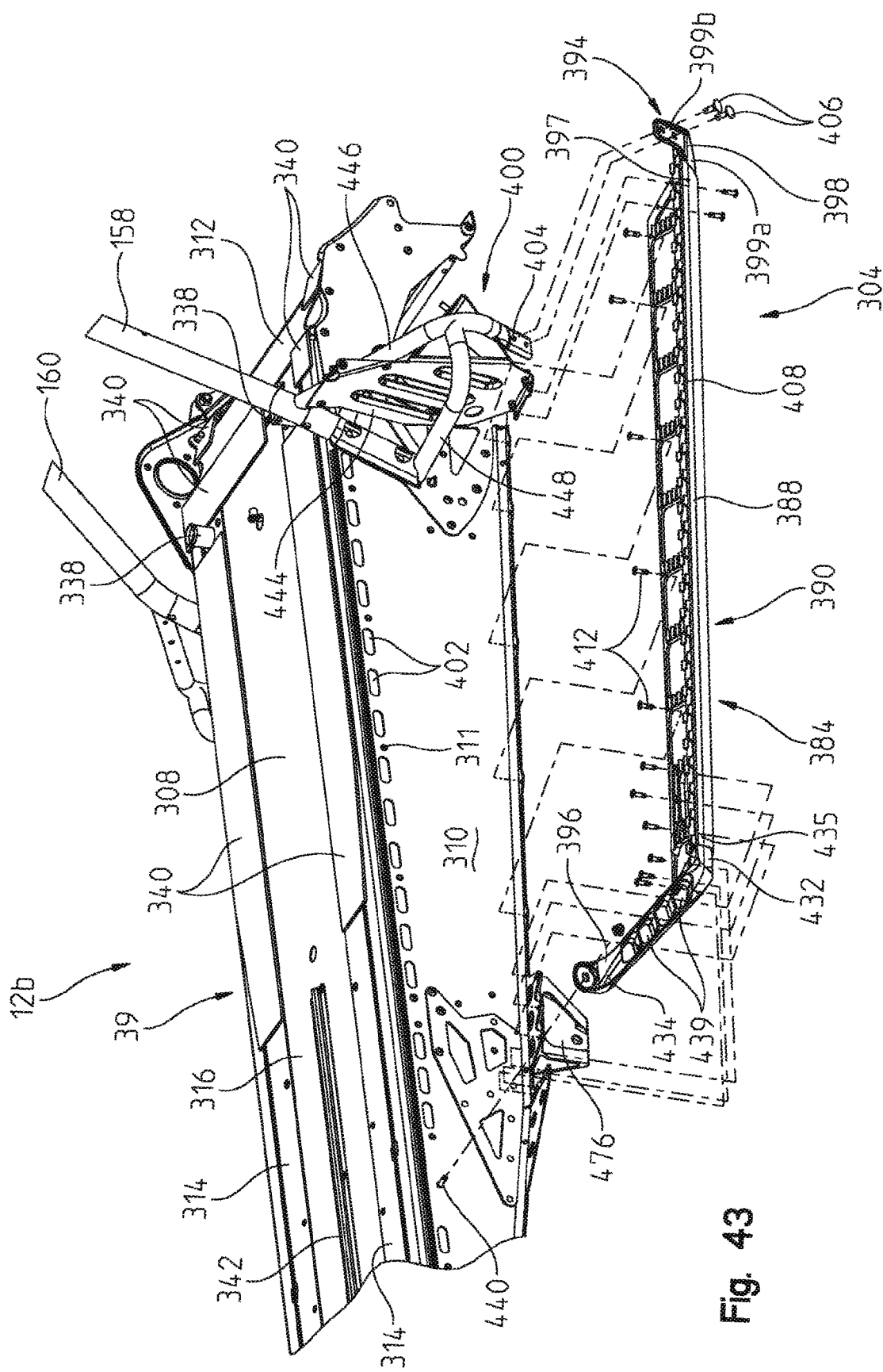
FIG. 43 is a side view of the running board assembly and a toe grip assembly of the illustrative snowmobile.
Figure 44:
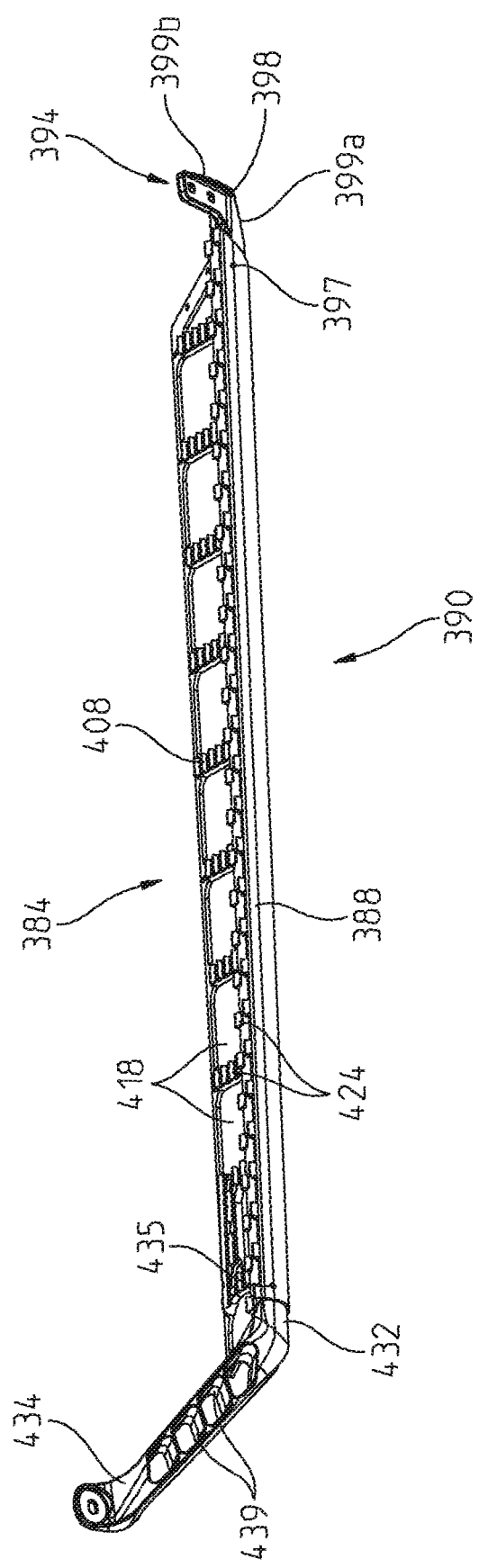
FIG. 44 is a side perspective view of a portion of the running board assembly of FIG. 43.

As shown in FIGS. 38 and 43, side walls 310 are removably coupled to top wall 308 of tunnel 39 with fasteners 311, which may embody rivets, bolts, adhesive, screws, or any combination thereof. Side walls 310 include a plurality of apertures 402 to reduce the weight of side walls 310, thereby further reducing the overall weight of snowmobile 10. Similarly, tunnel 39 may include a plurality of apertures 403, which also reduce the weight of snowmobile 10. Side walls 310 extend from front wall 312 to rear end 350, as shown in FIG. 50. Side walls 310 may be comprised of lightweight, high-strength materials such as aluminum, steel, or other similar materials.

Top wall 308 of tunnel 39 includes lateral portions 314 and a center portion 316. Lateral portions 314 illustratively include recessed channels 318 (FIG. 38) configured to receive fasteners 366 (e.g., bolts) for mounting accessories onto top wall 308 of tunnel 39. For example, fasteners may slide into recessed channels 318 in order to secure cargo or a cargo carrying unit to top wall 308.

As shown in FIG. 43, an electrical cover 342 may be positioned along center portion 316 of top wall 308 and intermediate recessed channels 308. Electrical cover 342 extends rearwardly from seat assembly 20 and toward rear end 350 of tunnel 39. More particularly, electrical cover 342 is coupled to a socket 344 (FIG. 35), which is configured to secure a brake light (not shown) or other illumination or electrical device to snowmobile 10. Electrical cover 342 is coupled to top wall 308 and is configured to accommodate electrical wires (not shown) therein.

As shown in FIGS. 35 and 36, adjacent socket 344 is a snow flap 346 and a rear bumper 348. Snow flap 346 is hingedly mounted to the tunnel 39 along rear end 350. Snow flap 346 includes a plurality of apertures 352 to reduce the weight of snow flap 346, thereby further decreasing the overall weight of snowmobile 10. Apertures 352 may be machined or molded in snow flap 346.

Referring to FIGS. 26 and 35, tunnel 39 may further include heat exchanger channels (not shown) positioned forward of electrical cover 342, as more fully described in U.S. Pat. No. 7,870,920, issued on Jan. 18, 2011, the disclosure of which is incorporated by reference herein. The heat exchanger channels may be positioned along the underside of tunnel 39 and below seat assembly 22. Top wall 308 of tunnel 39 illustratively includes fluid ports 338 (FIG. 43) that are fluidly coupled to heat exchanger channels and engine 28. In operation, engine water may flow from engine 28 to a port 338 through a hose (not shown) and circulate through the heat exchanger channels in order to cool the engine water. Cooled engine water exits through the other port 338 and flows toward engine 28 in a second hose (not shown). During operation of snowmobile 10, snow and ice are kicked up toward the heat exchanger channels, which cools the engine water. Top wall 308 may include insulation panels 340 to isolate the heat exchanger channels from the rider and/or other components of snowmobile 10 (FIG. 50). Illustratively, there are six insulation panels 340. Insulation panels 340 may be comprised of foam or other insulation material.

As shown in FIGS. 35-38 and 43-46, running board assembly 304 is coupled to side walls 310 of tunnel 39 and includes a foot tread assembly 384 and a toe grip assembly 400. Foot tread assembly 384 includes running board plates 390 and a plurality of support members, illustratively a bracket 394 and an elbow 396. Running board plates 390 include plate portion 408 and elongate member 388. Foot tread assembly 384 is removably coupled to side walls 310 with fasteners 412 and 440. Additionally, foot tread assembly 384 is removably coupled to toe grip assembly 400 with fasteners 406. Fasteners 406, 412, and 440 may be conventional fasteners, such as bolts, rivets, and screws to facilitate removal of food tread assembly 384 from snowmobile 10. As such, foot tread assembly 384 may be easily replaced, repaired, or otherwise serviced, without replacing or disassembling side walls 310, tunnel 39, or other portions of snowmobile 10.

With respect to FIG. 43, plate portion 408 is comprised of a plurality of openings 418 that extend from elongate member 388 to a marginal edge 410 of running board plate 390. As such, openings 418 extend substantially across the width of running board plate 390 to provide a maximum open area on plate portion 408 for snow to fall through. The bottom surface of running board plates 390 is substantially smooth, which also facilitates snow removal from plate portion 408. Gripping serrations 424 on plate portion 408 and elongate member 388 provide traction for a rider's foot. Illustratively, gripping serrations 424 border or outline openings 418. Openings 418 may be embossed to rigidify plate portion 408.

Running board plate 390 may be extruded as a single piece, such that plate portion 408, gripping serrations 424, elongate member 388, and marginal edge 410 are integrally formed. In one embodiment, openings 418 and marginal edge 410 are machined through conventional methods. Running board plates 390 may be extruded and machined from high-strength aluminum. As such, running board plates 390 are comprised of a lightweight material that may contribute to an overall weight reduction of snowmobile 10.

Figure 45A:
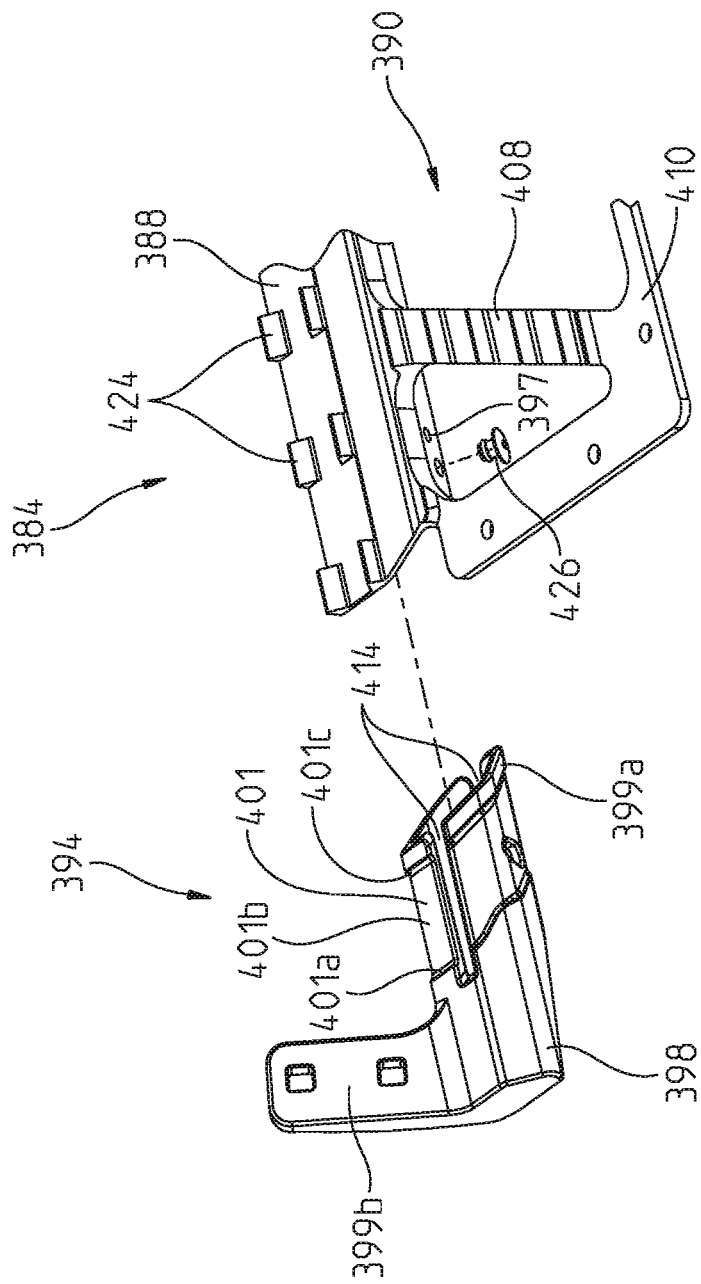
FIG. 45A is an exploded view of a bracket and an elongate frame member of the running board assembly of FIG. 43.
Figure 45B:
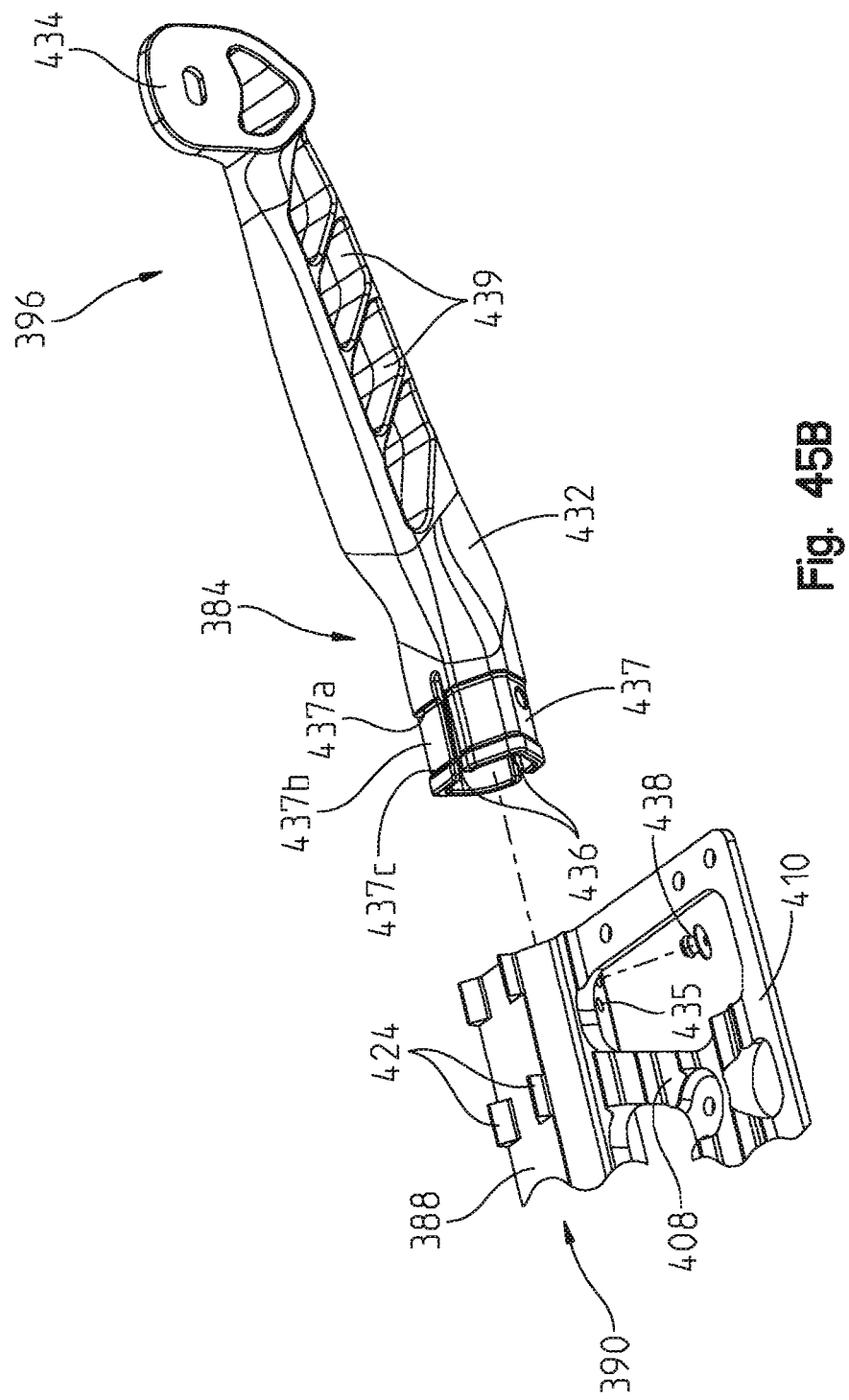
FIG. 45B is an exploded view of an elbow and the elongate member of the running board assembly of FIG. 43.
Figure 46A:
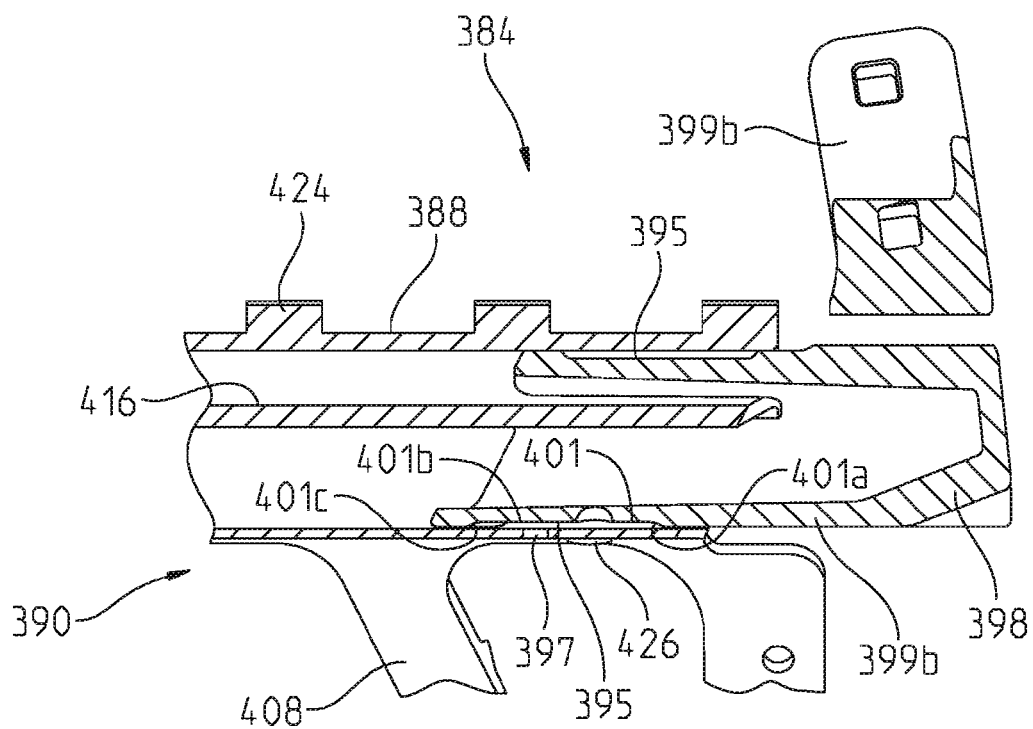
FIG. 46A is a cross-sectional view of an adhesive cavity formed by the bracket of FIG. 45A.

As shown in FIGS. 37 and 43-46, bracket 394 may be removable from elongate member 388 and is formed through conventional casting methods. Elongate member 388 extends in a generally parallel direction to longitudinal axis L of snowmobile 10 and includes an internal web 416. With particular reference to FIGS. 45 and 46, bracket 394 includes a bracket body 398 having a first coupling portion 399a extending into elongate member 388 and a second coupling portion 399b for attachment to a flange 404 of toe grip assembly 400. First coupling portion 399a extends in the same direction as elongate member 388. Second coupling portion 399b is angled relative to first coupling portion 399a and extends in at least a partially vertical direction.

First coupling portion 399a of bracket body 398 may be attached to elongate member 388 by way of fasteners 426, such as bolts, screws, welds, rivets, adhesives, or a combination thereof. More particularly, relative to bracket body 398, first coupling portion 399a has a reduced cross section corresponding to the inner diameter of elongate member 388 for receipt therein. First coupling portions 399a include slots 414 to receive internal web 416 of elongate member 388.

Illustratively, first coupling portion 399a is coupled to elongate member 388 with adhesive and fasteners 426. In particular, as shown in FIGS. 45 and 46, frame bracket 394 includes opposing adhesive cavities 395 and adhesive ports 397 that are separated by slots 414 and internal web 416 of elongate member 388. The reduced cross-section of first coupling portion 399a defines recesses 401 having surfaces 401a, 401b, 401c that cooperate with internal web 416 to define adhesive cavities 395. When first coupling portion 399a slides into elongate member 388, adhesive is injected through adhesive ports 397 into adhesive cavities 395 in a predetermined volume such that the thickness of the adhesive is known. The strength of the connection between frame bracket 394 and elongate member 388 corresponds to the thickness of the adhesive and is further increased when the adhesive is in shear. Surface treatments may be used to prepare adhesive cavities 395, as detailed herein.

Referring to FIGS. 36 and 43, flange 404 couples second coupling portion 399b of frame bracket 394 to a toe grip assembly 400. Illustratively, flange 404 and second coupling portion 399b are positioned back-to-back and attached by way of fasteners 406. Second coupling portion 399b has a flattened cross-section which is similar to that of flange 404.

Referring to FIGS. 45A-46B, elbow 396 includes a first coupling portion 432 and a second coupling portion 434. Elbow 396 extends upwardly in a generally diagonal direction to couple elongate member 388 to side wall 310. Elbow 396 is positioned at the opposite end of elongate member 388 relative to bracket 394 and supports running board plate 390 near rear portion 350 of tunnel 39. More particularly, second coupling portion 434 of elbow 396 is opposite first coupling portion 432 and couples elbow 396 to side wall 310 with a fastener 440. Illustratively, only fastener 440 couples elbow 396 to side wall 310, however, other embodiments of the present disclosure may use more than one fastening member. Second coupling portion 434 illustratively includes a plurality of apertures 439, which may reduce the weight of elbow 396 and, therefore, reduce the weight of snowmobile 10. Additionally, apertures 439 may facilitate snow removal from foot tread assembly 384.

Figure 46B:
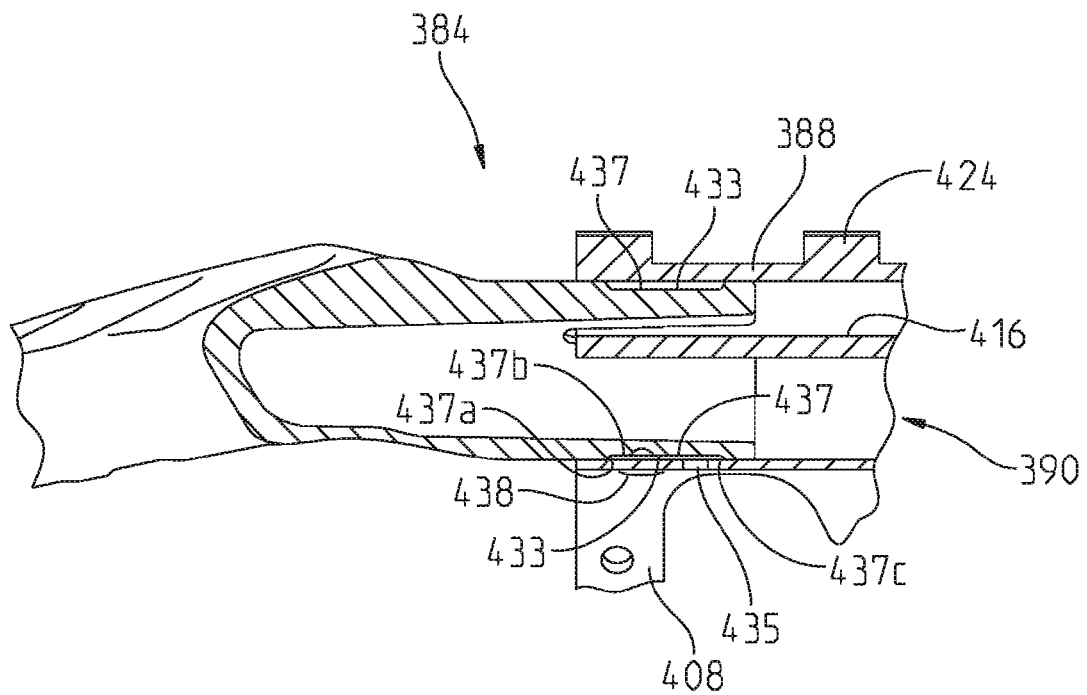
FIG. 46B is a cross-sectional view of an adhesive cavity formed by the elbow of FIG. 45B.

As shown in FIGS. 45B and 46B, first coupling portion 432 of elbow 396 has a reduced cross-section and includes slots 436 to receive internal web 416 of elongate member 388. As such, first coupling portion 432 is received within elongate member 388 and is coupled thereto with fasteners 438. In one embodiment, elbow 396 is bonded to elongate member 388 with adhesive. In particular, first coupling portion 432 includes adhesive cavities 433 and adhesive ports 435 to receive adhesive into adhesive cavities 433. Adhesive cavities 433 and ports 435 are on opposing sides of first coupling portion 432 and are separated by slots 436 and internal web 416 of elongate member 388. The reduced cross-section of first coupling portion 432 defines recesses 437. In particular, surfaces 437a, 437b, 437c of recesses 437 cooperate with internal web 416 to define adhesive cavities 433 when first coupling portion 432 slides into elongate member 388. Adhesive is injected through adhesive ports 435 into adhesive cavities 433 in a predetermined volume such that the thickness of the adhesive is known. The strength of the connection between elbow 396 and elongate member 388 correlates to the thickness of the adhesive and is further increased by applying the adhesive in shear. Surface treatments may be used to prepare adhesive cavities 433, as detailed herein.

Unlike welding, adhesive may be used to bond bracket 394 and elbow 396 to elongate member 388. As such, bracket 394 and elbow 396 may be comprised of different materials than elongate member 388. Additionally, welding may form areas of localized stress, which reduce the fatigue life and strength of the material. However, adhesive does not cause stress concentrations and does not adversely affect fatigue life and strength. Additionally, adhesive may reduce the weight of elongate frame member 388, thereby further reducing the weight of snowmobile 10. Exemplary adhesives are available from Lord Corporation, as detailed herein. Induction heat and/or accelerators may be used to decrease curing time of the adhesive in adhesive cavities 395, 433.

With reference now to FIGS. 35 and 36, toe grip assembly 400 includes a shroud (not shown), a back wall 444, a frame member 446, and a toe clip 448, as further detailed in U.S. Patent Application Publication No. 2011/0192667, filed on Feb. 4, 2011, the complete disclosure of which is incorporated by reference herein. Toe clip 448 is positioned rearward of back wall 444 to secure a rider's foot. The shroud generally covers back wall 444 and at least a portion of toe clip 448.

Referring to FIGS. 39A-42, seat assembly 20 is coupled to top wall 308 and includes a seat mount 320, a seat base 322, a cushion 324, a cover 326, a bracket 328, and fasteners 330. Cover 326 may be comprised of a water-repellant fabric or polymeric material and wraps around cushion 324. Seat base 322 and cushion 324 may be comprised of polymeric materials, for example, polyurethane. In one embodiment of seat assembly 22, seat base 322 is comprised of rigid polyurethane, whereas cushion 324 is comprised of softer polyurethane foam. Cushion 324 and seat base 322 may be comprised of similar polymers such that cushion 324 may be molded to or otherwise bonded or coupled with seat base 322. Alternatively, seat base 322 may be comprised of other lightweight materials, for example aluminum.

Figure 40:
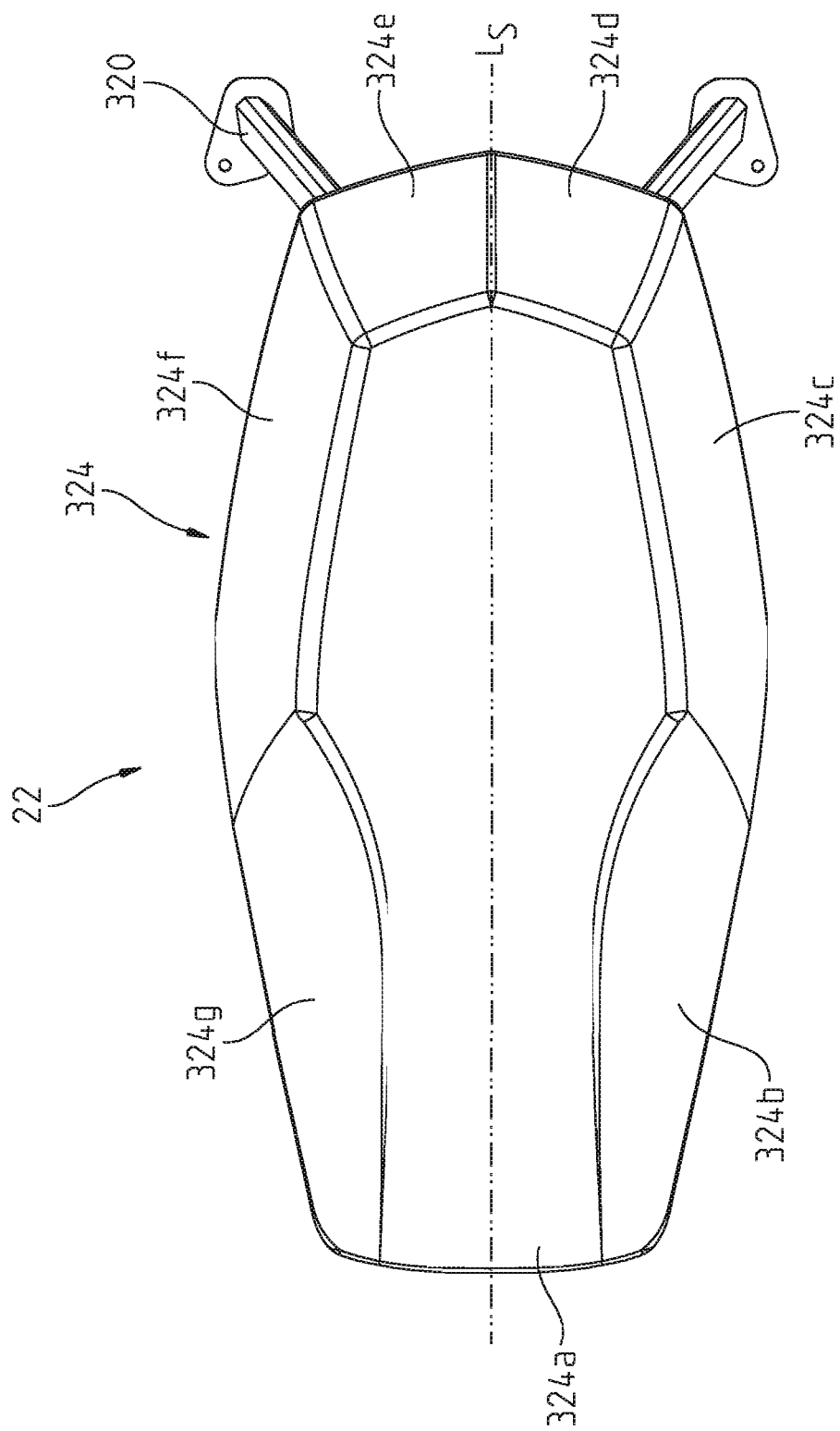
FIG. 40 is a top plan view of the seat assembly with the seat cover removed.
Figure 41:
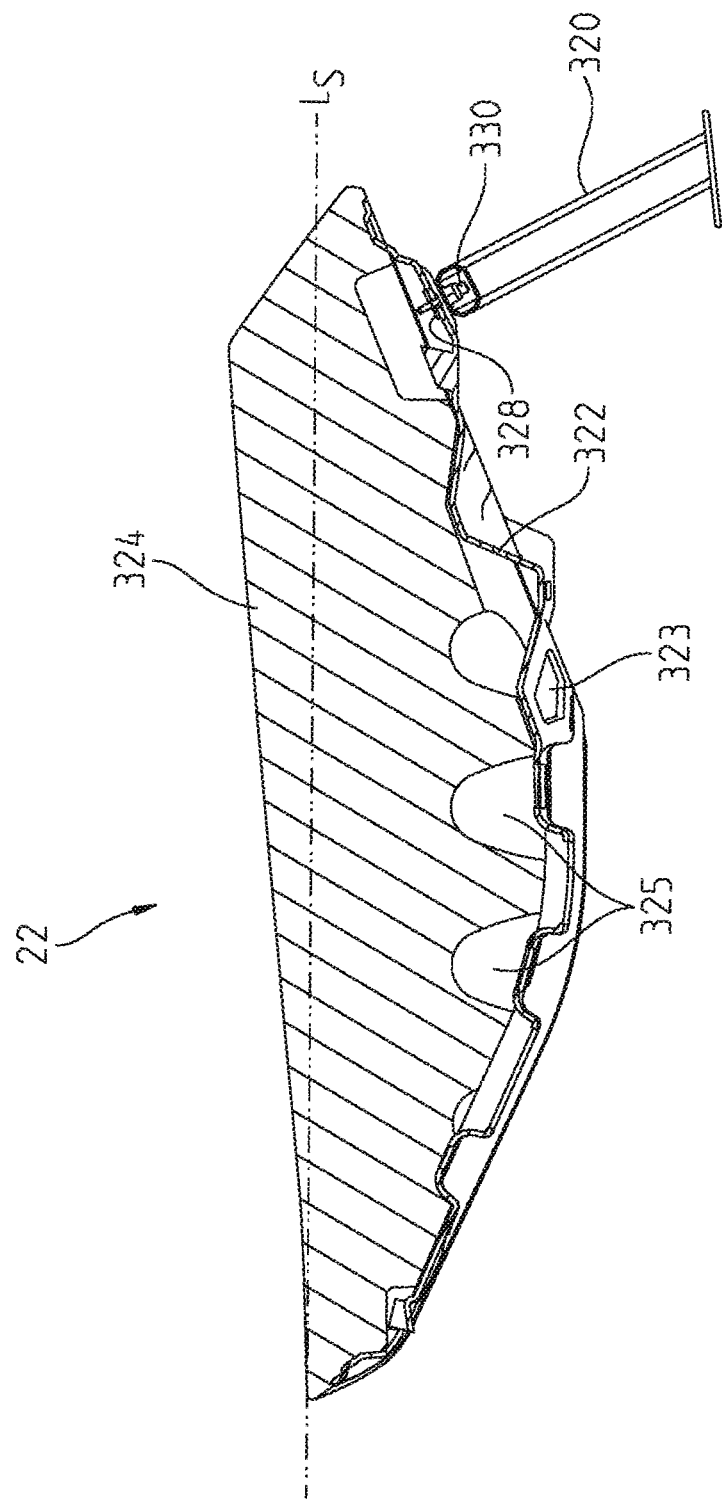
FIG. 41 is a side cross-sectional view of the seat assembly along a longitudinal axis of the seat assembly.

As shown in FIGS. 40 and 41, the top surface 324a of cushion 324 is generally flat and extends along a longitudinal axis $L_S$ of cushion 324. The sides 324b, 324c, 324d, 324e, 324f, 324g extend downwardly from top surface 324a and are generally slanted or angled. More particularly, sides 324b, 324c, 324d are generally mirror images of sides 324g, 324f, 324e, respectively, and are positioned on opposite sides of longitudinal axis $L_S$. Relative to conventional seat cushions for snowmobiles, the height of cushion 324 may be reduced and the width of cushion 324 may be increased because sides 324b, 324c, 324d, 324e, 324f, 324g extend both outwardly and downwardly.

Figure 39A:
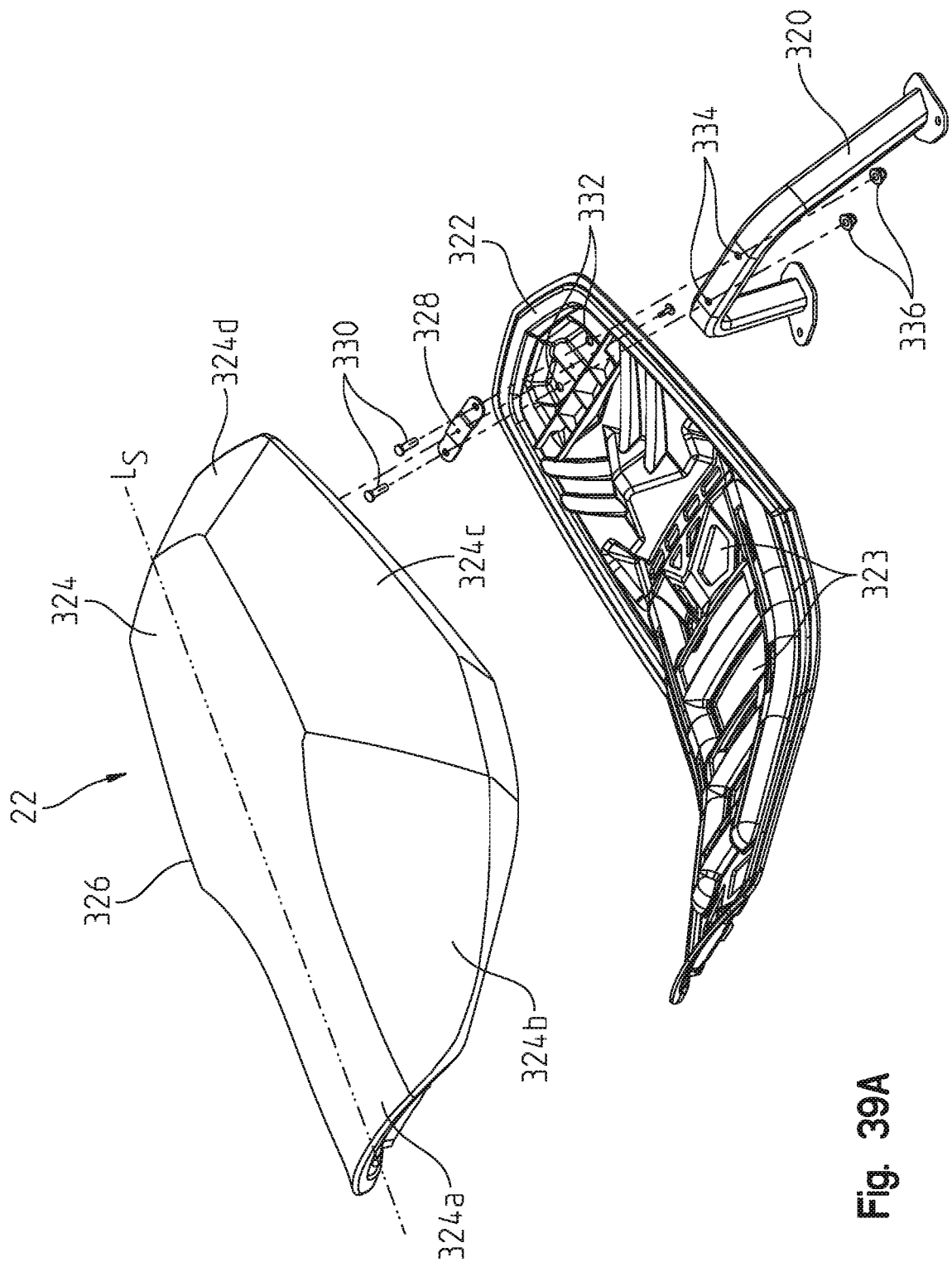
FIG. 39A is an exploded view of a seat assembly of the illustrative snowmobile of the present disclosure.
Figure 39B:
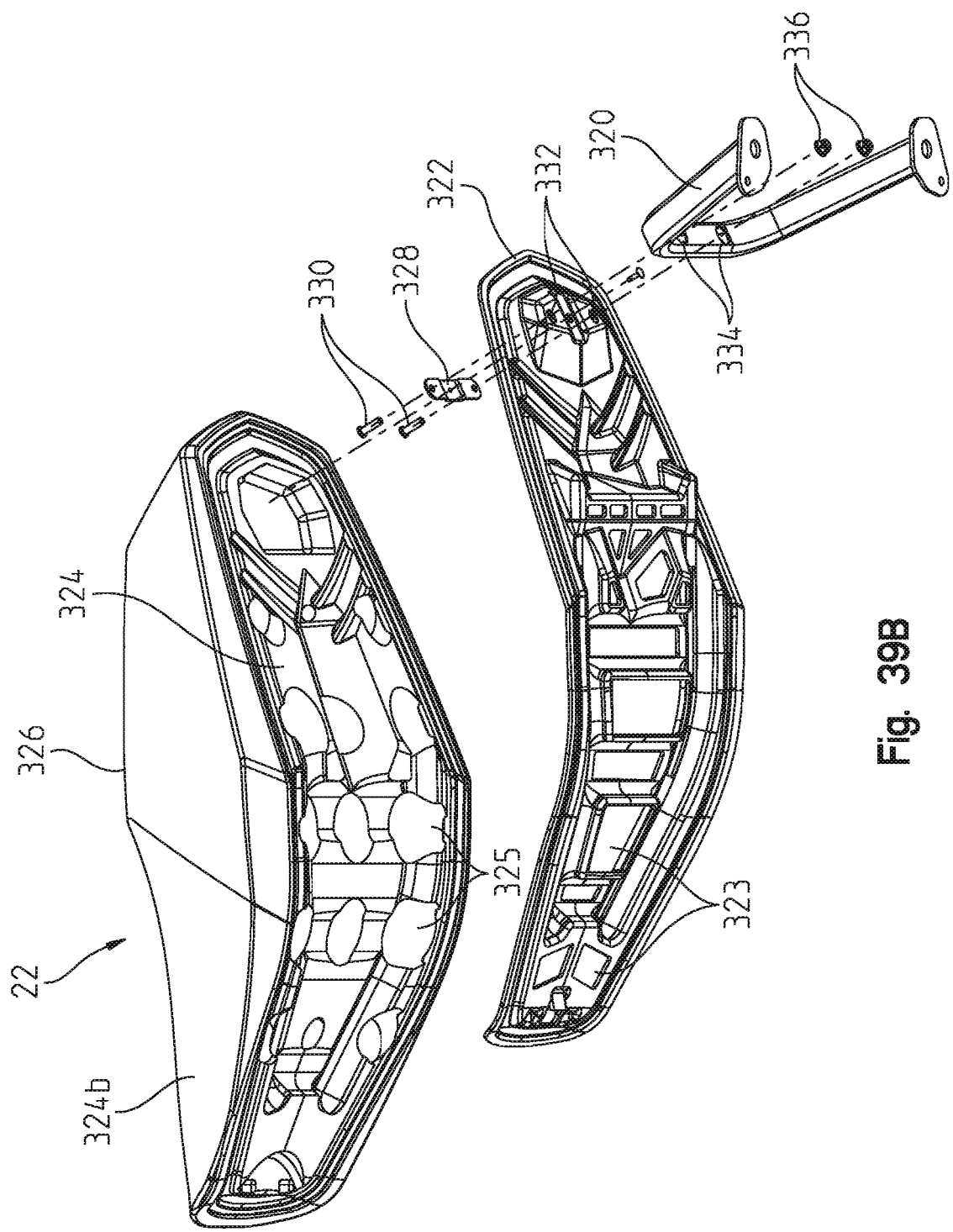
FIG. 39B is a further exploded view of the seat assembly of FIG. 39A.

Referring to FIGS. 39B and 41, cushion 324 also includes a plurality of voids 325. Voids 325 may be arranged in rows extending across the width of cushion 324, or otherwise distributed throughout cushion 324. For example, cushion 324 may include a plurality of rows having three voids 325 each. Illustratively, voids 325 are generally circular in cross-section but voids 325 may define other shapes in cross-section in other embodiments of seat assembly 22. Similarly, seat base 322 may include a plurality of apertures 323. The position of apertures 323 may correspond to the general position of voids 325, however, apertures 323 may positioned in other arrangements. Illustratively, apertures 323 have a generally polygonal shape, although apertures 323 may define other shapes (e.g., circle) in cross-section. The lightweight materials comprising seat base 322 and cushion 324 (e.g., polymers) reduce the weight of seat assembly 22. Additionally, voids 325 of cushion 324 and apertures 323 of seat base 322 also reduce the weight of seat assembly 22. As such, the weight of snowmobile 10 is reduced, which increases the maneuverability of snowmobile 10.

Figure 42:
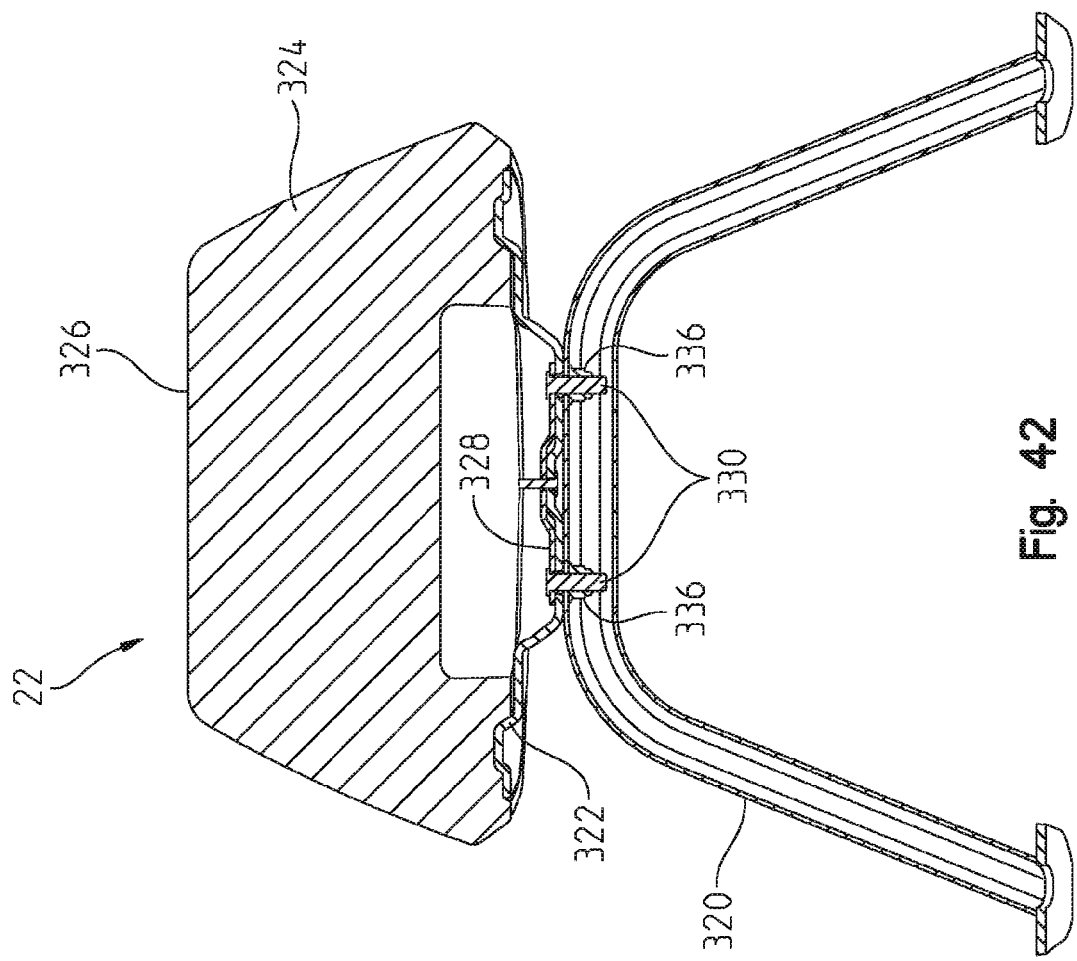
FIG. 42 is a rear cross-sectional view of the seat assembly.

Referring to FIGS. 41 and 42, seat base 322 is coupled to seat mount 320 through bracket 328 and fasteners 330. More particularly, fasteners 330 extend through apertures 332 in seat base 322 and through apertures 334 in seat mount 320 to support cushion 324 on tunnel 39. Fasteners 330 may be bolts, screws, rivets, or other couplers that extend through apertures 334 in seat mount 320 and couple with complementary fasteners 336, such as nuts.

As shown in FIGS. 1B and 16, endless track 16 may be supported by drive sprockets 124 and rear suspension 20, as further detailed herein. More particularly, endless track 16 extends from rear portion 350 to front wall 312 of tunnel 39. Additionally, endless track 16 extends at least partially into tunnel 39 and extends below tunnel 39 to contact the ground. The inner surface of endless track 16 is substantially flat and moves smoothly over drive sprockets 124 and portions of rear suspension 20.

Figure 52:
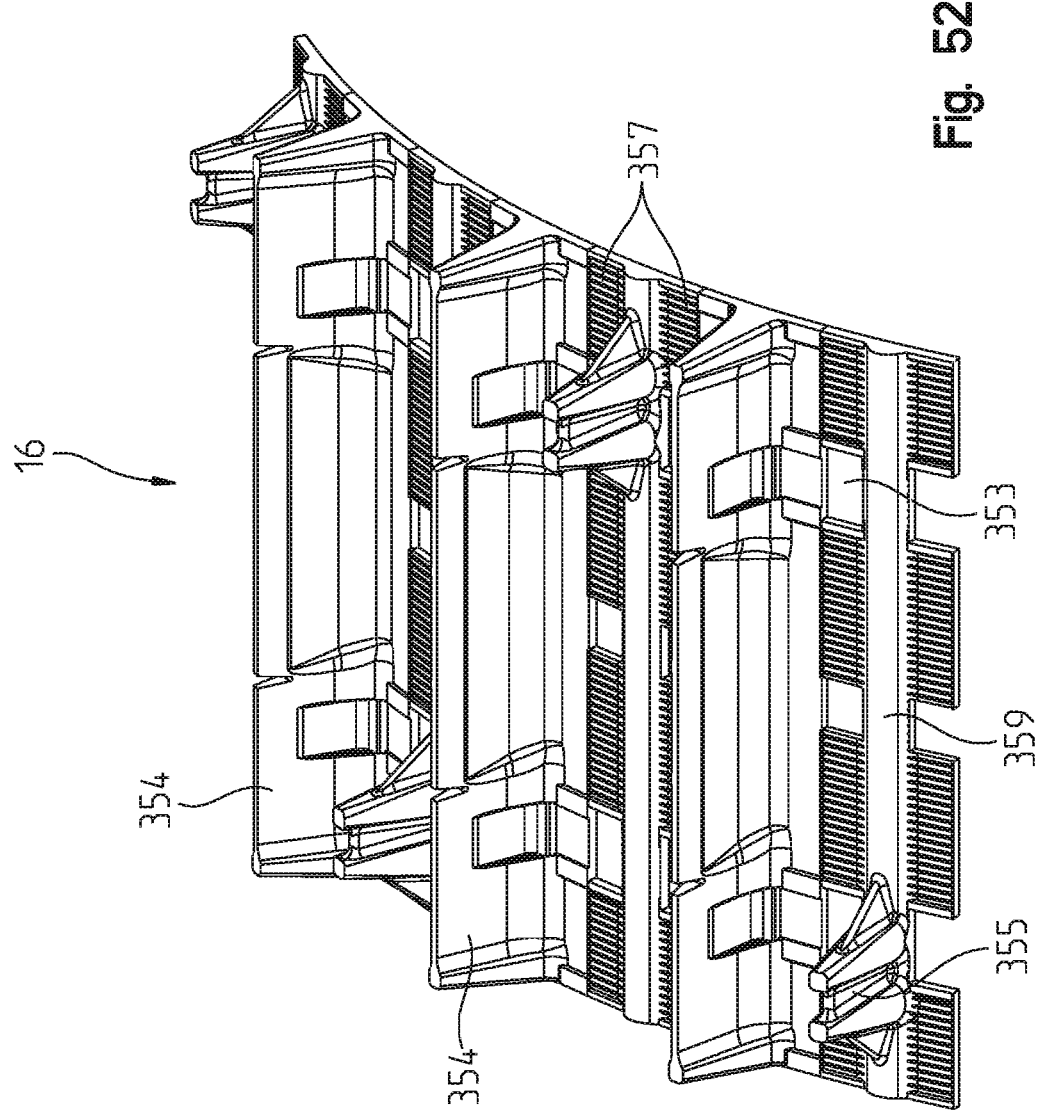
FIG. 52 is a portion of an endless track of the snowmobile.

As best shown in FIG. 52, the outer surface of endless track 16 includes a plurality of couplers 354 and a plurality of intermediate extensions 355. Couplers 354 extend across a plurality of tread layers 357 such that couplers 354 extend substantially across the width of endless track 16. Illustratively, endless track 16 includes four tread layers 357 extending in a circumferential direction. Intermediate extensions 355 are positioned in an alternating arrangement with couplers 354 and have a width less than the width of couplers 354. Each intermediate extension 355 is supported by a tread member 359 that is perpendicular to tread layers 357. As shown in FIG. 52, tread layers 354 intersect tread members 359 to define a plurality of apertures 353. Couplers 354 and intermediate extensions 355 project outwardly from tread layers 357 and tread members 359, respectively, to contact the ground. In one embodiment, the height of couplers 354 is approximately equal to the height of intermediate extensions 355. The width and height of couplers 354 may provide improved travel over icy or frozen surfaces. For example, when snowmobile 10 is travelling over rutted snow or frozen terrain, couplers 354 may break through more of the surface ice and snow.

Referring to FIG. 34, endless track 16 extends around rear suspension assembly 20, which is attached to the inner surfaces of side walls 310. A frame 356 of rear suspension assembly 20 includes laterally spaced frame rails 358, slide rails 360 attached to frame rails 358, and idler rollers 372, 374. Rear suspension assembly 20 also includes linear force elements, illustratively two coil-over shocks 362 and 364, providing dampening between tunnel 39 and frame 356, front torque arms 376, rear torque arms 378, and a pull rod 380. Rear torque arms 378 are positioned rearward of shocks 362, 364 and are coupled to the inner surfaces of idler rollers 372 and frame rails 358. Rear torque arms 378 also are operably coupled to pull rod 380 and shock 364. Shock 362 is coupled to front torque arms 376 and frame rails 358.

Figure 34A:
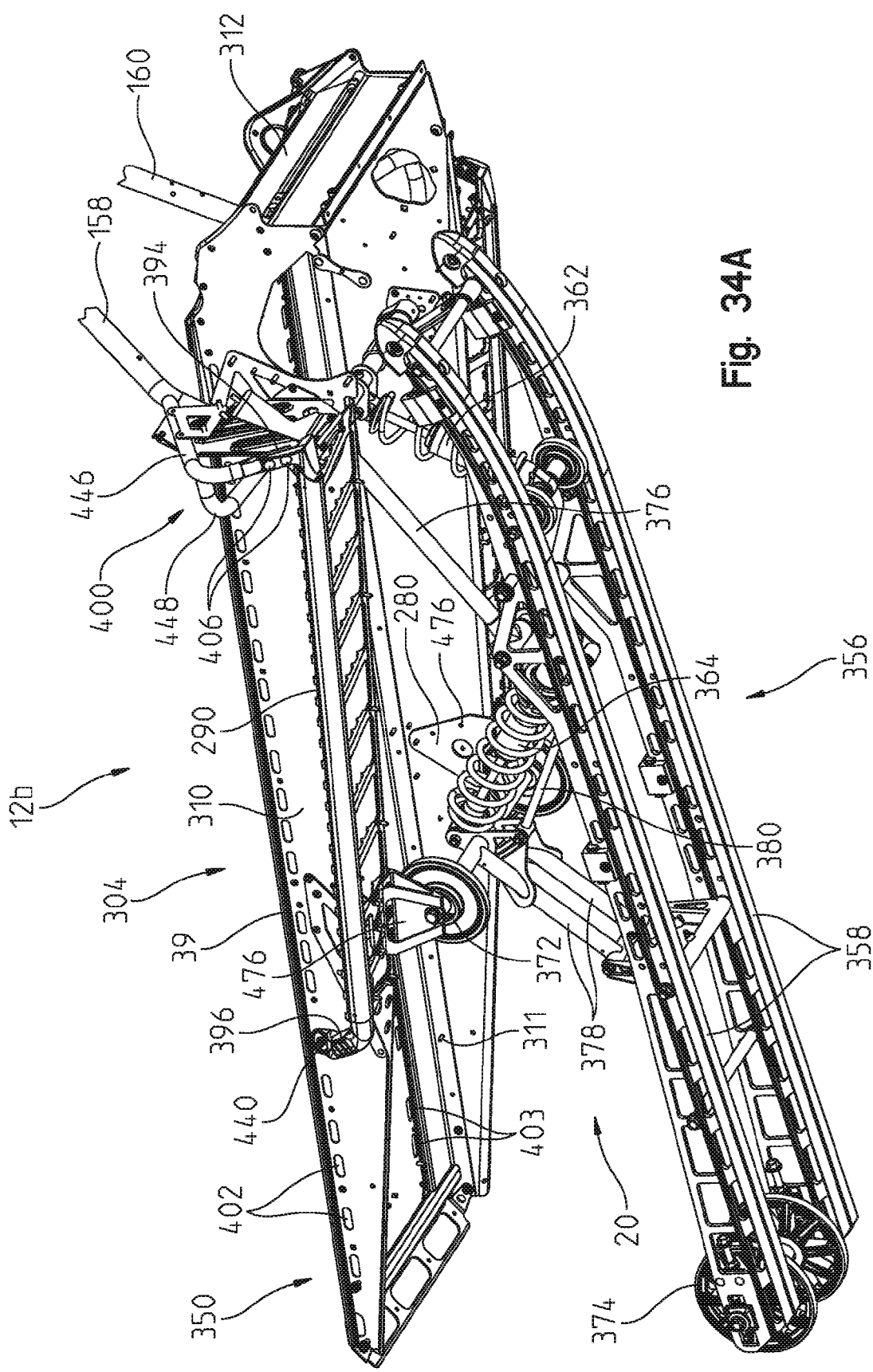
FIG. 34A is a bottom perspective view of a rear suspension and a tunnel of the illustrative snowmobile of the present disclosure.
Figure 34B:
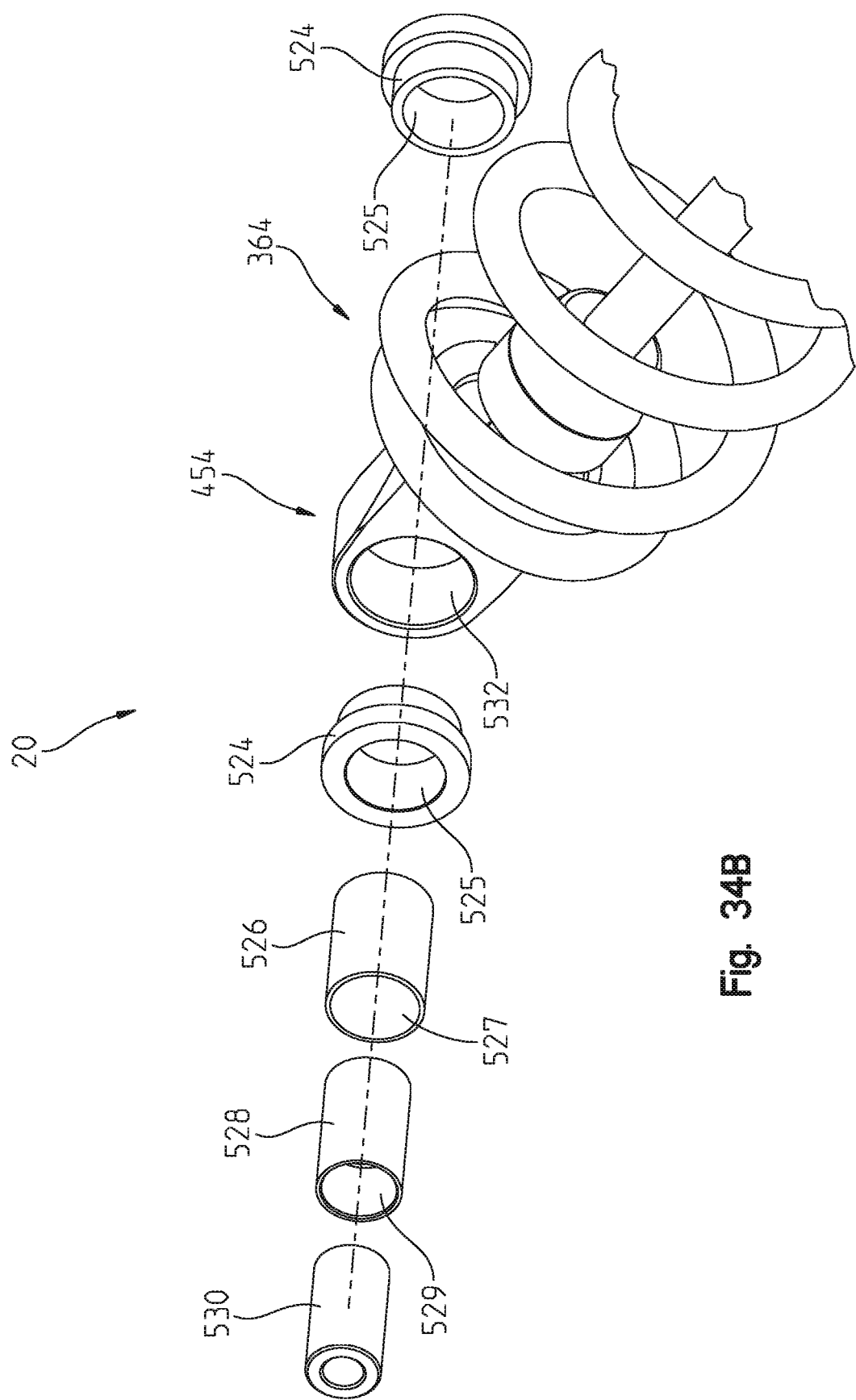
FIG. 34B is an exploded perspective view of a shock absorber of the rear suspension.

Referring to FIGS. 34A and 34B, front torque arms 376 are positioned intermediate shocks 362, 364 and an upper end 454 of front torque arms 376 is coupled to the inner surface of side walls 310 and operably coupled to shock 362. A lower end 456 of front torque arms 376 is coupled to frame rails 358 and operably coupled to shock 364 and pull rod 380.

As best shown in FIG. 34B, upper end 454 of shock 364 is coupled to front torque arms 376 with isolator members, illustratively bushings 524, sleeve members 526 and 528, and a bearing member 530. Bushings 524 are received within an aperture 532 of upper end 454 of shock 364, and include openings 525 to receive sleeve members 526, 528 and bearing member 530. In particular, sleeve member 526 includes an opening 527 to receive sleeve member 528. Similarly, sleeve member 528 includes an opening 529 to receive bearing member 530. As such, sleeve member 528 is press fit around bearing member 530 to generally surround bearing member 530. Sleeve member 528 and bearing member 530 are positioned within sleeve member 526, which is press fit within bushings 524, in order to couple shock 364 to front torque arms 376 of rear suspension 20. Sleeve members 526, 528 may be comprised of metal, for example, sleeve member 528 may be comprised of aluminum and sleeve member 526 may be comprised of steel. Bearing member 530 and bushings 524 may be comprised of a polymeric material (e.g., rubber). The lightweight materials of shock 364 may contribute to an overall weight reduction of snowmobile 10.

Figure 47A:
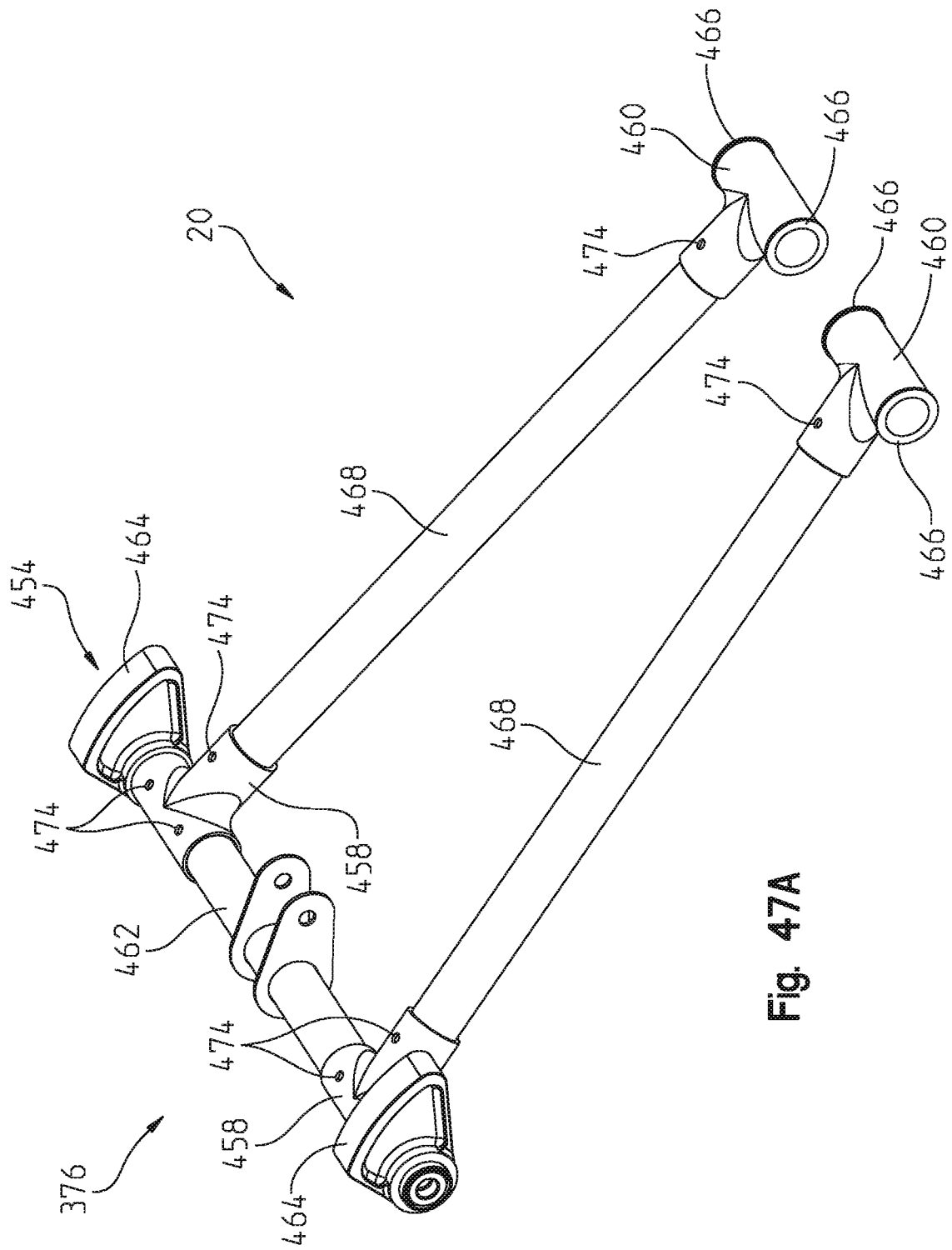
FIG. 47A is a side perspective view of a front torque arm of the rear suspension.
Figure 47B:
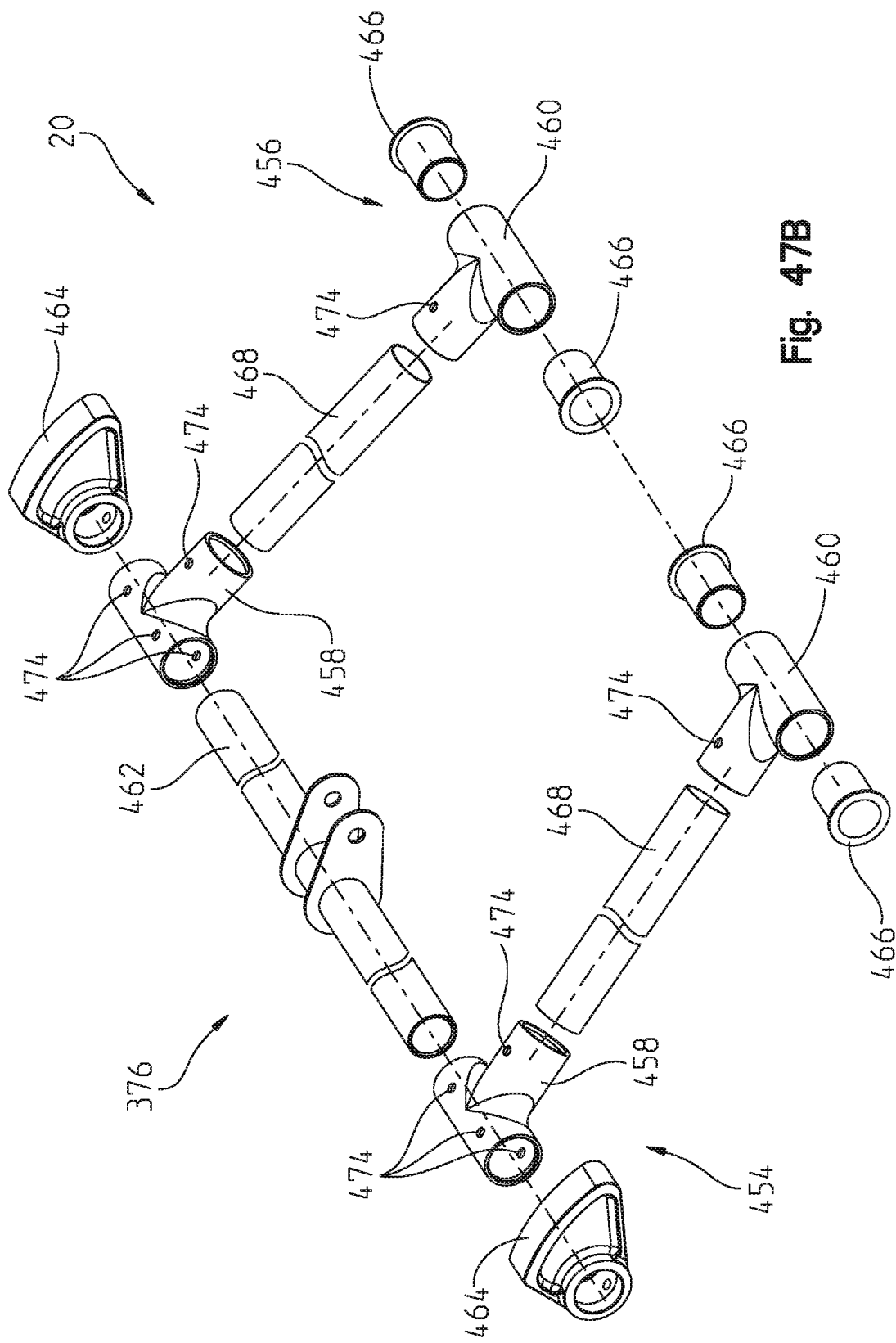
FIG. 47B is an exploded view of a front torque arm of the rear suspension of FIG. 34.

As shown in FIGS. 47A and 47B, front torque arms 376 include couplers 458, 460, a shaft 462, wear guides 464, bushings 466, and arm members 468. In particular, couplers 458 receive shaft 462 and upper ends 454 of arm members 468. Couplers 460 receive lower ends 456 of arm members 468 and bushings 466. Exemplary bushings 466 are available from Igus® GmbH and/or Igus® Inc. Rear torque arms 378 also may include arm members, couplers, and bushings. Similar to front torque arms 376, the couplers of rear torque arms 378 may receive bushings therethrough. Couplers 458, 460 may be formed through conventional casting processes.

Couplers 458 are coupled to upper ends 454 of arm members 468, shaft 462, and wear guides 464 with fasteners (not shown), such as bolts, screws, rivets, welds, adhesive, or a combination thereof. In particular, upper ends 454 of arm members 468 are received within couplers 458 and are coupled thereto with adhesive. Similarly, shaft 462 is received through couplers 458 and may be coupled thereto with adhesive. Additionally, lower ends 456 of arm members 468 are received within couplers 460 and are coupled thereto with adhesive.

Figure 48:
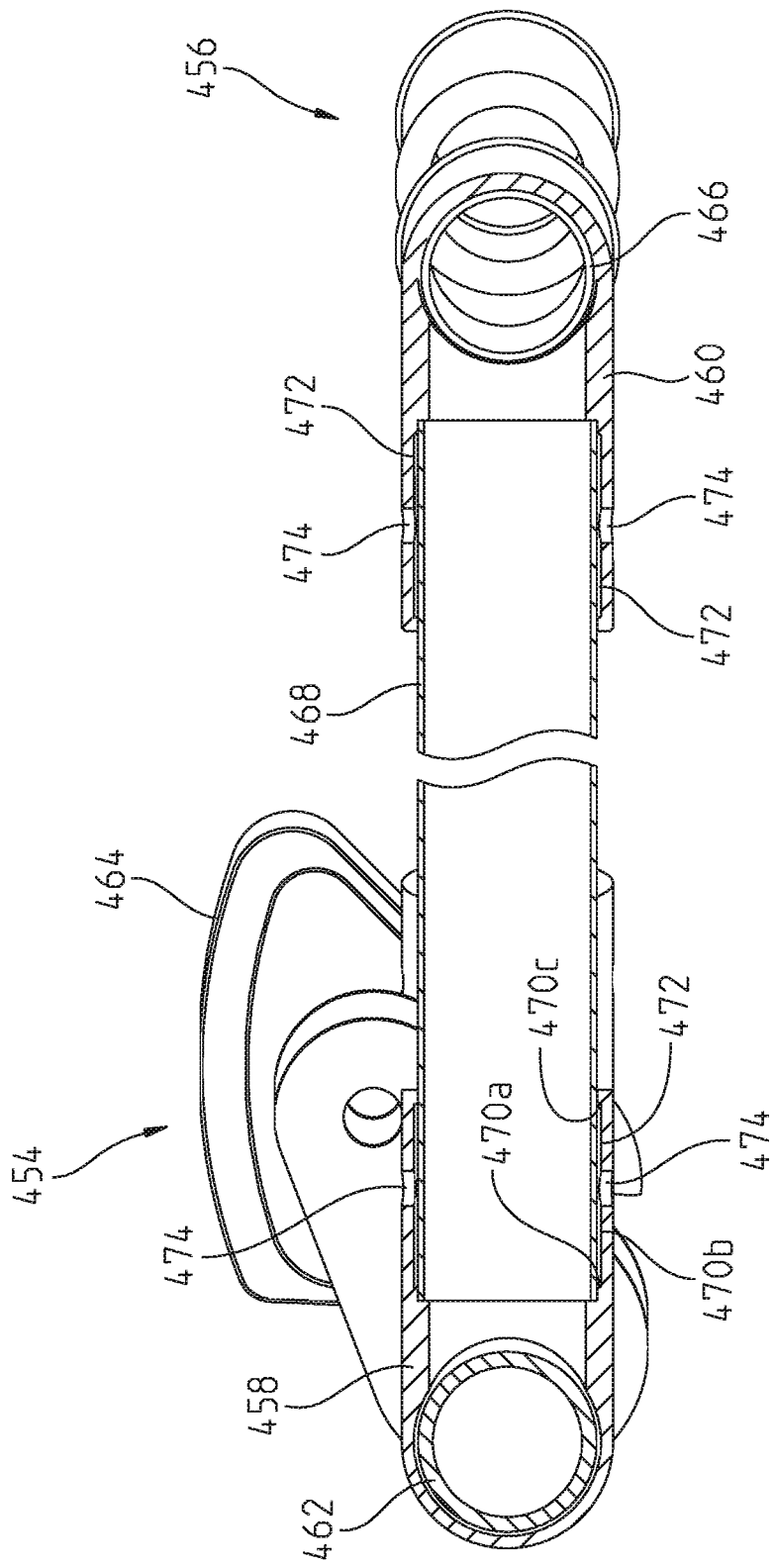
FIG. 48 is a cross-sectional view of an adhesive cavity formed by the front torque arm of FIG. 47A.

As shown in FIGS. 47B and 48, couplers 458, 460 include a recess 470 that defines an adhesive cavity 472 when arm members 468 slide into couplers 458, 460. Adhesive cavity 472 is bounded by surfaces 470a, 470b, 470c of recess 470 and arm members 468. Additionally, couplers 458, 460 include adhesive ports 474 through which the adhesive is injected into adhesive cavity 472. The adhesive may be applied in shear for a strong connection between couplers 458, 460 and arm members 468. For example, couplers 458, 460 and arm members 468 are bonded in shear when arm members 468 slide into couplers 458, 460. It is to be understood that shaft 462 may be coupled to couplers 458 in the same manner detailed herein. Additionally, rear torque arm 378 may be similarly bonded.

Exemplary adhesive materials are available from Lord Corporation. Accelerators may be used to decrease the cure time of the adhesive and also are available from Lord Corporation. Additionally, heat treatment, such as induction heating, may be used to further accelerate the cure time of the adhesive in adhesive cavity 472. Couplers 458, 460 and arm members 468 may be treated or prepared for the adhesive, as detailed herein. A predetermined volume of adhesive, corresponding to the volume of adhesive cavity 472, may be injected therein to ensure that the thickness of the adhesive at the connection between couplers 458, 460 and arm members 468 is sufficient for the required strength of the connection.

By using the adhesive, front torque arms 376 may be comprised of dissimilar materials. For example, arm members 468 and shaft 462 may be comprised of heat-treated steel, high-strength aluminum, carbon fiber, and other materials with similar properties. Couplers 458 and wear guides 464 may be comprised of high-strength aluminum, polymeric materials (e.g., ultra-high molecular weight polyethylene), and other materials with similar properties. Additionally, adhesive does not adversely affect material fatigue life and strength, or cause stress concentrations. The adhesive in front torque arms 376 also reduces the weight of rear suspension assembly 20 and, therefore, the weight of snowmobile 10. It is to be appreciated that couplers 460 may be bonded in shear to lower ends 456 of arm members 468 according to the illustrative method described herein. Additionally, other components of rear suspension assembly 20, such as rear torque arms 378, wear guides 464, and shaft 462, may also be assembled with the adhesive material.

As shown in FIG. 34, idler rollers 372 are coupled to suspension pads 476 and the inner surface of side wall 310. Additionally, suspension pads 476 are coupled to the bottom surface of running board plates 390 with fasteners. Suspension pads 476 include a first plate (not shown) and a second plate 480. More particularly, the first plate and second plate 480 may be comprised of dissimilar materials, such as aluminum and steel. Suspension pads 476 reinforce side walls 310 at the location of idler rollers 372.

Figure 49:
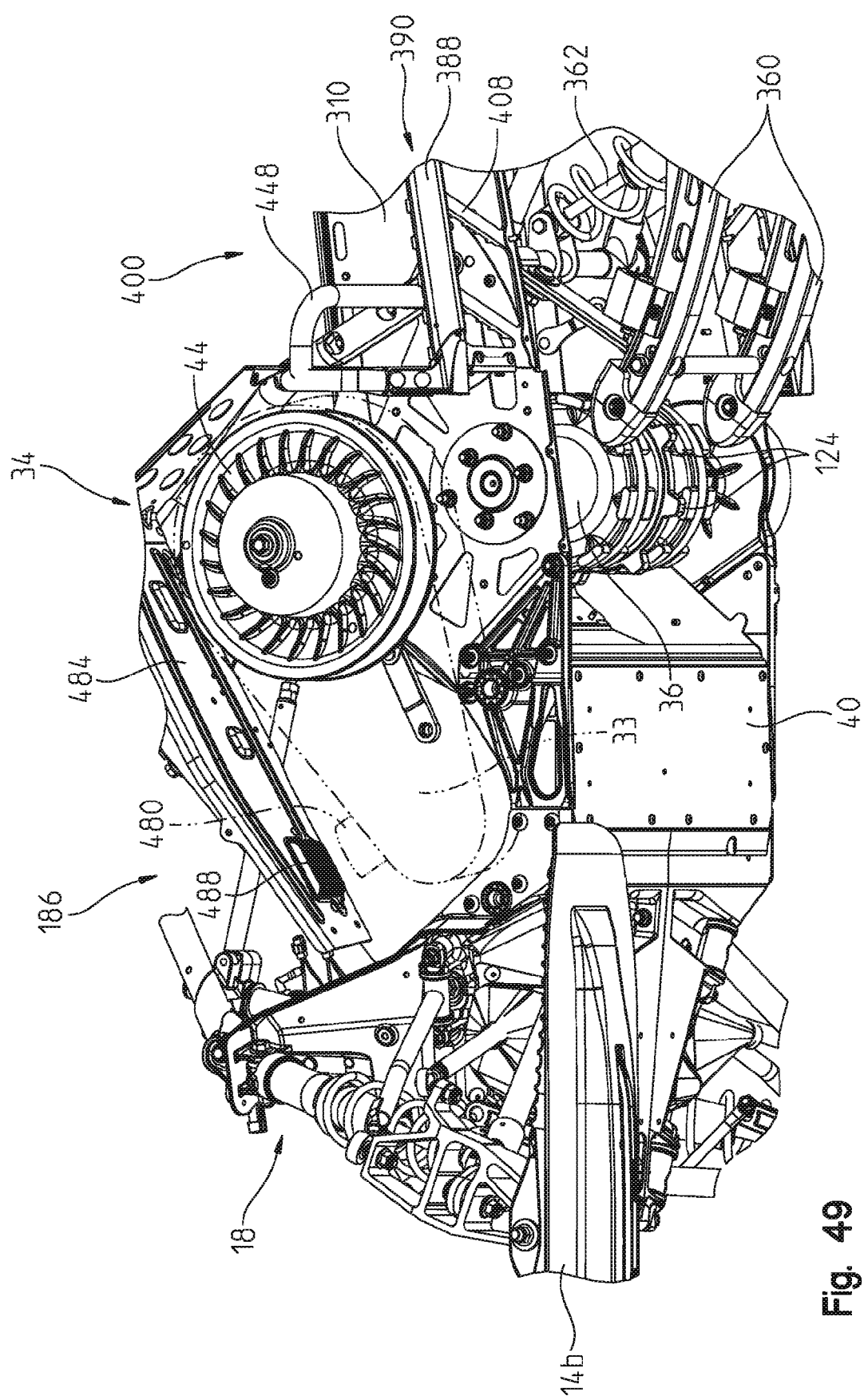
FIG. 49 is a bottom perspective view of a rail assembly and the drive shaft of the snowmobile of the present disclosure.

Referring to FIG. 49-51C, snowmobile 10 includes various electrical components supported by frame 12. For example, as shown in FIGS. 49-50B, a regulator (not shown) is housed in a regulator cover 482 on a regulator mount 484. The regulator may be configured for both AC and DC applications. Regulator cover 482 is positioned partially through an aperture 481 in regulator mount 484 and coupled to regulator mount 484 with fasteners. Regulator mount 484 is illustratively positioned above housing 33 of clutch assembly 32. More particularly, regulator mount 484 is adjacent an opening 480 in housing 33. Opening 481 of regulator mount 484 receives fins 488 of regulator cover 482. Illustratively, fins 488 extend in a generally downward direction from regulator mount 484 and are directed toward opening 480 in housing 33. In operation, air in housing 33 of clutch assembly 32 flows through the opening in housing 33 and toward fins 488, which receive the air from housing 33 to cool the regulator.

In an alternative embodiment of the present disclosure, bulkhead 186 or other components of front frame portion 12a may be used as a heat sink to cool the regulator. As such, regulator mount 484 may be coupled to bulkhead 186. Fins 488 also may be positioned to receive ambient air flowing through an opening (not shown) in the front outer body to cool the regulator.

Figure 51A:
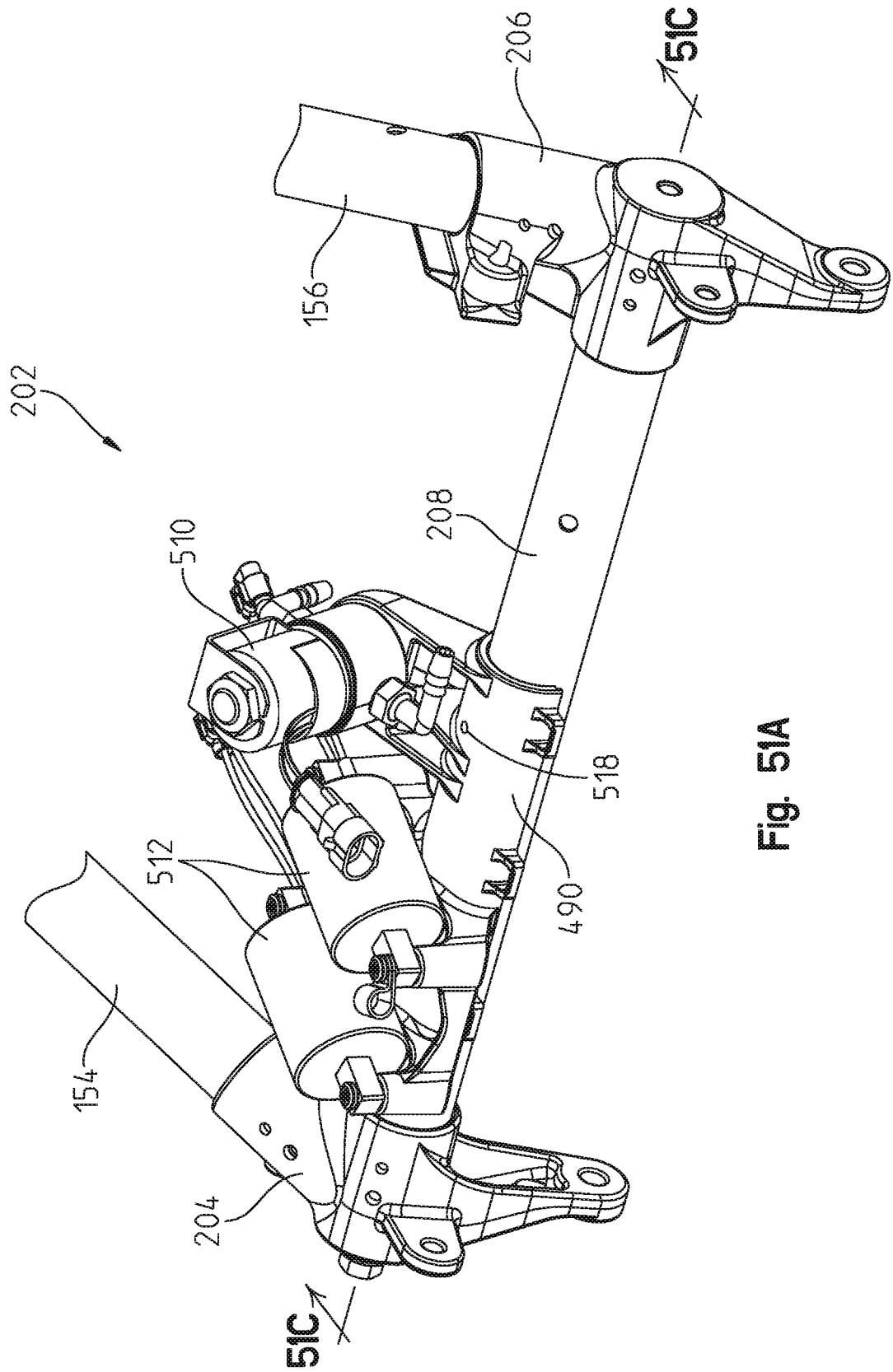
FIG. 51A is a front perspective view of a mount for a solenoid and EV coils of the illustrative snowmobile.
Figure 51B:
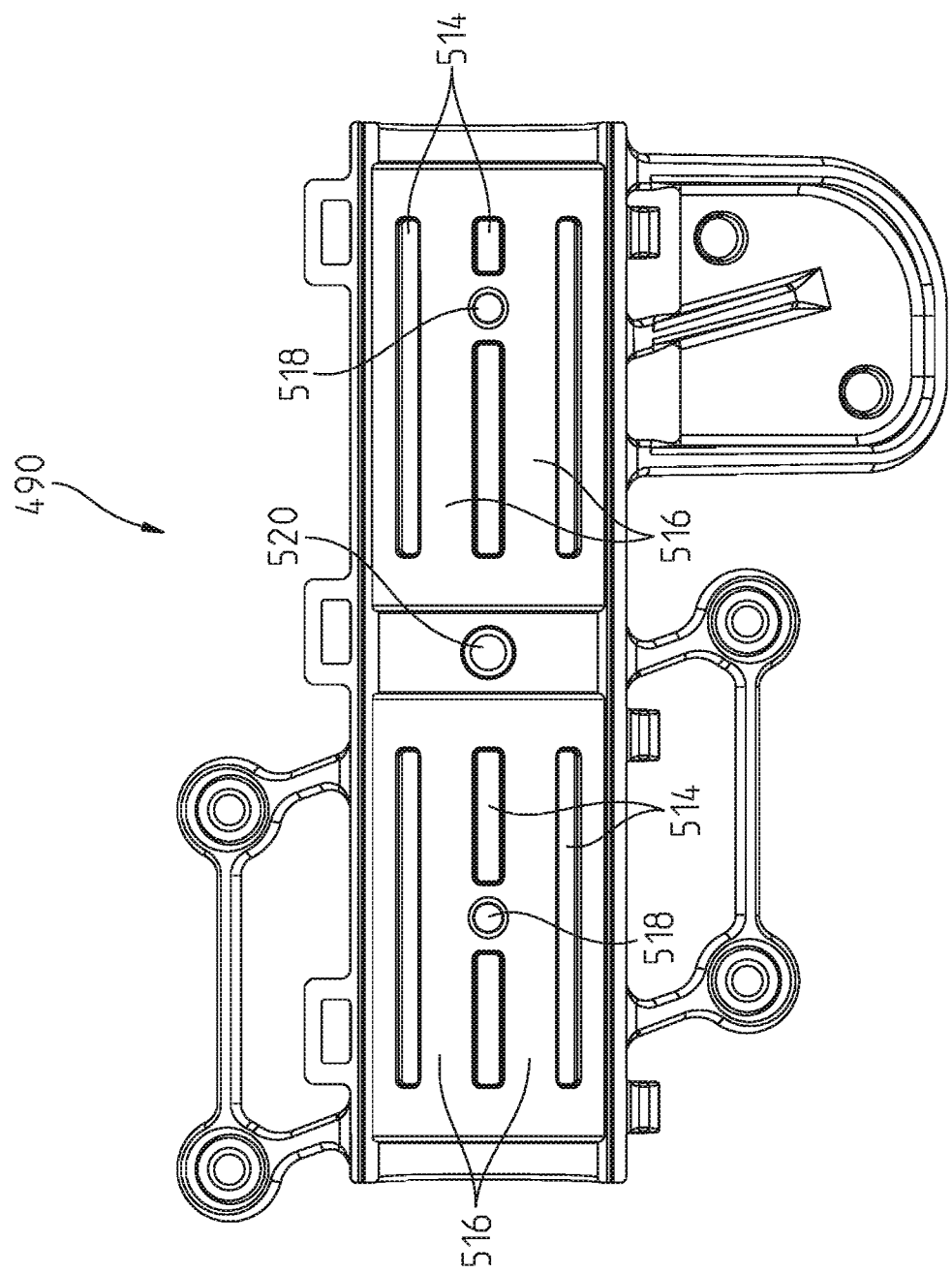
FIG. 51B is a bottom perspective view of the mount of FIG. 51A.
Figure 51C:
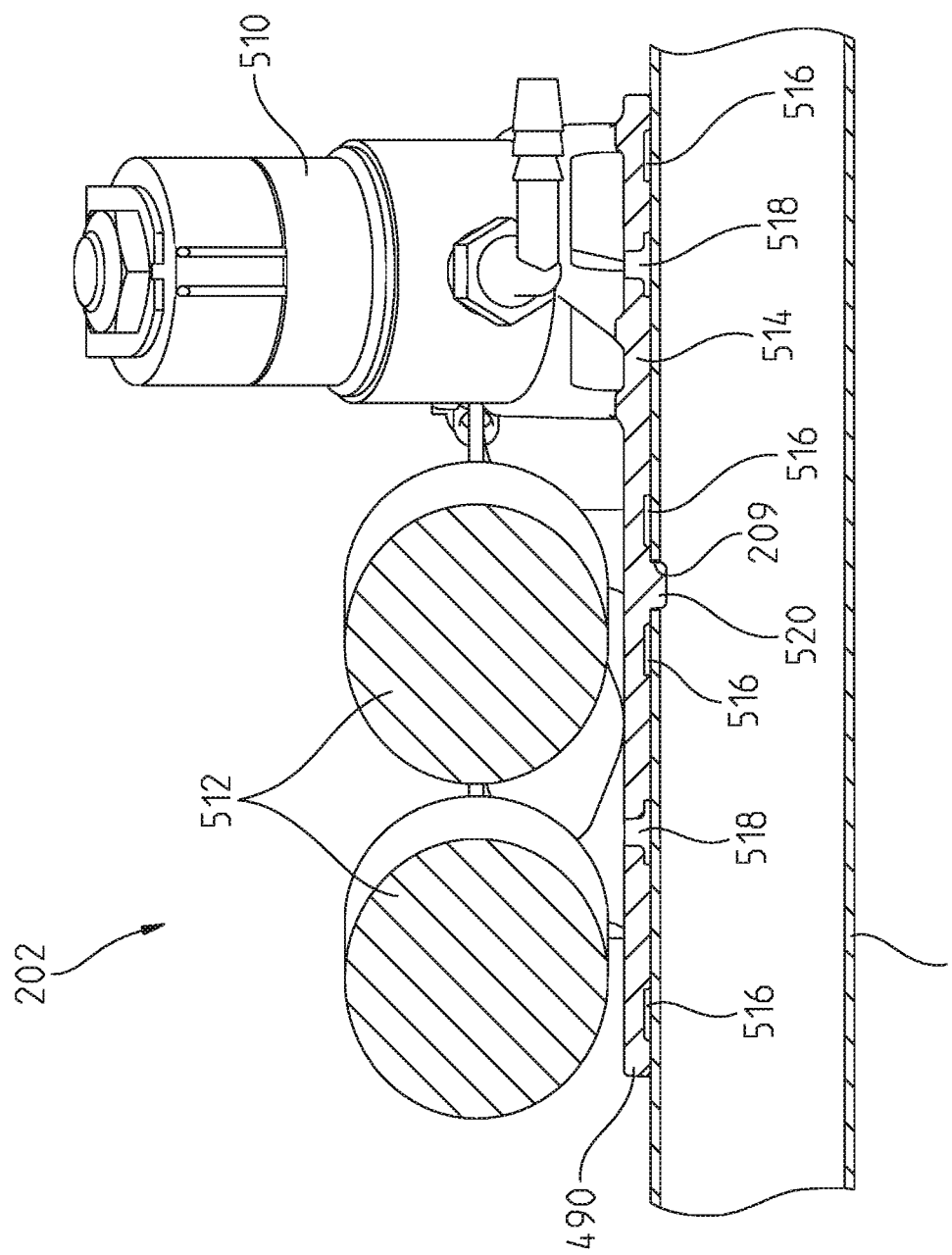
FIG. 51C is cross-sectional view of the mount of FIG. 51A, taken along line 51C-51C of FIG. 51A.

Referring to FIGS. 51A-51C, other electrical components of snowmobile 10 may include a solenoid 510 and EV coils 512. EV coils 512 and solenoid 510 may be supported by overstructure 202 of front frame portion 12a, and coupled to engine 28 and other components of snowmobile 10. Illustratively, lower frame tube 208 may be coupled to a mounting member 490 that supports EV coils 512 and solenoid 510 near the front of snowmobile 10. More particularly, mounting member 490 may be comprised of a plastic material and bonded to lower frame tube 208 with adhesive. A mechanical scuff or other abrasion treatment may be used to prepare lower frame tube 208 prior to bonding with mounting member 490.

The bottom surface of mounting member 490 may include a plurality of ribs 514 (FIG. 51B), which provide a textured surface to facilitate the adhesive bond between lower frame tube 208 and mounting member 490. In particular, the adhesive will be retained within the recessed portions 516 between ribs 514. The adhesive may be applied through adhesive ports 518 of mounting member 490 in the same illustrative manner described herein. For example, a predetermined volume of adhesive may be applied to mounting member 490 such that the thickness and, therefore, the effectiveness, of the adhesive bond may be known and controlled. Furthermore, as best shown in FIG. 51C, mounting member 490 includes a locating tab 520 that fits within locating aperture 209 of lower frame tube 208. Locating tab 520 cooperates with locating aperture 209 to position mounting member 490 on lower frame tube 208 prior to applying the adhesive to bond mounting member 490 to lower frame tube 208. It is to be understood that mounting member 490 may be coupled to other components of front frame portion 12a, for example front frame tubes 154, 156, according to the same illustrative method described herein.

Additionally, snowmobile 10 includes a display (not shown) to visually indicate the status of various operations and systems of snowmobile 10 to a rider. For example, the display may be positioned below handlebars 250 and may include a speed output and a fuel gauge. The fuel gauge communicates with a fuel resistor (not shown) to indicate the amount and type of fuel being used by snowmobile 10. In one embodiment, snowmobile 10 is configured to receive various types of fuel (e.g., ethanol, non-ethanol). The fuel gauge and fuel resistor may be configured to change the type of fuel being used by snowmobile 10 without changing the fuel resistor. As such, the rider may be able to increase the fuel efficiency of snowmobile 10.

Figure 53:
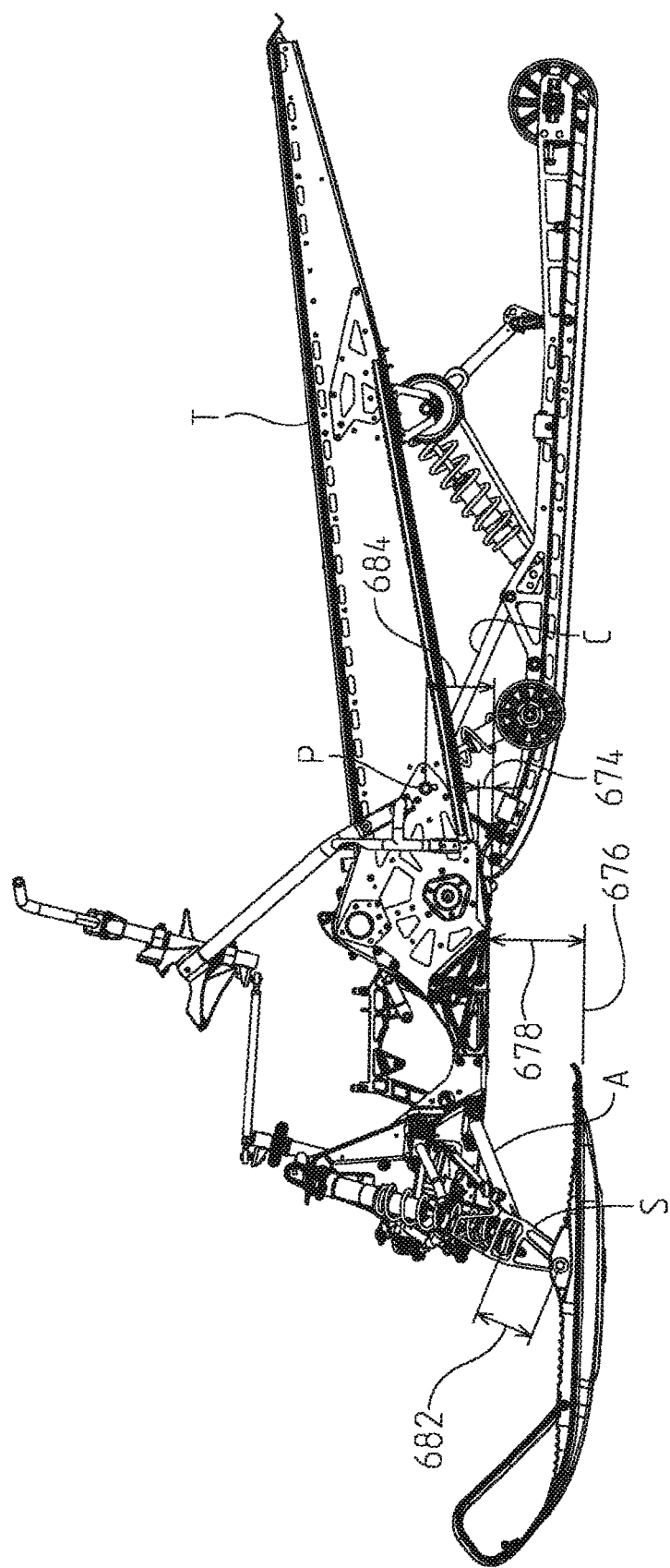
FIG. 53 shows a side view of a current version snowmobile.

With reference now to FIGS. 53-59, another embodiment of the snowmobile is shown. In the second embodiment, as shown in FIGS. 54-59, the components are substantially as disclosed in the snowmobile described above with respect to FIGS. 1-52, with the exceptions as provided below. The change to the embodiment of FIGS. 54-59 is that the snowmobile has been modified to increase the clearance under the snowmobile for deep snow. Before describing the embodiment of FIGS. 54-59, an existing snowmobile, as depicted in FIG. 53 will be described.

The snowmobile as depicted in FIG. 53 is an existing snowmobile, and is Applicant's RMK model. As shown, the snowmobile has various components which dictate the clearance underneath the snowmobile. For example, and starting from the front of the snowmobile, distance 682 in the FIG. 53 embodiment is the length of the spindle S from a ski bolt hole to a lower ball joint of the A-arm. In this snowmobile, distance 682 is 4.91 inches (124.66 mm). Moving rearwardly, the next relevant distance is the distance is measured from a bottom of the engine cradle to a position to the bottom 676 of the ski. In this embodiment, the distance 678 is 7.433 inches (188.80 mm). Finally, the height of the snowmobile frame (and in particular, tunnel T) in relation to the ground is influenced by the rear suspension, and in particular the location of the point of rotation P of a front control arm C on the tunnel. In the embodiment of FIG. 53, the distance 684 is the distance from the bottom of the engine cradle to the pivot point P on the tunnel, and is 5.3391 inches (135.613 mm).

Figure 54:
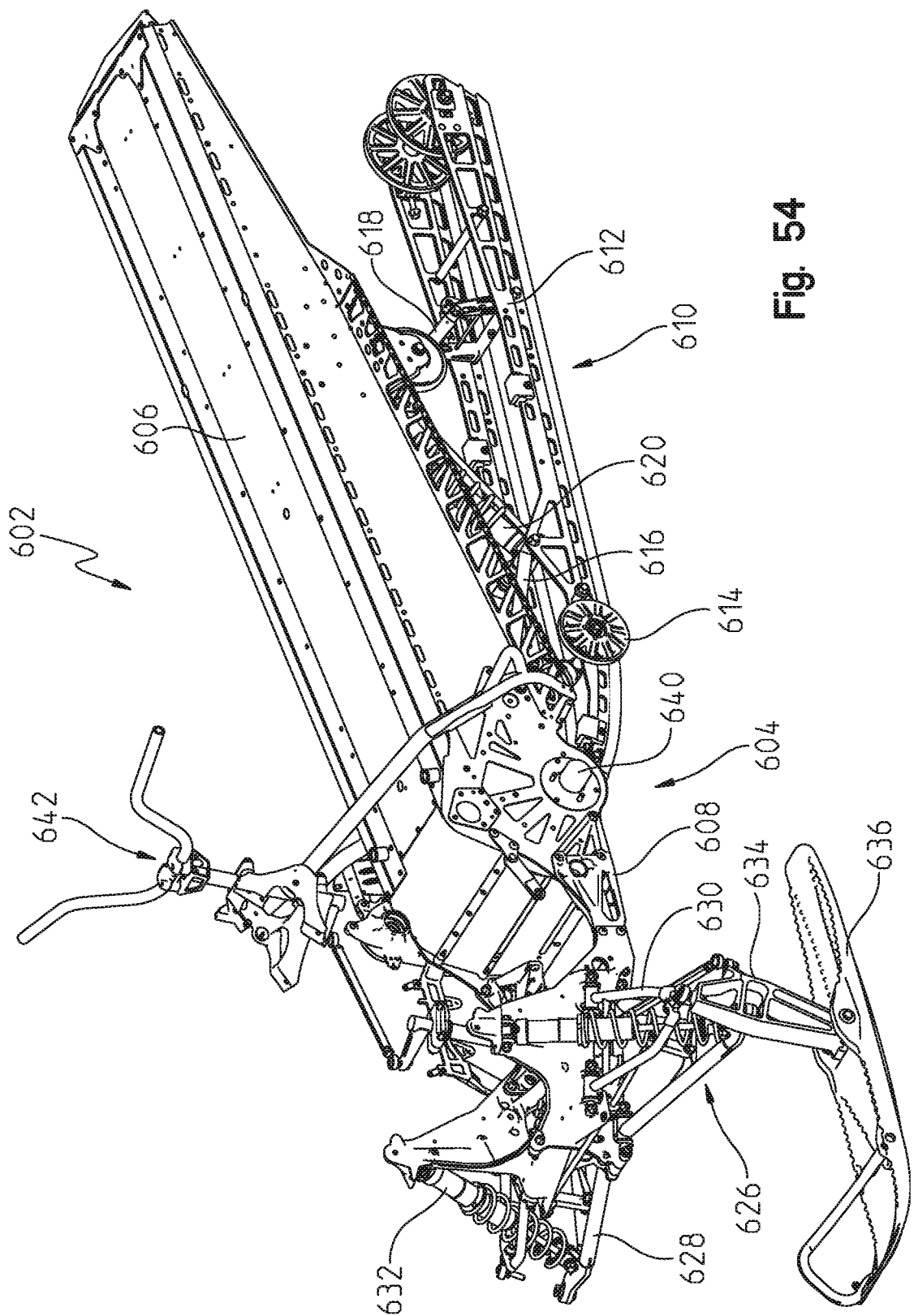
FIG. 54 shows a front left perspective view of the main portions of a deep snow snowmobile.
Figure 55:
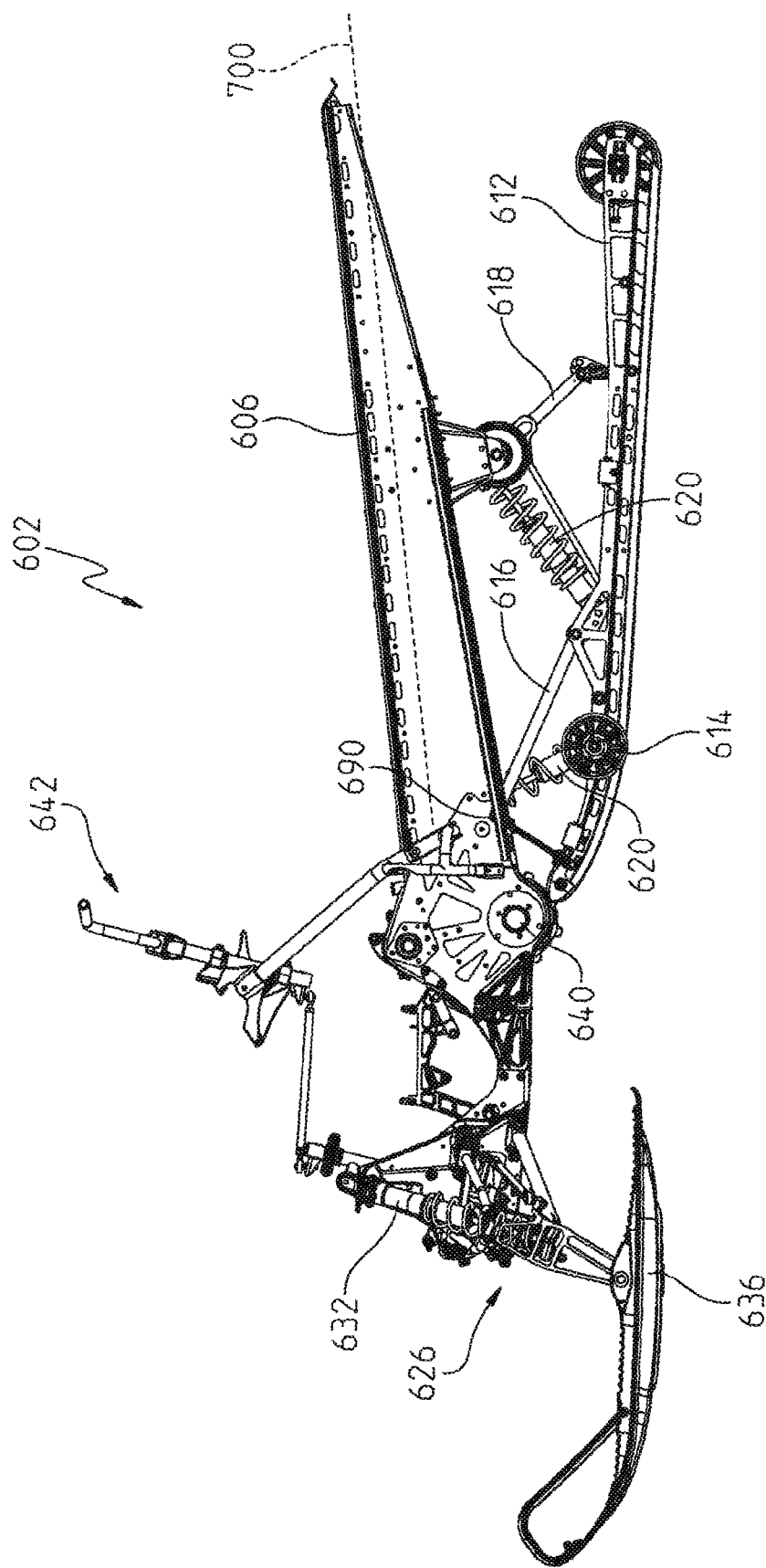
FIG. 55 shows a left side view of the snowmobile of FIG. 54.

With reference now to FIGS. 54 and 55, the main portions of the snowmobile are shown at 602. Snowmobile 602 includes a frame 604 including a tunnel 606 and a frame front portion 608. It should also be appreciated that snowmobile includes rear suspension 610 including such items as slide rails 612, carrier rollers 614, front control arms 616, rear control arms 618 and shock absorbers at 620. Tunnel 606 may incorporate a cooling system for engine water as more fully described in our U.S. Pat. No. 7,870,920, the disclosure of which is incorporated herein by reference.

Snowmobile 602 would also include a front suspension system shown at 626 including lower control arms 628, upper control arms 630, a shock absorber 632, and a spindle 634 attached to ski 636. Snowmobile frame front portion 608 may be similar to our U.S. Publication number 20110132679, the subject matter of which is incorporated herein by reference. Snowmobile 602 also includes a drive mechanism at 640 and a steering mechanism at 642.

Figure 56:
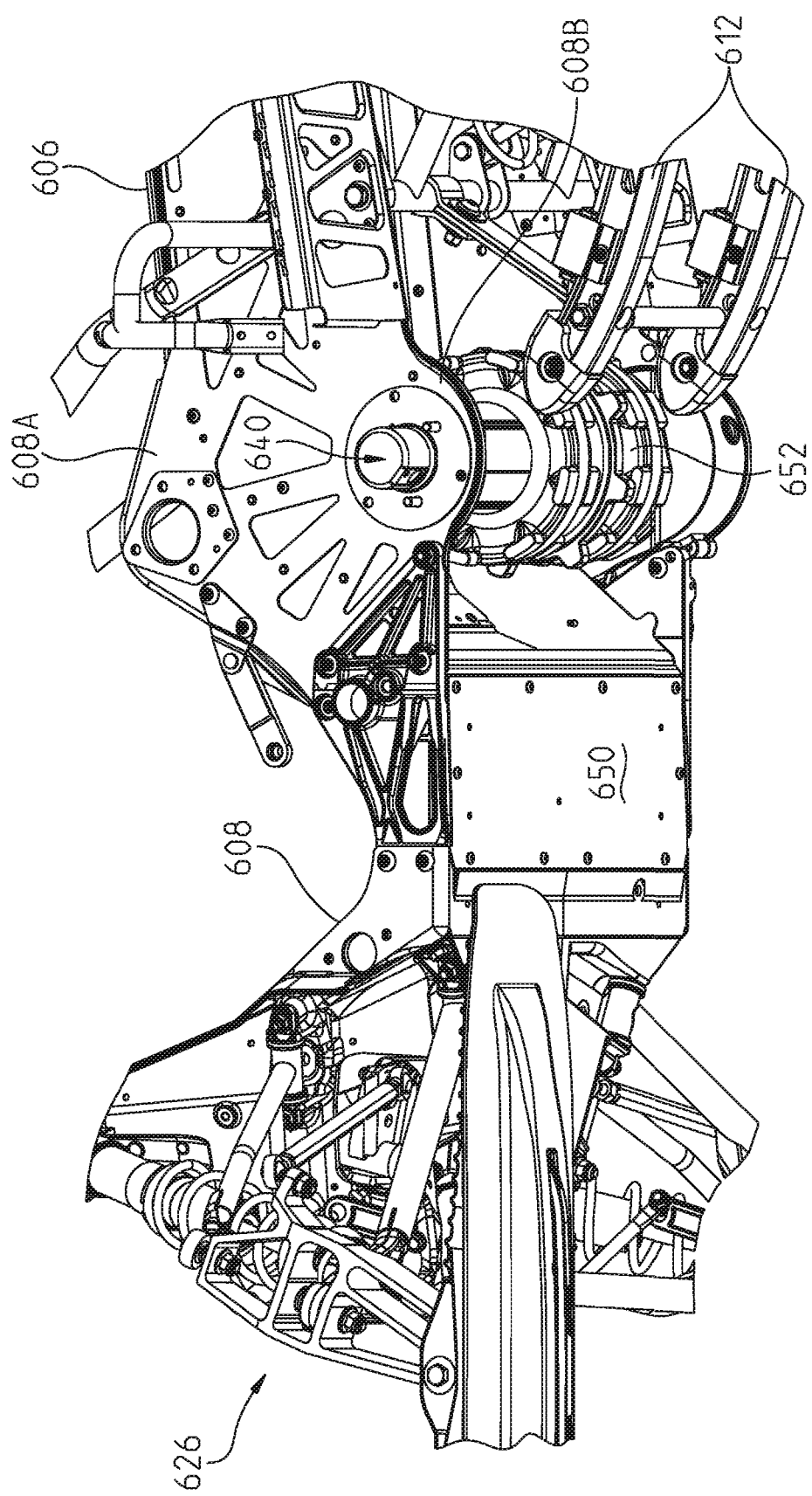
FIG. 56 shows an underside perspective view of the snowmobile front frame.

As shown in FIG. 56, a lower body panel 650 is shown which extends across the bottom of the snowmobile and defines the lowest front portion of the snowmobile relative to the ground (snow). FIG. 56 also shows the drive shaft 640 including drive sprockets 652, where drive sprockets 652 are positioned forward of slide rails 612 and lower than body panel 650, as more fully described herein. Given the above general description, the raised chassis portion of the snowmobile for deep snow 602 will now be described.

Figure 57:
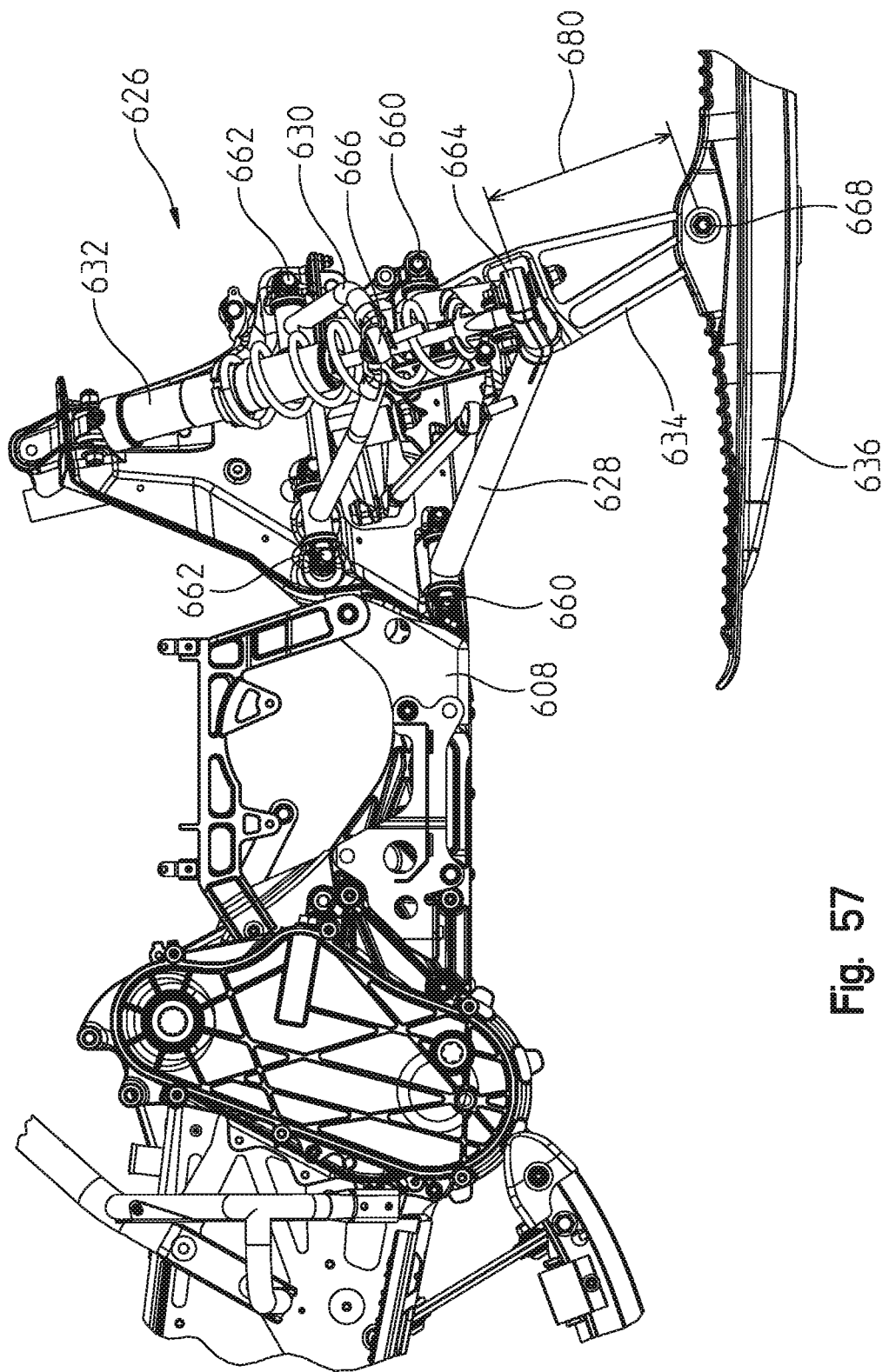
FIG. 57 shows a right hand side enlarged view of the snowmobile of FIG. 54.
Figure 58:
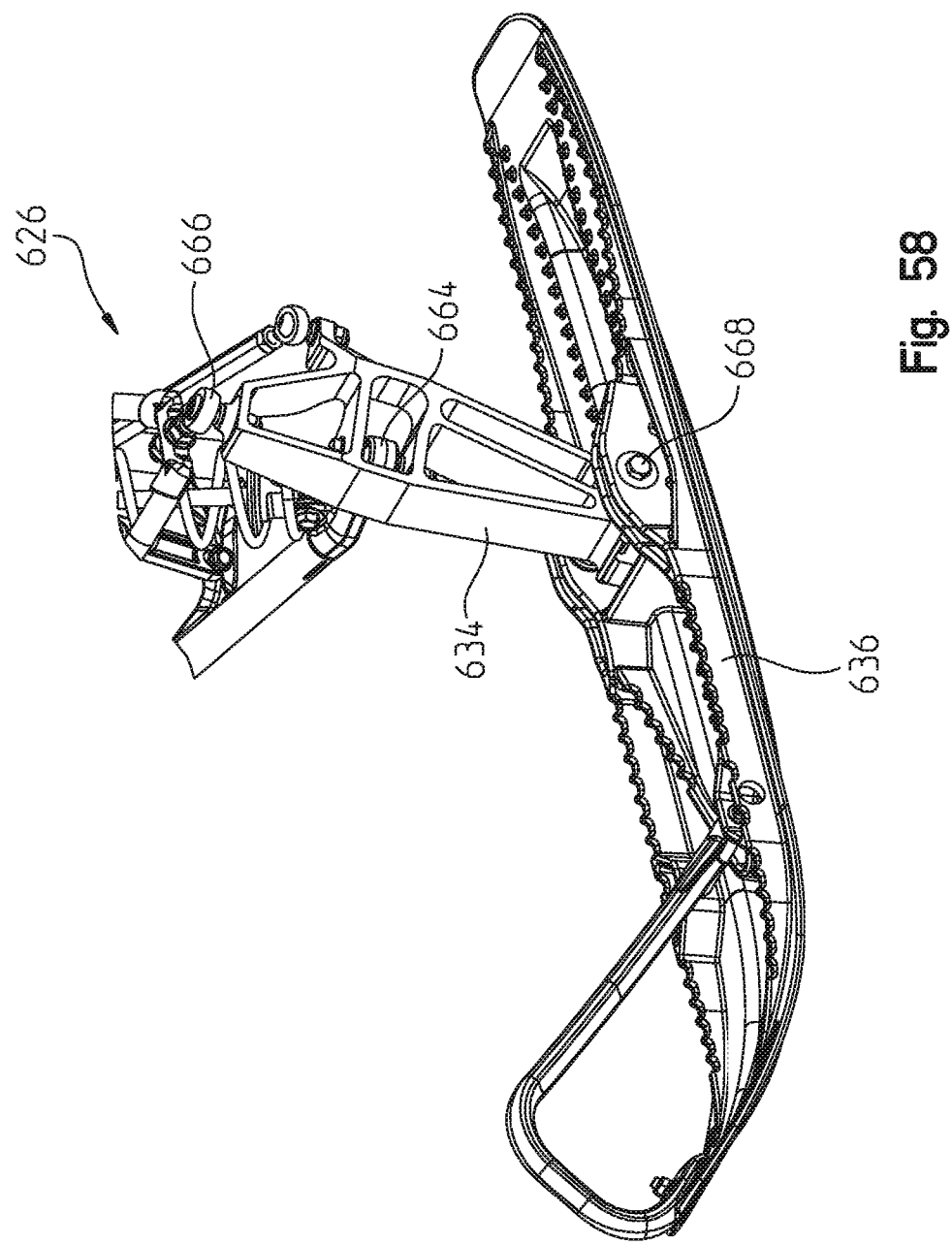
FIG. 58 shows an enlarged view of the front left ski and its attachment to the suspension system.

With reference to FIGS. 57 and 58, the front suspension 626 will be described in greater detail as modified for the raised chassis. As shown best in FIG. 57, lower control arm 628 is attached to bulkhead 608 at pivotal connections 660 whereas upper control arm 630 is attached to bulkhead 608 at pivotal connections 662. Meanwhile, lower control arm 628 is attached to spindle 634 at ball joint 664 and upper control arm 630 is attached to spindle at ball joint 666. Spindle 634 is attached to ski 636 about a fastener 668.

With reference still to FIG. 57, a distance 680 is shown which is the distance between the center of ball joint 664 (within spindle 634) to the center of the fastener 668. As shown, and in a first embodiment, distance 680 is 6.91 inches (175.41 mm) whereas the analogous distance 682 in the FIG. 53 embodiment is 4.91 inches (124.66 mm). Thus, the spindle has been raised by an additional two inches yet the suspension components, namely the lower control arm 628 and upper control arm 630 are positioned in the same manner relative to the bulkhead and the spindle 634 as before; the length of the spindle has only changed from a position downwardly from the connection point of the lower control arm 628.

Figure 59:
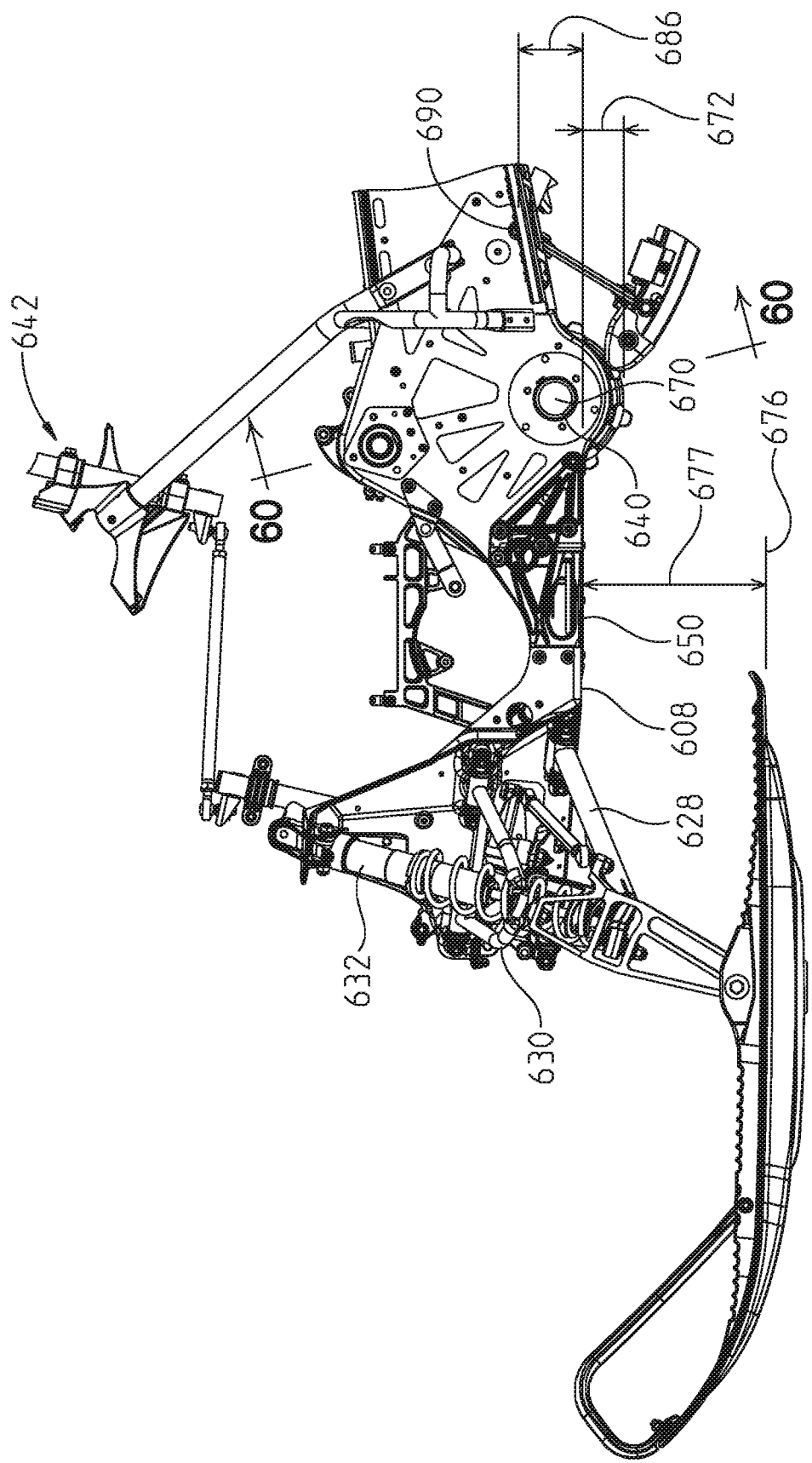
FIG. 59 shows an enlarged portion of the left front end of the snowmobile of FIG. 55.

With respect to FIG. 59, the body panel 650 is positioned vertically adjacent to a center line 670 of the driveshaft 640. In the embodiment shown, the distance from the body panel 650 to centerline 670 is preferably less than one and a half inches and in the embodiment shown is 1.4 inches (31.64 mm). Furthermore, the bottom of the chassis 650 has been raised relative to a lower outer portion of the drive sprocket 652. In the FIG. 53 embodiment, the bottom of the sprocket is essentially planar with the bottom of the chassis, such that distance 674 is approximately 0.1775". In the FIG. 59 embodiment, and in a first embodiment, the distance 672 is approximately 2.1772 inches or approximately 2 inches greater.

It should also be noted that the center line 670 of the driveshaft has not been lowered relative to a ground plane 676 but rather the remaining portion of the chassis has been raised relative to the ground plane 676. In the embodiment shown, the body panel 650 has been raised by approximately two inches relative to the ground plane 676. As shown, and in a first embodiment, the distance 677 between the body panel 650 and the ground plane 676 is 9.12 inches (231.647 mm). In the embodiment depicted in FIG. 53, the corresponding distance 678 is 7.261 inches (184.432 mm). Thus, the end result of the design changes mentioned above has raised the ground clearance of the body panel 650 relative to the ground plane, and relative to the top surface of the snow.

Specifically, this has been accomplished by providing a revised bulkhead portion 608A (FIGS. 56 and 60), which is provided with a semi-circular portion 608B profiled to receive the drive mechanism 640. In addition, and as mentioned above, the revised spindle 634 has been elongated which raises the location of the upper and lower control arms relative to the previous snowmobiles.

Also, the tunnel 606 is raised relative to the ground by moving the connection of the front control arm 616 relative to the tunnel 606. Namely, the connection point between the two is shown at 690 in FIG. 55. As shown in FIG. 59, the distance from the bottom of the chassis at 650 to the connection point 690 is shown as distance 686. In the first embodiment, the distance 686 is 3.34 inches (84.84 mm) and in the embodiment of FIG. 53, the analogous distance 674 is 5.34 inches (135.64 mm).

In a second embodiment, the corresponding distances have been slightly altered. Namely, in a second embodiment, the relevant distances are:
672=1.5 inches (38.10 mm)
677=8.34 inches (211.84 mm)
680=6.2 inches (157.48 mm)
686=3.97 inches (100.84 mm)

Thus as shown below, two embodiments have been described with the following dimensions:

and the jackshaft, repositioning the location of the fuel tank, among others as described below.

Figure 60:
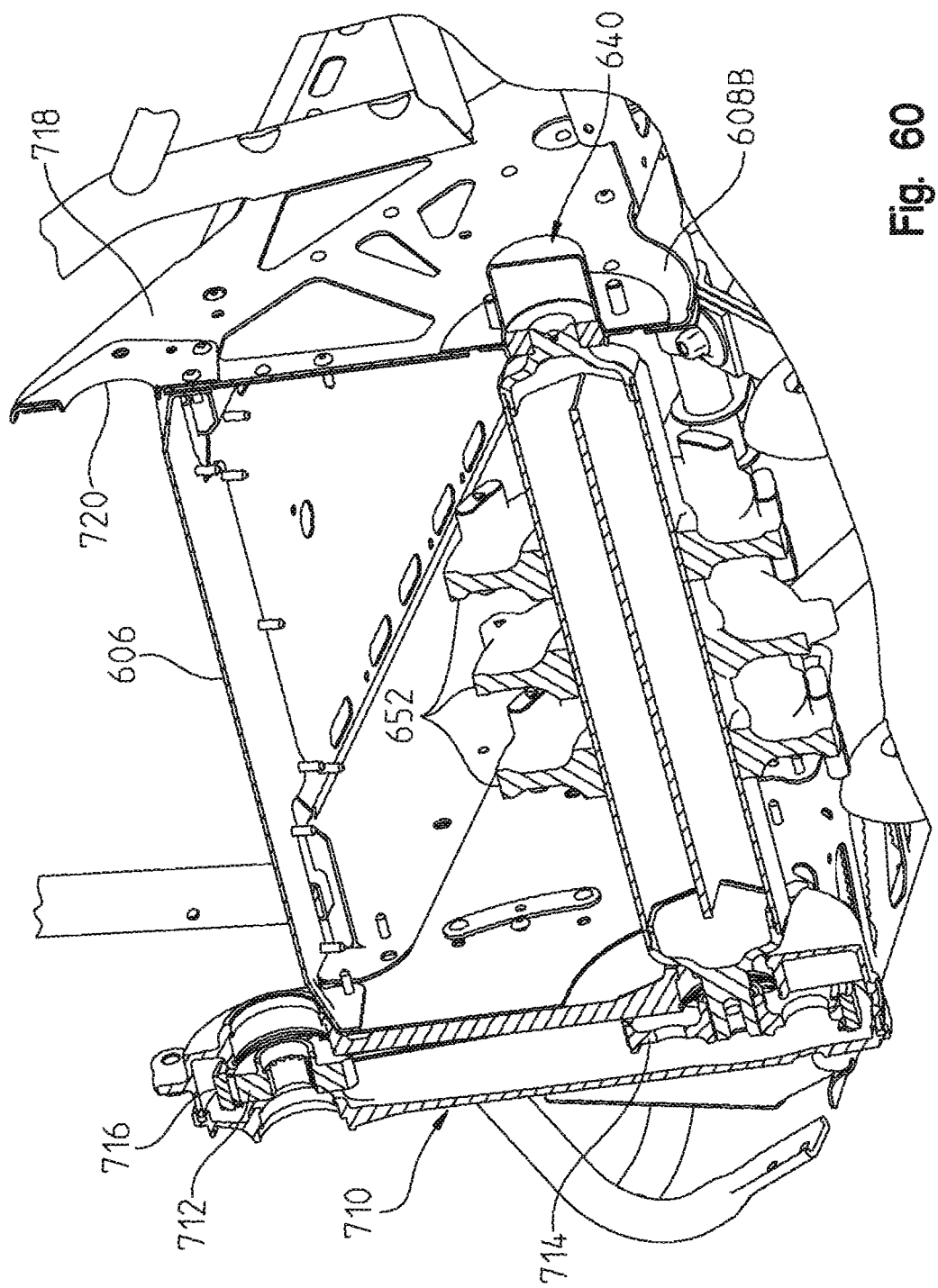
FIG. 60 shows a cross sectional view through lines 60-60 of FIG. 59.

With reference now to FIG. 60, snowmobile 602 is shown in section through drive shaft 640. It should be appreciated that the drive mechanism 640 is shown modified in the chassis of FIG. 1, with the changes being the raised chassis and elongated spindles 634. Thus, as installed in the tunnel of the FIG. 1 embodiment, the space between the sprockets 652/track has been increased relative to the bottom of the tunnel 606, since the chassis has been raised relative to the drive mechanism 640 as discussed above. Therefore, the tunnel itself could be lowered relative to that shown in FIG. 55.

With reference again to FIG. 55, tunnel 606 could be lowered by approximately two inches such that the top of the tunnel is approximately at the dashed line 700. Since the tunnel may be lowered, other components which are restricted by the height of the tunnel 606 may also be lowered. For example, the fuel tank (not shown) than runs longitudinally along the tunnel, may be more centralized towards the center of the vehicle, given the extra volume now available by the added two inches.

Also with respect again to FIG. 8, a chain case 710 is shown having a sprocket 712, which would drive the drive shaft 640 through sprocket 714 and chain 716. A jackshaft (not shown) would extend between sprocket 712 and though sidewall 718, where a bearing (not shown) would reside in opening 720, and thereafter connect to the CVT pulley. The jackshaft would be driven by the engine/CVT. Thus, as the chassis has been raised relative to the driveshaft, the jackshaft can be positioned above the tunnel, but lower and out of the intake track of the engine. This allows for horse power enhancement of the engine and potentially allows more space for a larger air box for performance gains of the engine.

In addition, the tunnel typically has an integrated cooling system as described above. As the tunnel is lowered, so too is the cooling liquid within the tunnel and therefore the center of gravity (CG) of the tunnel is lowered. Also, by lowering the jackshaft, the clutch and brake (attached to jackshaft) are also lowered. Thus, even though the CG of the front chassis has been raised by raising the front chassis portion 608 as described above, at least some of the vehicle height increase has been offset by lowering the CG of the tunnel and other chassis parts.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

|  | Dimension 672 | Dimension 677 | Dimension 680 | Dimension 686 |
| --- | --- | --- | --- | --- |
| Embodiment 1 | 2.13 inches (54.10 mm) | 9.30 inches (36.22 mm) | 6.9 inches (175.26 mm) | 3.34 inches (84.84 mm) |
| Embodiment 2 | 1.5 inches (38.10 mm) | 8.34 inches (211.84 mm) | 6.2 inches (157.48 mm) | 3.97 inches (100.84 mm) |
| General Range | 1.25-2.25 inches (31.75-57.15 mm) | 8-10 inches (203-254 mm) | 6-7 inches (152.4-177.8 mm) | 3-4.25 inches (76.2-107.95 mm) |

All measurements mentioned herein are taken at static condition in full rebound.

Multiple other possibilities and embodiments now present themselves with the modified relative location of driveshaft 640. These changes include lowering the height of the tunnel

What is claimed is:
1. A snowmobile comprising:
a chassis having a front portion and a tunnel;
a bulkhead supported by the front portion of the chassis;
a power train unit coupled to the chassis;

a plurality of front ground-engaging members including a right ski and a left ski;

a right suspension unit operably coupled to the right ski and including an upper control arm and a lower control arm coupled to the bulkhead;

a left suspension unit operably coupled to the left ski and including an upper control arm and a lower control arm coupled to the bulkhead; and a support member supported within the bulkhead between the upper control arm of the right suspension unit and the upper control arm of the left suspension unit.

2. The snowmobile of claim 1, wherein the chassis has the front portion comprised of castings and the tunnel;

at least one of the right upper or right lower control arms comprising a first right arm pivotably coupled to one of the castings at an inner end, and adhesively coupled to at least one right coupler at an outer end, and wherein at least one of the left upper or left lower control arms comprising a first left arm pivotably coupled to the other of the castings at an inner end, and adhesively coupled to at least one left coupler at an outer end, the first right arm and the first left arm being comprised of a first material and the right and left couplers being comprised of a second material.

3. The snowmobile of claim 2, wherein the front portion of the chassis includes a plurality of frame members, an upper end of the plurality of frame members is coupled to a connector and a lower end of the plurality of frame members is coupled to a plurality of coupling members with an adhesive material.

4. The snowmobile of claim 3, wherein at least a portion of the frame members being comprised of carbon fiber.

5. The snowmobile of claim 3, further comprising an electrical device coupled to the lower end of one of the plurality of frame members.

6. The snowmobile of claim 5, wherein the electrical device is a solenoid.

7. The snowmobile of claim 5, further comprising a mounting bracket having an upper side and a lower side, the upper side of the mounting bracket supporting the electrical device and the lower side of the mounting bracket coupled to the lower end of the one of the plurality of frame members with an adhesive material.

8. The snowmobile of claim 7, wherein the lower side of the mounting bracket includes a plurality of recesses configured to receive the adhesive material.

9. The snowmobile of claim 2, wherein the at least one right upper or lower control arm includes a second right arm adhesively coupled to the at least one right coupler, and the at least one left upper or lower control arm includes a second left arm adhesively coupled to the at least one left coupler, the second right arm and the second left arm being comprised of the first material, and the at least one right coupler and the at least one left coupler being comprised of the second material.

10. The snowmobile of claim 3, wherein the support member and at least one of the plurality of frame members are coupled to the connector with a spacer and a fastener, the spacer is positioned intermediate the at least one of the plurality of frame members, and is configured to maintain the shape of the at least one of the plurality of frame members.

11. The snowmobile of claim 1, wherein at least a portion of the support member is comprised of carbon fiber.

* * * * *